United States Patent
Kinugasa et al.

(10) Patent No.: US 7,623,003 B2
(45) Date of Patent: Nov. 24, 2009

(54) DRIVE METHOD FOR DRIVING ELEMENT HAVING CAPACITY IMPEDANCE, DRIVE DEVICE, AND IMAGING DEVICE

(75) Inventors: Yukihisa Kinugasa, Tokyo (JP); Masahiro Segami, Kanagawa (JP); Isao Hirota, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/884,214

(22) PCT Filed: Feb. 27, 2006

(86) PCT No.: PCT/JP2006/003611

§ 371 (c)(1), (2), (4) Date: Jun. 24, 2008

(87) PCT Pub. No.: WO2006/112151

PCT Pub. Date: Oct. 26, 2006

(65) Prior Publication Data

US 2009/0134911 A1 May 28, 2009

(30) Foreign Application Priority Data

Mar. 30, 2005 (JP) ............................. 2005-097358
Oct. 7, 2005 (JP) ............................. 2005-294398

(51) Int. Cl.
*H01P 1/36* (2006.01)
(52) U.S. Cl. .................... 333/24.2; 333/32; 333/1.1; 348/308; 348/302; 348/E5
(58) Field of Classification Search ............... 333/24.2, 333/32, 1.1; 348/302, 308; 326/30
See application file for complete search history.

(56) References Cited

U.S. PATENT DOCUMENTS 3,148,285 A * 9/1964 Tedeschi et al. ............. 327/231

(Continued)

FOREIGN PATENT DOCUMENTS

JP 01-303756 7/1989

(Continued)

*Primary Examiner*—Vibol Tan
(74) *Attorney, Agent, or Firm*—Robert J. Depke; Rockey, Depke & Lyons, LLC

(57) ABSTRACT

Three devices such as electric charge-coupled devices are each included in one of three phase impedance circuits composing a 3-phase LC resonance circuit as a device having a capacitive impedance. A driver circuit applies either of a logic level of 0, a high-impedance level or a logic level of 1 to each of nodes Node_A, Node_B and Node_C of the phase impedance circuits so as to result in sequential transitions of a state of resonance among the phase impedance circuits. In an operation to drive the phase impedance circuits, either of the logic level of 0, the high-impedance level and the logic level of 1 is applied to each of the nodes so as to sustain a phase difference of $2\pi/3$ between the phase impedance circuits. In this way, the logical levels and the phases of the logical levels are assigned to the nodes in such a way that the logical levels do not overlap with each other at any timings each corresponding to a point of time. Thus, a driving apparatus for driving the devices each having a capacitive impedance is capable of reducing the power consumption.

24 Claims, 26 Drawing Sheets

U.S. PATENT DOCUMENTS

| | | | |
|---|---|---|---|
| 4,101,819 A * | 7/1978 | Maeda et al. | 323/320 |
| 4,383,243 A * | 5/1983 | Krugel et al. | 307/3 |
| 6,580,333 B2 * | 6/2003 | Hasegawa | 333/1.1 |
| 7,295,236 B1 * | 11/2007 | Bellingrath et al. | 348/302 |

FOREIGN PATENT DOCUMENTS

| | | |
|---|---|---|
| JP | 01-303757 | 7/1989 |
| JP | 01-303758 | 7/1989 |
| JP | 05-122619 | 5/1993 |
| JP | 05-122625 | 5/1993 |
| JP | 10-051691 | 2/1998 |
| JP | 10-294898 | 11/1998 |
| JP | 11-098416 | 4/1999 |

* cited by examiner

EQUILIBRIUM STATE OF VECTORS $\vec{a}$, $\vec{b}$ AND $\vec{c}$

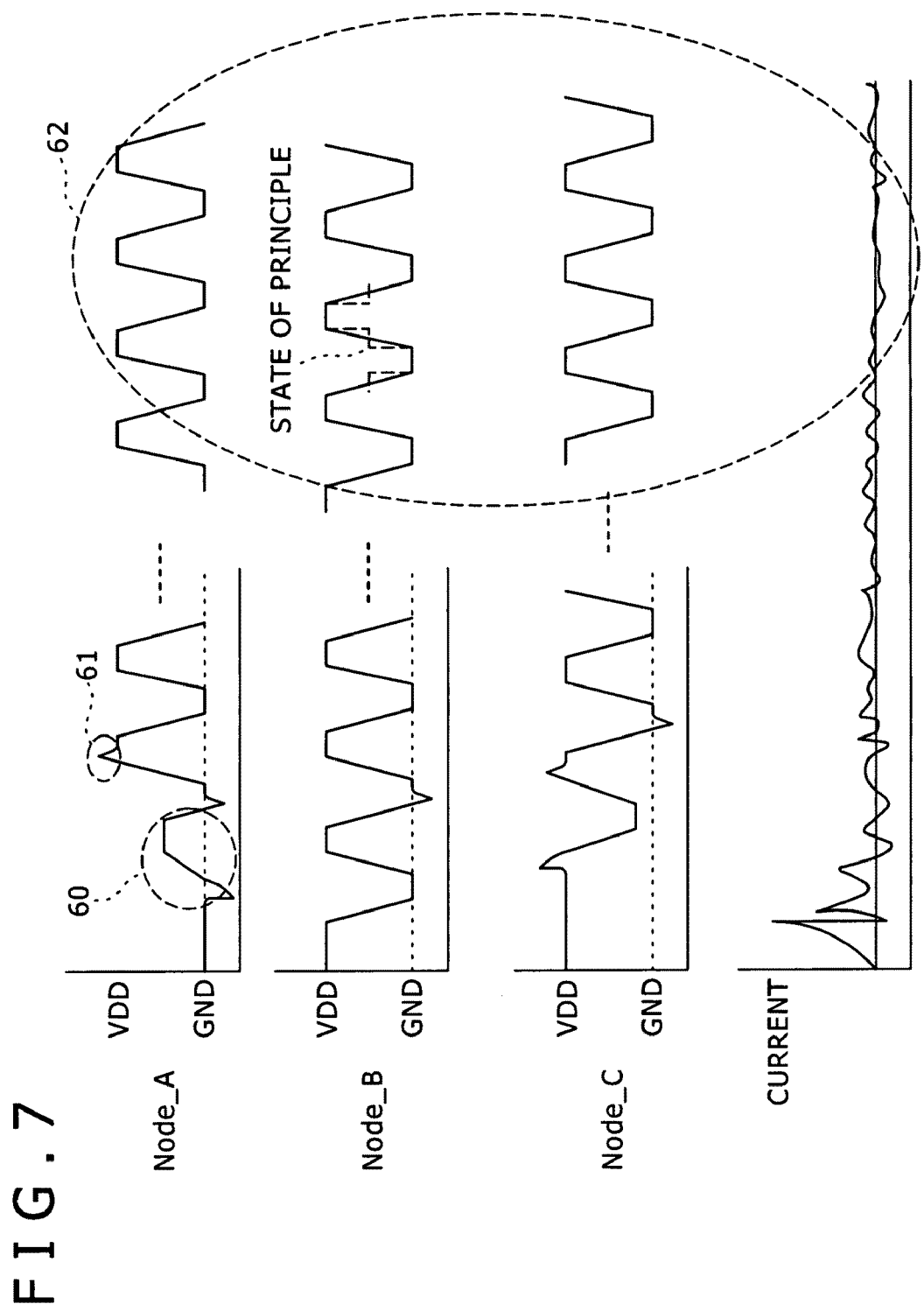

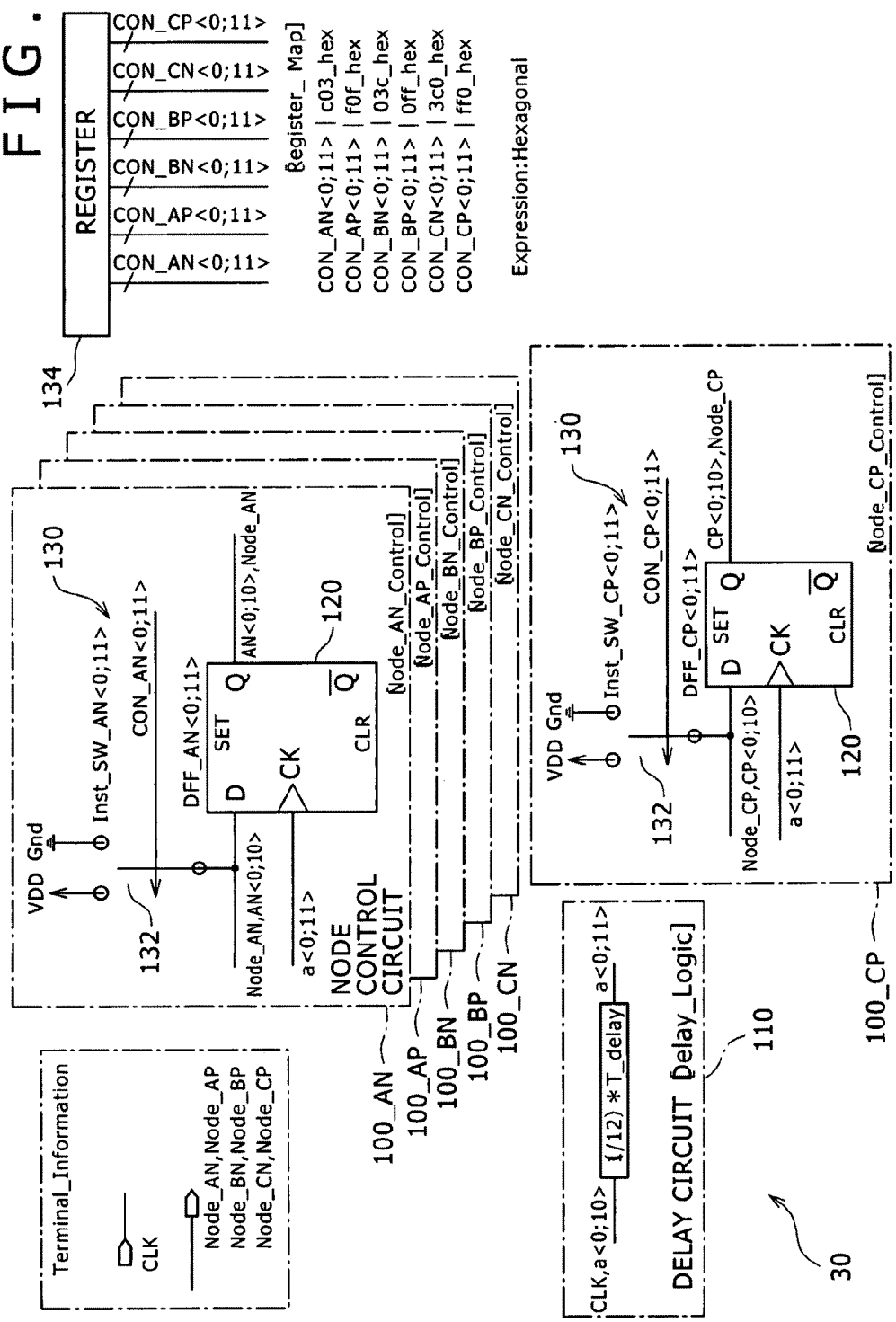

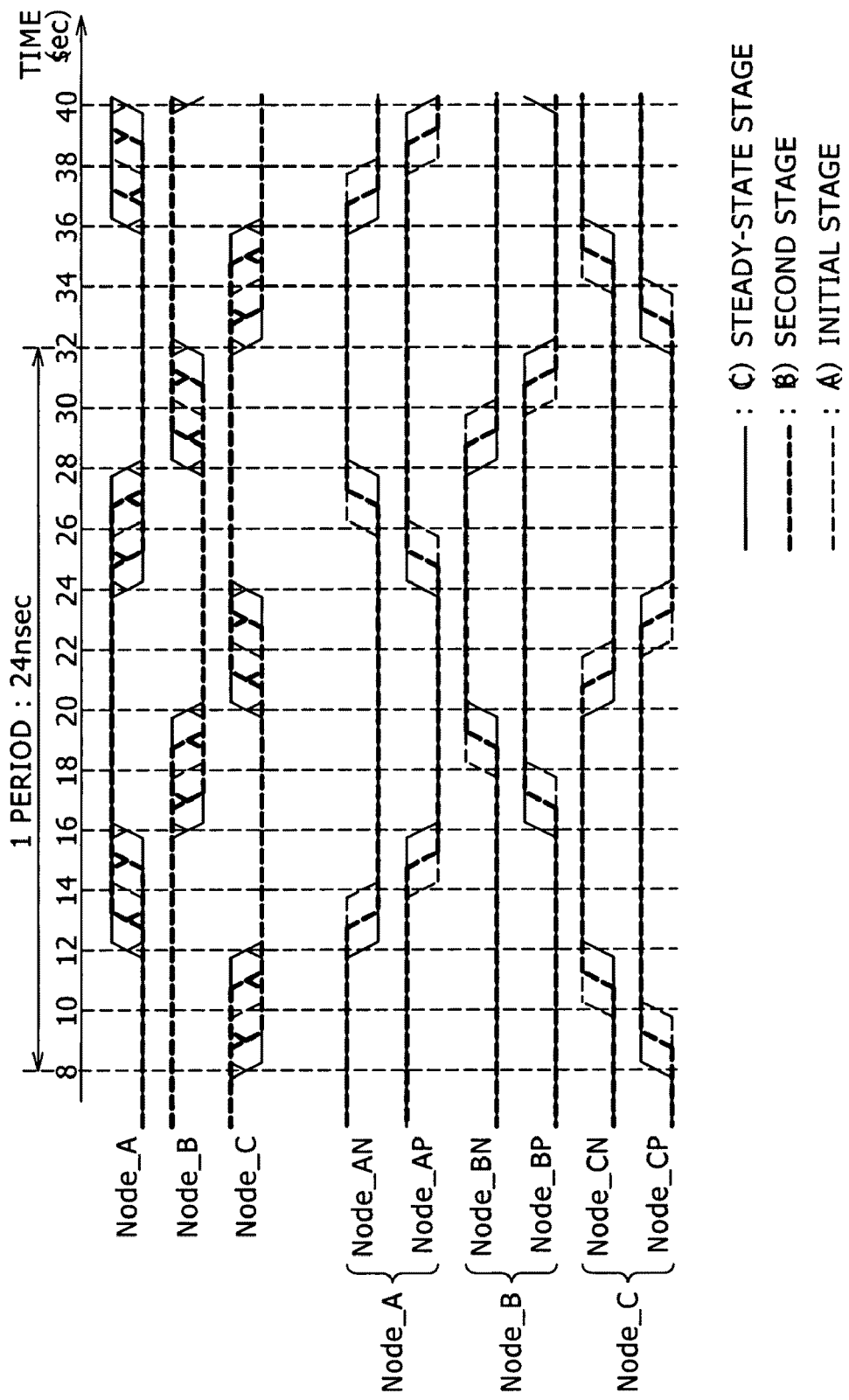

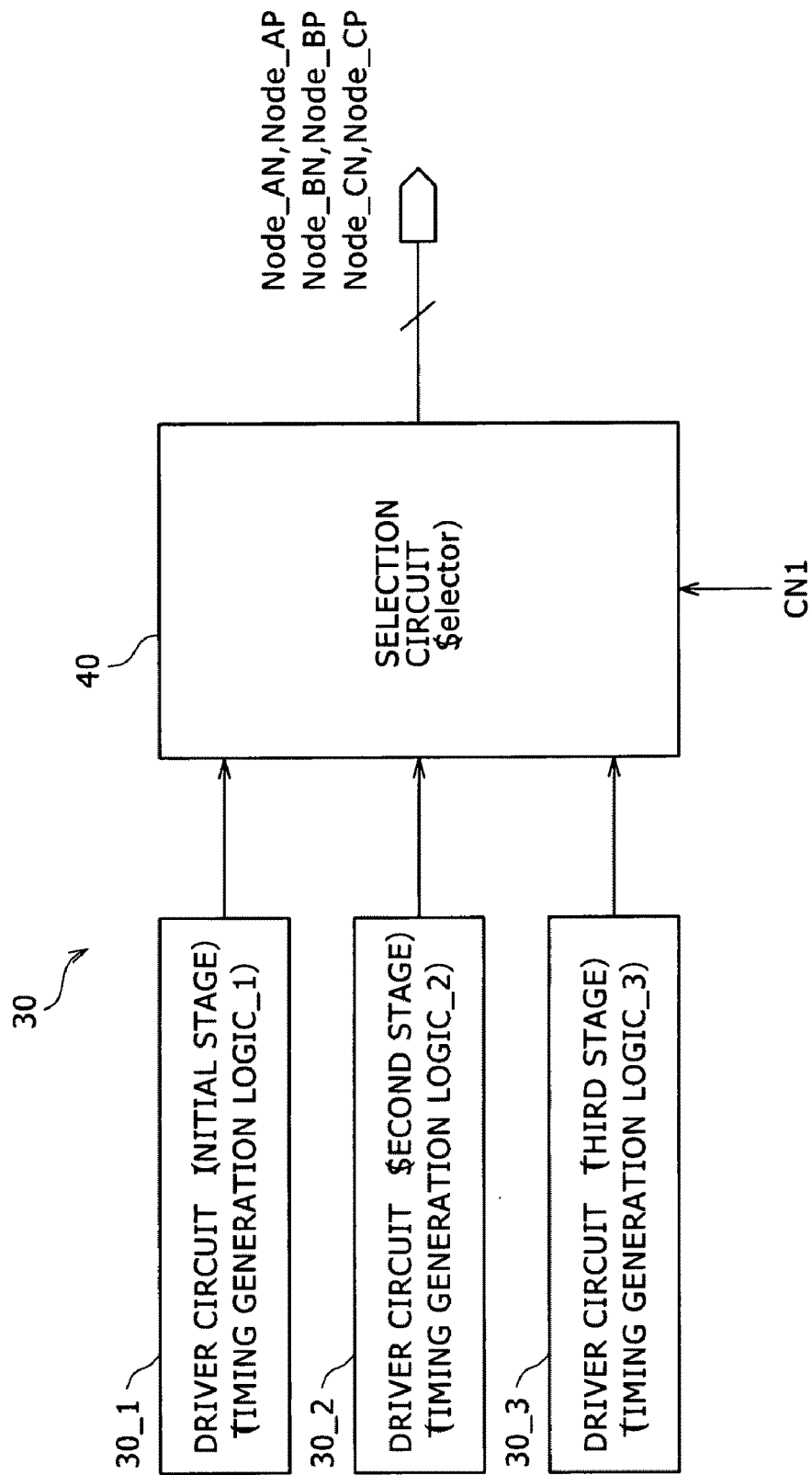

EQUILIBRIUM STATE OF VECTORS $\vec{a}$, $\vec{b}$ AND $\vec{c}$

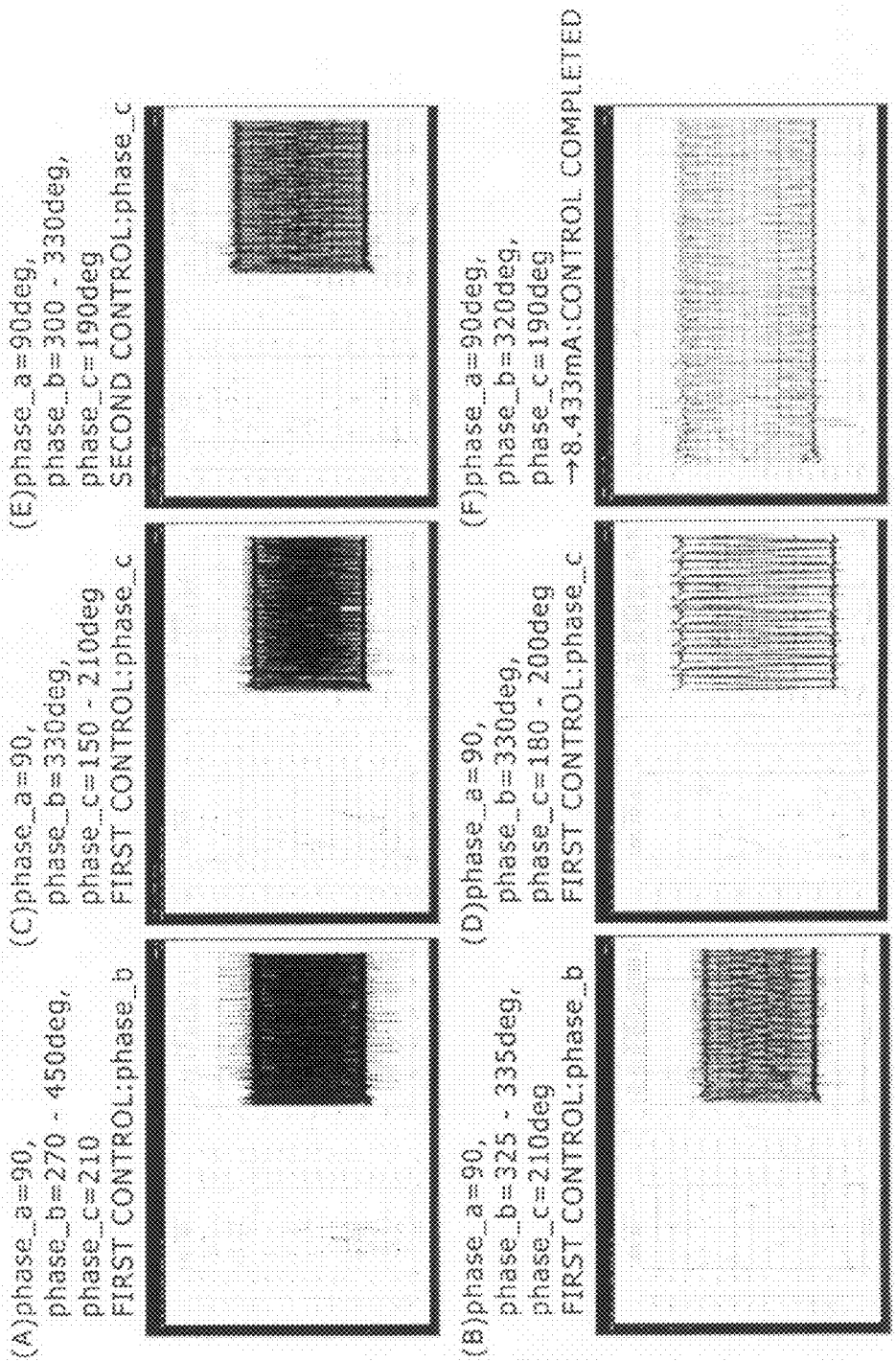

EQUILIBRIUM STATE OF VECTORS $\vec{a}, \vec{b}$ AND $\vec{c}$

FIG. 20
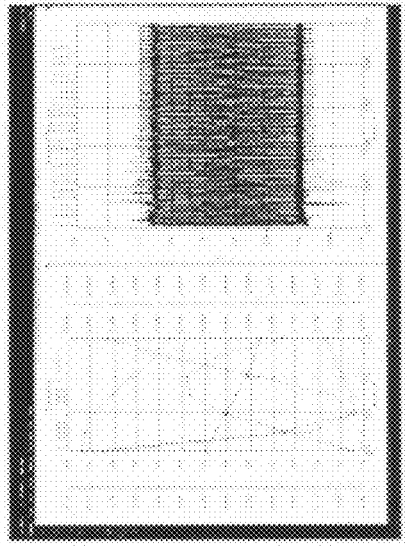
(A) phase_a=0 - 180deg, phase_b=330deg, phase_c=210deg: CONTROL OF phase_a
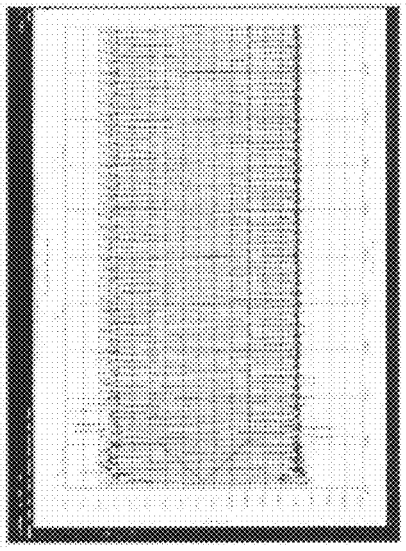
(C) phase_a=90 - 120deg, phase_b=330deg, phase_c=210deg: CONTROL OF phase_a
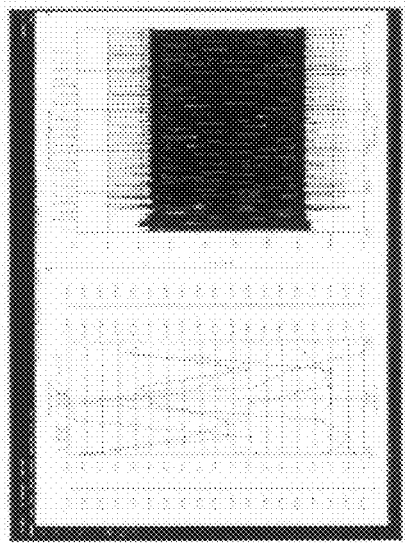
(B) phase_a=60 - 150deg, phase_b=330deg, phase_c=210deg: CONTROL OF phase_a
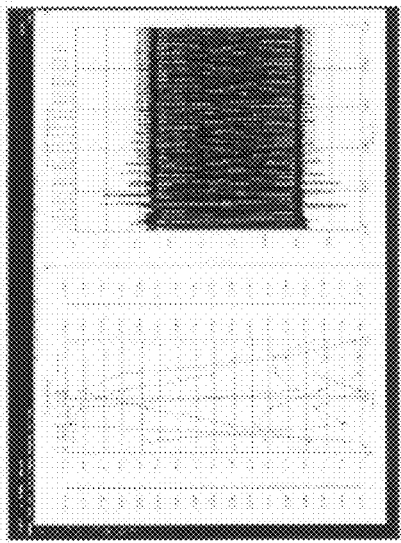
(D) phase_a=108deg, phase_b=330deg, phase_c=210deg→8.454mA

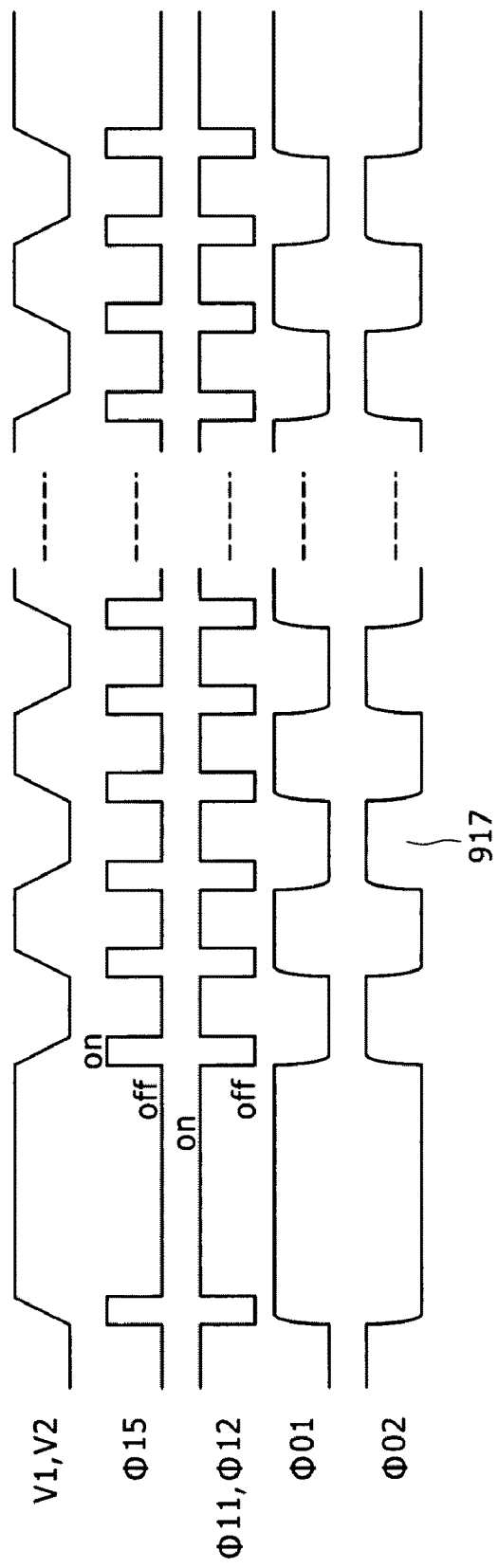

EXCESSIVELY GENERATED DRIVING PULSES
( TO SEVERAL PULSES)

DRIVE METHOD FOR DRIVING ELEMENT HAVING CAPACITY IMPEDANCE, DRIVE DEVICE, AND IMAGING DEVICE

This application is a 371 U.S. National Stage filing of PCT/JP2006/303611, filed Feb. 27, 2006, which claims priority to Japanese Patent Application Number JP2005-097358 filed Mar. 30, 2005 and Japanese Patent Application Number JP2005-294398 filed Oct. 7, 2005, all of which are incorporated herein by reference.

TECHNICAL FIELD

The present invention relates to a driving method for driving a device having a capacitive impedance, a driving apparatus adopting the driving method and a driver circuit for devices such as a CCD (Charge Couple Device), which is a typical device having a capacitive impedance. More particularly, the present invention relates to a technology for reducing driving-time power consumption.

BACKGROUND ART

Representatives of a device having a capacitive impedance include an image pickup device and a charge transfer device used as a delay device in a signal processing circuit.

The charge transfer device includes a group of devices laid on a semiconductor substrate, being separated away from the substrate by an insulation layer. The impedance of the charge transfer device can be approximated by an electrostatic capacitance. An operation to drive the charge transfer device raises a problem that a large current is consumed in a process to charge electric charge to the device and a process to discharge electric charge from the device. An operation to drive the charge transfer device at a higher speed consumes an even larger current in a process to charge electric charge to the device and a process to discharge electric charge from the device.

A variety of techniques have each been conceived as a solution to the problem. (For more information on the techniques, the reader is suggested to refer to documents such as Japanese Patent Laid-open No. Hei 1-303756 used as document 1, Japanese Patent Laid-open No. Hei 1-303757 used as document 2, Japanese Patent Laid-open No. Hei 1-303758 used as document 3 and Japanese Patent Laid-open No. Hei 11-98416 used as document 4.)

For example, documents 1 to 3 propose a configuration for reducing the power consumption of a charge coupled device by making use of an LC resonance circuit. For example, a configuration shown in FIG. 23 includes a variable-capacitance device C4 denoted by reference numeral 913 in addition to a resonance circuit employing an inductor L3 denoted by reference numeral L903 and a capacitor C3 denoted by reference numeral C903. The variable C4 is an adjustment capacitor for correcting capacitance variations of a charge coupled device 901. On the other hand, a configuration shown in FIG. 24A includes switches SW914, SW915 and SW916 as well as a parallel resonance circuit, which employs a charge transfer device 901 and an inductor L2 denoted by reference numeral L902. The switch SW916 is provided in the parallel resonance circuit whereas the switches SW914 and SW915 connect the parallel resonance circuit to power supplies.

The three switches SW914, SW915 and SW916 employed in the configuration shown in FIG. 24A are controlled to alternately switch a resonance circuit and a charging period so that currents flowing from the power supplies during the resonance period are reduced. In this way, reduction of the power consumption can be implemented. The resonance period is a portion of a period denoted by reference numeral 917 in FIG. 24B. In the resonance period, a signal φ15 is on. The charging period is also a portion included in the period 917 shown in FIG. 24B as a portion in which the signal φ15 is off. During the charging period, electric charge is charged from the power supplies to the charge transfer device.

A configuration according to the technique disclosed in document 4 employs a switch circuit including switches SW0, SW1 and SW2 denoted by reference numerals 909, 910 and 911 respectively as shown in FIG. 25A. The switch circuit is used or connecting a charge transfer gate electrode provided at the front stage of a charge coupled device to a charge transfer gate electrode provided at the rear stage of the charge coupled device. In accordance with the technique, paths of clock signals for driving the charge transfer gate electrodes are cut off after the charge transfer gate electrode provided at the front stage is driven but before the charge transfer gate electrode provided at the rear stage is driven.

In this case, a period for which a clock signal φ3 is set at 1 as shown in FIG. 25B is a period right after the charge transfer gate electrode provided at the front stage of the charge coupled device 908 is driven but before the charge transfer gate electrode provided at the rear stage is driven. During this period, a clock signal φ1 is set at 0 and a clock signal φ2 is also set at 0 for respectively cutting off the switches SW1 and SW2 for driving the charge transfer gate electrode provided at the front stage and the charge transfer gate electrode provided at the rear stage. With φ3=1, however, the switch SW2 is turned on. That is to say, by executing control to turn on the switches SW1 and SW2 but conversely turn off the switch SW3 or vice versa, the charge transfer gate electrode provided at the front stage and the charge transfer gate electrode provided at the rear stage are connected to each other with a timing determined in advance during a transfer of electric charge.

By executing such control, some of electric charge accumulated in the charge transfer gate electrode provided at the front stage is transferred to the charge transfer gate electrode provided at the rear stage allowing the transferred charge to be recycled. It is thus possible to reduce the amount of reactive energy discharged from and charged to the capacitors of the charge transfer gate electrode provided at the front stage of the charge coupled device and the charge transfer gate electrode provided at the rear stage of the charge coupled device. As a result, the power consumption can be decreased.

In addition, Japanese Patent Laid-open No. Hei 5-122625 used as document 5 proposes a 2-phase resonance drive circuit shown in FIG. 26A. As shown in the figure, a capacitive load 920 is equivalent to a capacitive load 921 shown in FIG. 26B. Thus, the circuit shown in FIG. 26A is equivalent to a circuit shown in FIG. 26B. The 2-phase resonance drive circuit shown in FIG. 26B includes a resonance loop having a configuration connected to the ground (GND). By setting a resonance state of a resonance circuit employing an electrode capacitor, a current is held in the resonance loop. Thus, the power consumption of the entire circuit can be reduced. The power consumed by the electrode capacitor of the conventional resonance circuit is a problem. In the case of the 2-phase resonance drive circuit, however, a current is held in the resonance loop so that the power consumption can be reduced substantially.

Nevertheless, the 2-phase resonance drive circuit is controlled by a signal including higher harmonic components of odd orders as is the case with a signal having a rectangular waveform. Thus, the 2-phase resonance drive circuit still has a problem that the power consumption increases due to the higher harmonic components.

In addition, in accordance with a technique disclosed in Japanese Patent Laid-open No. Hei 5-122619 used as document 6, an operation to supply one of 2-phase clock signals is delayed from an operation to supply the other 2-phase clock signal by at least one period of the clock signal as shown in FIG. 26C in order to avoid a phenomenon in which a transfer of electric charge fails due to the fact that the first generated driving power of the driving waveform is insufficient. The insufficient driving power is a problem peculiar to the CCD driving. By delaying the operation to supply one of 2-phase clock signals from the operation to supply the other 2-phase clock signal as described above, at least a pulse of one of the clock signals is excessively supplied to assure a driving level contributing to the CCD transfer.

DISCLOSURE OF INVENTION

In the configurations described in documents 1 to 4, however, control of a switch is executed to set an electrode at an L level represented by a logic value of 0 or an H level represented by a logic value of 1, that is, to short or not short the electrode. Thus, the amount of power consumed in the circuit is large as before.

In addition, if the circuit disclosed in reference 5 can be operated at a resonance frequency, it is possible to implement a state in which the power consumption is reduced virtually to a quantity close to 0. In actuality, however, higher harmonic components are included in the control signal. Thus, the power consumption increases due to the higher harmonic components.

In addition, in the configuration described in document 6, it is necessary to excessively supply at least a pulse of one of the clock signals in order to assure the initial driving power of the driving waveform. Thus, the power consumption rises undesirably by an increase corresponding to the excessively supplied pulses of one of the clock signals. In order to solve this problem, it is desirable to provide a configuration capable of assuring the initial driving power of the driving waveform while eliminating the operation to excessively supply at least a pulse of one of the clock signals.

In the configurations described in documents 1 to 3, for example, resonance is used in order to hold a current in a resonance circuit. It is thus possible to reduce the magnitude of a current flowing out to a power supply. As a result, the power consumption can be decreased. However, resonance occurs intermittently in the resonance circuit seen as a whole. Thus, the capability of holding a current in the resonance circuit is reduced. As a result, the effect of the power consumption is small.

It is thus an object of the present invention addressing the problems described above to provide a mechanism capable of assuring an initial driving power while eliminating control to excessively supply at least a pulse of a clock signal in order to assure the initial driving power in an operation to drive a device having a capacitive impedance and a mechanism capable of further raising the effect of reduction of power consumption.

A mechanism provided by the present invention as a mechanism for driving a device having a capacitive impedance is characterized in that an n-phase LC resonance circuit is constructed and a control timing of each driver circuit for driving the n-phase LC resonance circuit is devised so as to reduce the power consumption, avoid the insufficiency of the initial driving power and execute driving control not causing an overshoot.

The reduction of power consumed by the driver circuits is explained concretely as follows. An n-phase LC resonance circuit for driving n devices each having a capacitive impedance is constructed. The n-phase LC resonance circuit is driven into such a state of resonance that the phases of logic levels applied by the driver circuits to the driving points of the n-phase LC resonance circuit are shifted from each other. In addition, the driving points of the n-phase LC resonance circuit are each driven to a logic level, which can be a 0 logic level, a high-impedance state or a 1 logic level. It is desirable to produce an output of each of the driver circuits at the 0 logic level, the high-impedance state or the 1 logic level and assign a specific one of the logic levels and the phase of the specific logic level to each of the driving points on the basis of both the control of the logic level assigned to the driving point and the control of the phase of the assigned logic level in such a way that neither phase nor logic level is duplicated for every timing at every point of time.

By providing the high-impedance state as described above, the high-impedance state can be assigned to a period of a transition of a signal from the 0 logic level to the 1 logic level or vice versa. By assigning the 0 logic level, the high-impedance state or the 1 logic level on an equality basis, a signal can be handled as a 120-degree conduction waveform and the 3rd-order higher harmonic component of the signal becomes 0. Thus, a power-consumption increase caused by higher harmonic components can be avoided most effectively.

In the methods described in Patent documents 1 to 4, the driving operation is carried out only at either of the 0 and 1 logic levels. On the other hand, the present invention is much characterized in that, in accordance with the present invention, the high-impedance state is introduced and well combined with the 0 and 1 logic levels to drive the driving points of an n-phase resonance circuit. By devising the timings to set the 0 logic level, the high-impedance state and the 1 logic level, the n-phase resonance circuit can be driven so that the n-phase resonance circuit transits sequentially from phase to phase in a state of resonance. Since the 0 logic level, the high-impedance state and the 1 logic level is switched sequentially from one to another, at least three phases are required. Even the use of four or more phases does not entail inconvenience. In a process to make phases match the 0 logic level, the high-impedance state and the 1 logic level, however, 3m (where m is a positive integer at least equal to 1) phases or, in particular, the fewest three phases are optimum.

It is to be noted that, by devising the control based on the 3-phase resonance and the assignment of the logic levels, the power-consumption increase caused by higher harmonic components as described in document 5 can be avoided as much as possible. In addition, since an electrode capacitance is assigned to the electrode of each phase, by Y-Δ conversion, the electrode capacitances are included in the capacitance of a 3-phase resonance loop. The capacitance of the 3-phase resonance loop is the capacitance of a capacitor C0 to be explained later by referring to FIG. 1. Thus, in the configuration described in document 5, power consumed by a capacitor having the electrode capacitance can be taken in the 3-phase resonance loop. Thus, in accordance with the present invention, the effect of the power consumption caused by the electrode capacitance can be made equal to zero or as small a value as possible.

In addition, it is possible to implement a driving mechanism so as to set a phase difference of $2\pi/n$(rad) between phases and prevent logic levels of the phases from overlapping with each other at every timing corresponding to a point of time without generating a gap in resonance of the n-phase resonance circuit viewed as a whole. In other words, in one period to drive all the n phases, one of the phases must be in a resonance state and, in addition, the resonance state sequentially makes a transition to the next phase.

At the outputs of driver circuits, devices are provided so as to form an LC resonance circuit for driving loads at three or more different phases. The driver circuits drive the multi-phase LC resonance circuit in such a way that the differences between the phases are set at $2\pi/n$. In this way, a current can be held in the multi-phase LC resonance circuit. At that time, if the n-phase LC resonance circuit driving loads at different phases is driven so that sequential transitions of a resonance state are made from phase to phase, one of the LC resonance circuit is always put in the state of resonance. Thus, a continuous state of resonance is carried out by the LC resonance circuit working as a whole and the capability of holding a current in the LC resonance circuit is enhanced considerably. That is to say, the magnitude of a current that can be held in the LC resonance circuit for driving loads at n different phases can be maximized so that the magnitude of a current flowing to the ground (GND) and the magnitude of a current supplied by a power supply can be minimized.

In order to carry out a continuous resonance operation in a steady state, the logic state of each driving point of the n-phase LC resonance circuit is varied in an order determined in advance among the 0 logic level, the high-impedance state and the 1 logic level. By varying the logic state of the driving point in this way, the continuous resonance operation can be implemented with ease. In the operation to vary the logic state of the driving point, the logic level of the driving makes transitions of 0→1→0→1 and so on and it is nice to make each of the transitions always as a transition through the high-impedance state. By doing so, it is possible to carry out the continuous resonance operation as well as avoid or suppress a through current flowing through transistors provided at the output stage of the driver circuit.

In addition, devices for preventing the initial driving power of the driver circuit from becoming insufficient and avoiding an overshoot are explained in concrete terms as follows. Every driving point of the LC resonance circuit for driving loads at n different phases is set at either the 0 logic level or the 1 logic level without using the high-impedance state. A driving point set at the 0 logic level is sandwiched by two driving points each set at the 1 logic level. The driver circuit generating the 0 logic level is assisted by compensation making use of two driving points each set the 1 logic level for the driving-power insufficiency in a first transition made initially from the 0 logic level to the 1 logic level so that the insufficiency of the driving power can be avoided.

Since an overshoot is generated when the current attracted from a resonance circuit is stronger than the driving power of the driver circuit, a damping resistor is inserted into the resonance circuit as a resistor for reducing the extracted current in order to decrease the overshoot. As an alternative, the through current of the driver circuit is utilized in order to generally increase the driving power of the driver circuit to compensate for the operation carried out by the resonance circuit to extract a current possibly causing the overshoot.

If a damping resistor is inserted into a resonance circuit, however, the magnitude of a current held in the resonance circuit decreases, causing a demerit of an increased current supplied from or output to the driver circuit and an increased steady-state current. Thus, it is crucial to make use of a damping resistor having a proper resistance.

In this way, control method A explained below is adopted in conjunction with control method B also explained below. In accordance with control method A, in the initial driving operation, control is executed to set the output logic level generated at the driving point of a driving circuit at the 0 logic level to be changed to the 1 logic level and to assist the driver circuit by compensation making use of 2 adjacent driving points each set at the 1 logic level for the driving-power insufficiency so as to assure the initial driving power of the driver circuit and, in addition, the through current of the driver circuit is utilized in order to generally increase the driving power of the driver circuit to compensate for the operation carried out by the resonance circuit to extract a current possibly causing an overshoot. On the other hand, control method B is characterized in that, in accordance with this method, the reduction of the power consumption is implemented without causing the 0 logic value, the high-impedance state and the 1 logic value to overlap with each other as the output logic levels of the driver circuit. Then, by making a transition from a state generated by control method A to a state generated by control method B, it is possible to implement the reduction of the power consumption, avoid the insufficiency of the initial driving power and carry out a driving operation not causing an overshoot.

BRIEF DESCRIPTION OF DRAWINGS

FIG. 7 is a diagram showing output responses used for explaining an effect of assigning output logic levels of the driver circuit and the phases of the logic levels according to the first embodiment.

FIG. 9 is a diagram showing a concrete typical configuration of the driver circuit for assigning output logic levels and the phases of the logic levels in accordance with the first embodiment.

Used as a continuation of the explanatory diagram shown in FIG. 10A.

Used as a continuation of the explanatory diagram shown in FIG. 10B.

FIG. 11 is a diagram showing typical timings derived from the logic-level and phase assignments shown in FIGS. 10A to 10C as timings of the driver circuit shown in FIG. 4A.

FIG. 12 is a diagram showing a concrete typical configuration of the driver circuit for implementing assignment of output logic levels and the phases of the logic levels in accordance with the second embodiment.

Used as a continuation of FIG. 16A.

FIG. 18 is a diagram showing results of typical experiments each applying the first approach for determining an initial phase of every power supply.

FIG. 20 is a diagram showing results of typical experiments each applying the second approach for determining an initial phase of every power supply.

FIG. 24B is a diagram showing control timings of the driver circuit shown in FIG. 24A.

BEST MODE FOR CARRYING OUT THE INVENTION

Embodiments of the present invention are explained by referring to diagrams as follows.

<Basic Principle: No Device Variations>

Figure 1:
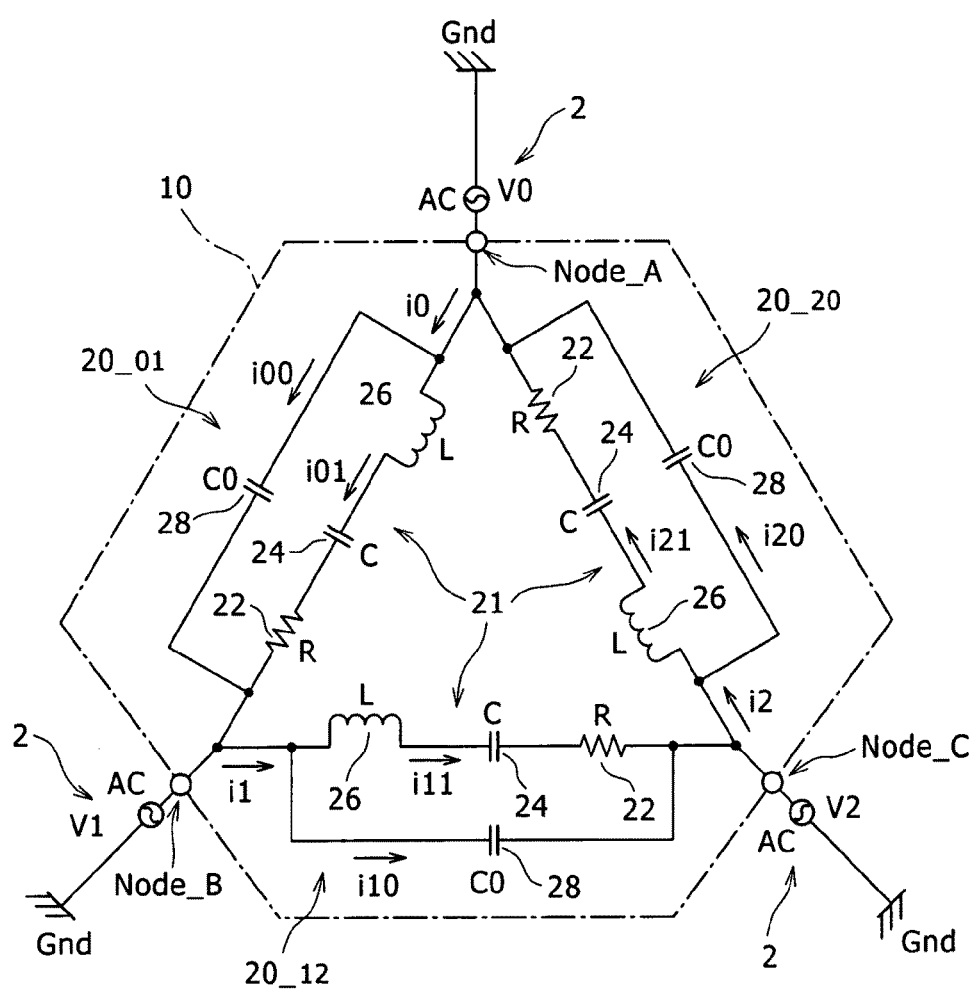
FIG. 1 is an explanatory diagram showing a typical basic configuration used for describing the basic principle of a method for driving a capacitive device in accordance with the present invention.
Figure 2:
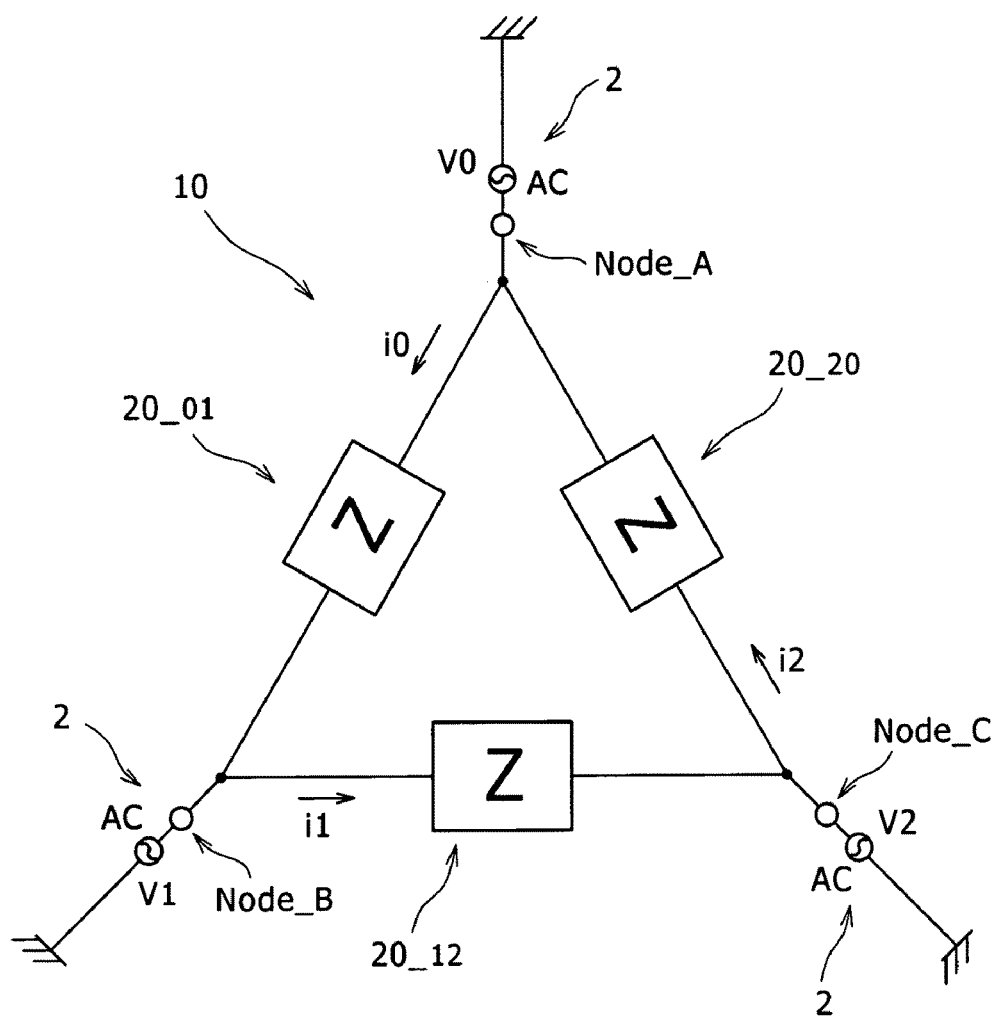
FIG. 2 is an explanatory diagram showing a simplified form of the typical basic configuration shown in FIG. 1 as a configuration used for describing the basic principle of a method for driving a capacitive device in accordance with the present invention.

FIGS. 1 and 2 are explanatory diagrams referred to in description of a method for driving a capacitive device in accordance with an embodiment of the present invention. In accordance with the driving method according to the embodiment, the output of a circuit driver can be put in three different logic states, i.e., a 0 logic level, a Z (high-impedance) state and a 1 logic level. In this case, the driver circuit is characterized in that, by devising control of the driving timings of the driver circuit, it is possible to further reduce the power consumption and realize a rectangular waveform capable of assuring an initial driving power without generating an overshoot of the output driving waveform.

In the following description, a 3-phase driving operation is explained concretely as an example.

FIG. 1 is a diagram showing a typical basic configuration of a 3-phase resonance circuit 10. As shown in the figure, the 3-phase resonance circuit 10 has a Δ-connection configuration. The 3-phase resonance circuit 10 is driven by driving power supplies 2 each provided for one of the 3 phases of the 3-phase resonance circuit 10. The driving power supplies 2 are AC (Alternating Current) power supplies V0, V1 and V2, which are connected to nodes (or driving points) Node_A, Node_B and Node_C respectively.

The 3-phase resonance circuit 10 employs predetermined impedance circuits 20 which are laid out between the power supplies V0, V1 and V2 to form a Δ-connection shape. In this embodiment, each of the three impedance circuits 20 employs a series circuit 21 and a capacitive device (or a capacitor) 28, which are connected to each other to form a parallel circuit. The capacitive device 28 has a capacitance C0. The series circuit 21 includes a resistive device 22 having a resistance R, a capacitive device (or a capacitor) 24 having a capacitance C and an inductive device (which is an inductor or a coil) 26 having an inductance L. In the figure, the 3 impedance circuits 20 are denoted by reference numerals 20_01, 20_12 and 20_20 respectively.

The capacitive device 28 represents a capacitive component of a device having a capacitive impedance. An example of the device having a capacitive impedance is a CCD. The resistive device 22 is used merely as a damping resistor and is not an absolutely required component. Basically, the impedance circuits 20 is configured of the series circuit 21 serving as an LC resonance circuit, being connected to a component having a capacitive impedance (in this case, the capacitive device 28). It is to be noted that, each device is assumed in ideal state with no variation in each phase.

A current i0 flows between the driving power supply 2 (V0) and the driving power supply 2 (V1) in the direction from the driving power supply 2 (V0) to the driving power supply 2 (V1). The current i0 can be considered to be a synthesis of a current i00 and a current i01. The current i00 is a current flowing through the capacitive device 28 employed in the impedance circuit 20_01. On the other hand, the current i01 is a current flowing through the series circuit 21_01 employed in the impedance circuit 20_01 as a series circuit including the resistive device 22, the capacitive device 24 and the inductive device 26.

By the same token, a current i1 flows between the driving power supply 2 (V1) and the driving power supply 2 (V2) in the direction from the driving power supply 2 (V1) to the driving power supply 2 (V2). The current i1 can be considered to be a synthesis of a current i10 and a current i11. The current i10 is a current flowing through the capacitive device 28 employed in the impedance circuit 20_12. On the other hand, the current i11 is a current flowing through the series circuit 21_12 employed in the impedance circuit 20_12 as a series circuit including the resistive device 22, the capacitive device 24 and the inductive device 26.

Likewise, a current i2 flows between the driving power supply 2 (V2) and the driving power supply 2 (V0) in the direction from the driving power supply 2 (V2) to the driving power supply 2 (V0). The current i2 can be considered to be a synthesis of a current i20 and a current i21. The current i20 is a current flowing through the capacitive device 28 employed in the impedance circuit 20_20. On the other hand, the current i21 is a current flowing through the series circuit 21_20 employed in the impedance circuit 20_20 as a series circuit including the resistive device 22, the capacitive device 24 and the inductive device 26.

Let us study a condition for the driving power supply 2 for generating a maximum power capable holding a current in a parallel circuit of the impedance circuit 20 by making use of resonance. The condition for the driving power supply 2 for generating a maximum power is identified as a condition for minimizing a current flowing to a power supply Vdd and a current flowing from the power supply Vdd by maximizing a current that can be held in the 3-phase resonance circuit 10. Thus, the effect of the power-consumption reduction is maximized.

In order to make the study simple, FIG. 1 is simplified into FIG. 2 showing a 3-phase resonance circuit 10 with each impedance circuit 20 represented by a synthesis impedance Z. As described above, the impedance circuit 20 includes a LCR series circuit. Expressed by Eq. (1) below, the synthesis impedance Z is the impedance of the impedance circuit 20.

[Eq. 1]

$$Z(s) = \frac{s^2 CL + sCR + 1}{s^3 C_0 CL + s^2 C_0 CR + s(C + C_0)} \tag{1}$$

The power consumption(s) P of the 3-phase resonance circuit 10 can be expressed by Eq. (2) as follows:

[Eq. 2]

$$P = \frac{1}{Z}\{(V_0 - V_1)^2 + (V_1 - V_2)^2 + (V_2 - V_0)^2\} \tag{2}$$

The driving power supplies 2 (or V0, V1 and V2) are defined by Eq. (3) given below. Let notations φ0, φ1 and φ2 denote initial phases of the driving power supplies 2. Also let notation Δ01 denote a difference in electric potential between nodes Node_A and Node_B, notation Δ12 denote a difference in electric potential between nodes Node_B and Node_C and notation Δ20 denote a difference in electric potential between nodes Node_C and Node_A. In this case, Δ01 (=V0−V1), Δ12 (=V1−V2) and Δ20 (=V2−V0) can be expressed by Eq. (4) given below.

[Eq. 3]

$$\left.\begin{aligned} V_0 &= V\exp\{j(\omega t + \phi_0)\} \\ V_1 &= V\exp\{j(\omega t + \phi_1)\} \\ V_2 &= V\exp\{j(\omega t + \phi_2)\} \end{aligned}\right\} \tag{3}$$

[Eq. 4]

$$\left.\begin{aligned} V_0 - V_1 &= 2V*\sin\left(\frac{\phi_0 - \phi_1}{2}\right)\exp\left\{j\left(\omega t + \frac{\phi_0 + \phi_1}{2} + \frac{\pi}{4}\right)\right\} \\ V_1 - V_2 &= 2V*\sin\left(\frac{\phi_1 - \phi_2}{2}\right)\exp\left\{j\left(\omega t + \frac{\phi_1 + \phi_2}{2} + \frac{\pi}{4}\right)\right\} \\ V_2 - V_0 &= 2V*\sin\left(\frac{\phi_2 - \phi_0}{2}\right)\exp\left\{j\left(\omega t + \frac{\phi_2 + \phi_0}{2} + \frac{\pi}{4}\right)\right\} \end{aligned}\right\} \tag{4}$$

Substituting zexp (jθ) for Z, the power consumptions P of the 3-phase LCR-C circuit expressed by Eq. (2) can be transformed to Eq. (5) as follows:

[Eq. 5]

$$P = \frac{4V^2}{z}\left\{\begin{aligned} &\sin^2\left(\frac{\phi_0 - \phi_1}{2}\right)\exp\{j(2\omega t + \phi_0 + \phi_1 + \frac{\pi}{2} - \theta)\} + \\ &\sin^2\left(\frac{\phi_1 - \phi_2}{2}\right)\exp\{j(2\omega t + \phi_1 + \phi_2 + \frac{\pi}{2} - \theta)\} + \\ &\sin^2\left(\frac{\phi_2 - \phi_0}{2}\right)\exp\{j(2\omega t + \phi_2 + \phi_0 + \frac{\pi}{2} - \theta)\} \end{aligned}\right\} \tag{5}$$

Let notation VA denote an apparent power and the expression cos Ψ represent a power factor. In this case, the power consumption P can be expressed by the equation P=VA exp (jφ) and Eqs. (6) and (7) are obtained.

[Eq. 6]

$$(VA)^2 = \left(\frac{4V^2}{z}\right)^2 \begin{cases} \left\{\sin^2\left(\frac{\phi_0-\phi_1}{2}\right)\right\}^2 + \left\{\sin^2\left(\frac{\phi_1-\phi_2}{2}\right)\right\}^2 + \\ \left\{\sin^2\left(\frac{\phi_2-\phi_0}{2}\right)\right\}^2 + \\ 2\left\{\sin^2\left(\frac{\phi_0-\phi_1}{2}\right)\right\}\left\{\sin^2\left(\frac{\phi_1-\phi_2}{2}\right)\right\}\cos(\phi_0-\phi_2) + \\ 2\left\{\sin^2\left(\frac{\phi_1-\phi_2}{2}\right)\right\}\left\{\sin^2\left(\frac{\phi_2-\phi_0}{2}\right)\right\}\cos(\phi_1-\phi_0) + \\ 2\left\{\sin^2\left(\frac{\phi_2-\phi_0}{2}\right)\right\}\left\{\sin^2\left(\frac{\phi_0-\phi_1}{2}\right)\right\}\cos(\phi_2-\phi_1) \end{cases}$$

$$= \left(\frac{4V^2}{z}\right)^2 \begin{cases} \left\{\frac{9}{4} - \frac{1}{4}\{(\cos\phi_0+\cos\phi_1+\cos\phi_2)^2 + \\ (\sin\phi_0+\sin\phi_1+\sin\phi_2)^2\}\right\}^2 - \\ \frac{3}{2}\left\{2 - \frac{1}{2}\{(\cos\phi_0+\cos\phi_1)^2 + (\sin\phi_0+\sin\phi_1)^2\}\right\} \\ \left\{2 - \frac{1}{2}\{(\cos\phi_1+\cos\phi_2)^2 + (\sin\phi_1+\sin\phi_2)^2\}\right\} \\ \left\{2 - \frac{1}{2}\{(\cos\phi_2+\cos\phi_0)^2 + (\sin\phi_2+\sin\phi_0)^2\}\right\} \end{cases}$$

(6)

[Eq. 7]

$$\varphi = \tan^{-1}\left\{\frac{\sin^2\left(\frac{\phi_0-\phi_1}{2}\right)\sin\left\{(2\omega t+\phi_0+\phi_1+\frac{\pi}{2}-\theta)\right\} + \sin^2\left(\frac{\phi_1-\phi_2}{2}\right)\sin\left\{(2\omega t+\phi_1+\phi_2+\frac{\pi}{2}-\theta)\right\} + \sin^2\left(\frac{\phi_2-\phi_0}{2}\right)\sin\left\{(2\omega t+\phi_2+\phi_0+\frac{\pi}{2}-\theta)\right\}}{\sin^2\left(\frac{\phi_0-\phi_1}{2}\right)\cos\left\{(2\omega t+\phi_0+\phi_1+\frac{\pi}{2}-\theta)\right\} + \sin^2\left(\frac{\phi_1-\phi_2}{2}\right)\cos\left\{(2\omega t+\phi_1+\phi_2+\frac{\pi}{2}-\theta)\right\} + \sin^2\left(\frac{\phi_2-\phi_0}{2}\right)\cos\left\{(2\omega t+\phi_2+\phi_0+\frac{\pi}{2}-\theta)\right\}}\right\}$$

$$= \tan^{-1}\left\{\frac{\frac{1}{2}\cos\left(2\omega t+\frac{\pi}{2}-\theta\right)\begin{pmatrix}(\sin\phi_0+\sin\phi_1+\sin\phi_2)\\(\cos\phi_0+\cos\phi_1+\cos\phi_2)-\\\frac{3}{2}(\sin2\phi_0+\sin2\phi_1+\sin2\phi_2)\end{pmatrix}+\frac{1}{2}\sin\left(2\omega t+\frac{\pi}{2}-\theta\right)\begin{pmatrix}\frac{1}{2}(\cos\phi_0+\cos\phi_1+\cos\phi_2)^2-\\\frac{1}{2}(\sin\phi_0+\sin\phi_1+\sin\phi_2)^2-\\\frac{3}{2}(\cos2\phi_0+\cos2\phi_1+\cos2\phi_2)\end{pmatrix}}{\frac{1}{2}\cos\left(2\omega t+\frac{\pi}{2}-\theta\right)\begin{pmatrix}\frac{1}{2}(\cos\phi_0+\cos\phi_1+\cos\phi_2)^2-\\\frac{1}{2}(\sin\phi_0+\sin\phi_1+\sin\phi_2)^2-\\\frac{3}{2}(\cos2\phi_0+\cos2\phi_1+\cos2\phi_2)\end{pmatrix}-\frac{1}{2}\sin\left(2\omega t+\frac{\pi}{2}-\theta\right)\begin{pmatrix}(\sin\phi_0+\sin\phi_1+\sin\phi_2)\\(\cos\phi_0+\cos\phi_1+\cos\phi_2)-\\\frac{3}{2}(\sin2\phi_0+\sin2\phi_1+\sin2\phi_2)\end{pmatrix}}\right\}$$

(7)

In this case, since it is desirable to hold as large a current as possible in the 3-phase resonance circuit 10, it is also nice to set a condition requiring that the absolute value |P| of the power consumption P be maximized. This condition is equivalent to a condition requiring that the apparent power be maximized and the power factor be made close to 1. That is to say, a maximum apparent power and a power factor of 1 are optimum.

Thus, conditions for the initial phases of the driving powers 2 are expressed by Eq. (8) as follows.

[Eq. 8]

$$\begin{aligned}\cos\phi_0 + \cos\phi_1 + \cos\phi_2 &= 0 \quad (9\text{-}1) \\ \sin\phi_0 + \sin\phi_1 + \sin\phi_2 &= 0 \quad (9\text{-}2) \\ \cos2\phi_0 + \cos2\phi_1 + \cos2\phi_2 &= 0 \quad (9\text{-}3) \\ \sin2\phi_0 + \sin2\phi_1 + \sin2\phi_2 &= 0 \quad (9\text{-}4)\end{aligned}$$

(8)

Figure 3A:
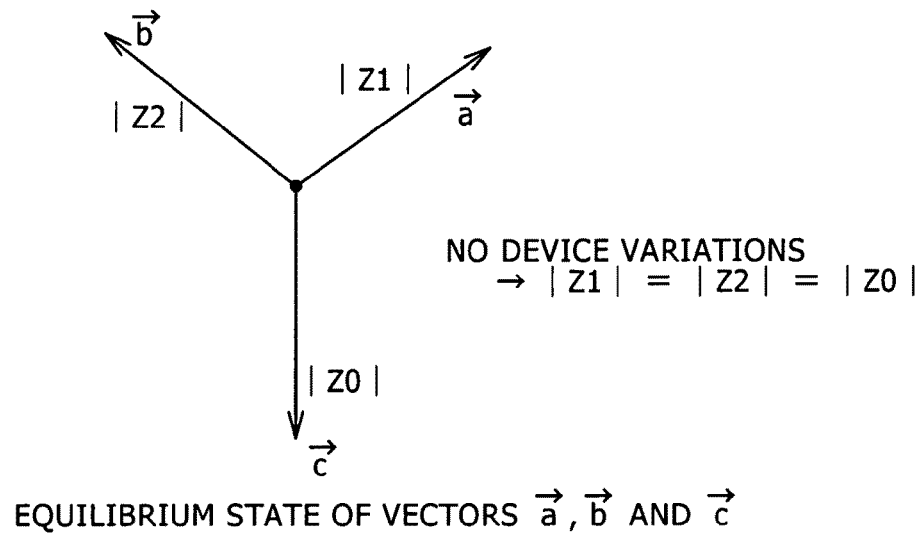
FIG. 3A is an explanatory diagram to be referred to in description of a method for determining initial phases $\phi 0$, $\phi 1$ and $\phi 2$ of driving power supplies 2.
Figure 3B:
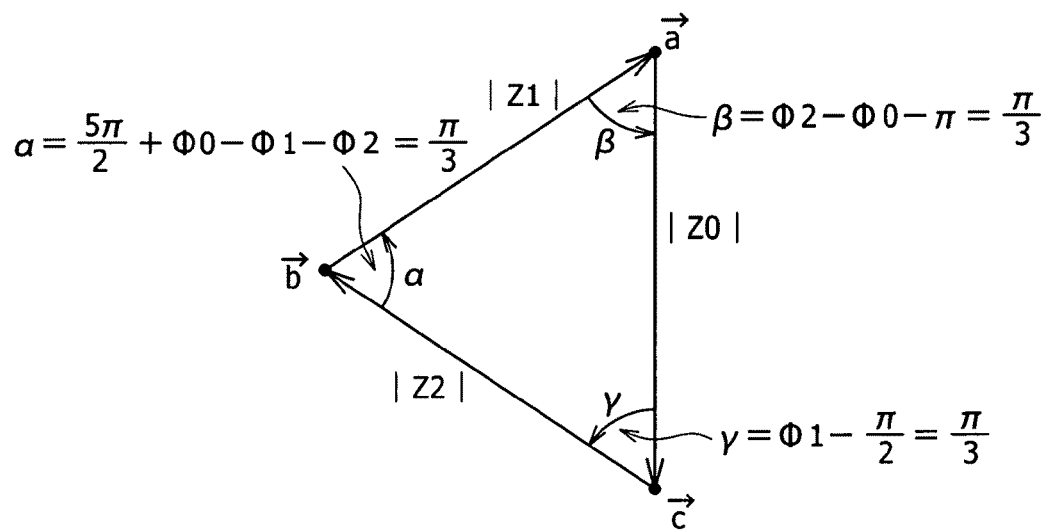
FIG. 3B is an explanatory diagram to be referred to in description of a method shown in FIG. 3A as a method for determining initial phases $\phi 0$, $\phi 1$ and $\phi 2$ of driving power supplies 2.

FIGS. 3A and 3B are explanatory diagrams referred to in description of a technique for determining the initial phases φ0, φ1 and φ2 of logic levels generated by the driving powers 2. Let us consider a plurality of vectors a, b and c on a plane. In figures and expressions, an arrow → is placed on each of notations a, b and c denoting the vectors a, b and c respectively. Let us take the origin as a base point. In a star-shaped vector equilibrium state shown in FIG. 3A, let the vectors a, b and c be expressed by Eqs. (9-1), (9-2) and (9-3) respectively. In this case, the found condition equation is expressed by Eq. (9-4).

[Eq. 9]

$$\begin{aligned}\vec{a} &= \cos\phi0 + i\sin\phi0 \quad (10\text{-}1) \\ \vec{b} &= \cos\phi1 + i\sin\phi1 \quad (10\text{-}2) \\ \vec{c} &= \cos\phi2 + i\sin\phi2 \quad (10\text{-}3) \\ |Z1|\vec{a} + |Z2|\vec{b} + |Z0|\vec{c} &= \vec{a} + \vec{b} + \vec{c} = 0 \quad (10\text{-}4)\end{aligned}$$

(9)

In addition, the star-shaped vector equilibrium state shown in FIG. 3A can be reformed into a Δ-shaped vector equilibrium state shown in FIG. 3B. If there are no variations from device to device, the Δ-shaped vector equilibrium state becomes a vector equilibrium state having an equilateral-triangle shape. In the Δ-shaped vector equilibrium state shown in FIG. 3B, an angle α formed by the vector b, an angle β formed by the vector a, and an angle γ formed by the vector c are expressed by Eqs. (10-1), (10-2) and (10-3) respectively. From Eqs. (10-1), (10-2) and (10-3), Eq. (10-4) is then derived.

[Eq. 10]

$$\begin{aligned}\alpha &= \frac{5\pi}{2} + \phi0 - \phi1 - \phi2 = \frac{\pi}{3} \quad (11\text{-}1) \\ \beta &= \phi2 - \phi0 - \pi = \frac{\pi}{3} \quad (11\text{-}2) \\ \gamma &= \phi1 - \frac{\pi}{2} = \frac{\pi}{3} \quad (11\text{-}3) \\ (\phi0, \phi1, \phi2) &= \left(\frac{\pi}{6}, \frac{5\pi}{6}, \frac{3\pi}{2}\right) \quad (11\text{-}4)\end{aligned}$$

(10)

Thus, it is desirable to shift the initial phases φ0, φ1 and φ2 of logic levels generated by the driving powers 2 from each other by 2π/3.

Therefore, a phase angle θ can be set at any arbitrary value as long as the equation (φ0, φ1, φ2)=(θ, θ+2π/3, θ+4π/3) holds true.

By shifting the phases of logic levels generated by the driving powers 2 (or V0, V1 and V2) for driving nodes Node_A, Node_B and Node_C of the 3-phase resonance circuit 10 from each other by 2π/3(rad), it is obvious that the power factor of the 3-phase resonance circuit 10 becomes equal to 1 and the holding of a current in the 3-phase resonance circuit 10 is maximized. Thus, the power consumption is minimized.

This means that transitions of the resonance state can be made sequentially from an impedance circuit 20 with a phase to another impedance circuit 20 with another phase without generating a gap during the resonance state of the three impedance circuits 20 in a period of driving all the three impedance circuits 20 having different phases. That is to say, in a period, one of the three impedance circuits 20 having different phases is always in a state of resonance and the state of resonance makes a transition to the next impedance circuit 20.

As described above, the present invention introduces a new concept of assigning logic levels and the phases of the logic levels to control of the 3-phase resonance circuit in order to identify a condition for maximizing the holding of a current in the 3-phase resonance circuit. By identifying such a condition, the power consumption can be reduced as much as possible. As a result, by making a transition from a 180-degree conduction mode to a 120-degree conduction mode at a time span at least equal to four periods of a clock signal, a transition from an initial resonance condition to a steady-state resonance condition can be made smoothly without causing an overshoot.

In the reduction of the power consumption by setting a state of 3-phase resonance, a resonance circuit is composed to include a capacitive load of a solid-state image pickup device such as a CCD, and the phenomenon of the resonance is interpreted as a phenomenon in which a current can be held in the resonance circuit. By driving the capacitive load in accordance with a current held in the resonance circuit, the magnitude of a current flowing from a power supply and the magnitude of a current flowing to a ground (GND) can be reduced substantially.

In the case of the 3-phase resonance circuit 10 shown in FIG. 1, for example, an impedance circuit 20 is put in a state of resonance when the currents i0, i1 or i2 flowing from one driving power supply 2 to another driving power supply 2 or the currents flowing from one node to another node are zero. That is to say, an impedance circuit 20 is put in a state of resonance when no current is supplied from one driving power supply 2 to another driving power supply 2.

In the case of a configuration in which the driving points of the 3-phase resonance circuit 10 are driven by driver circuits, the driver circuits each serve as a substitute for one of the driving power supplies 2. In this case, in order to flow a current from a specific node to another node, the output logic level generated by a driver circuit connected to the specific node is set at 1 (or an H level) whereas the output logic level generated by another driver circuit connected to the other node is set at 0 (or an L level).

In addition, in order to put a specific impedance circuit 20 of a specific phase in a state of resonance without flowing a current between nodes at both ends of the impedance circuit 20, the output logic levels generated by the driver circuits connected to the nodes are each put in a high-impedance state (referred to as a Z state). In this way, the specific impedance circuit 20 of the specific phase is put in a state of resonance through the two other impedance circuits 20 assigned to the other two phases as other impedance circuits 20 each not put in a resonance state. At that time, currents flow through the nodes each put in a high-impedance state (or a Z state). Since the impedance of the specific impedance circuit 20 assigned to the specific phase as an impedance circuit 20 put in a resonance state is high, no current flow into or out from the specific impedance circuit 20. Thus, by taking impedance circuits 20 each not put in a resonance state as a current path, transitions of the state of resonance can be made sequentially from an impedance circuit 20 of a phase to another impedance circuit 20 of another phase.

In one period of driving all the impedance circuits 20 of the three phases, transitions of the state of resonance can be made sequentially from an impedance circuit 20 of a phase to another impedance circuit 20 of another phase throughout all the impedance circuits 20 without generating a gap between the resonance states of the impedance circuits 20. That is to say, in the period, any specific one of the impedance circuits 20 is always put in a state of resonance and, in addition, a transition of the state of resonance is made sequentially from the impedance circuit 20 put in the state of resonance to the next impedance circuit 20. Thus, in order to maximize the holding of a current in the 3-phase resonance circuit 10, the output logic levels generated by the three driver circuits for driving the nodes of the 3-phase resonance circuit 10 are set in the 0, 1 or Z state. In this case, the logic levels and the phases of the logic levels must be assigned in such a way that the logic levels and the phases are prevented from overlapping with each other at every timing corresponding to a point of time. In order to generate no gap between the resonance states of the impedance circuits 20, it is necessary to set differences between the phases of the logic levels generated by the driver circuits at $2\pi/3$(rad). As described above, the output logic level generated by a driver circuit can be put in any one of the 0, 1 and Z state.

It is to be noted that the identified condition requires that the power factor be set at 1 in order to maximize the magnitude of a current that can be held in the 3-phase resonance circuit 10, hence, maximizing the effect of the power-consumption reduction. A shift from the condition to a certain degree can be tolerated. If the condition is not satisfied, however, the effect of the power-consumption reduction will deteriorate.

If the differences of $2\pi/3$(rad) between the phases of the logic levels generated by the driver circuits as output logic levels each put in the 0, 1 or Z state are not sustained, for example, the sequential transitions of the resonance state from one impedance circuit 20 having a phase to another impedance circuit 20 having another phase can no longer be made, that is, in one period, it is no longer possible to always put any specific one of the impedance circuits 20 in a state of resonance. In addition, if the phase period of the output logic level put in the Z state is made shorter, there is generated a period in which currents flow from two nodes to the remaining node or, conversely, a period in which currents flow from a node to the two other nodes. Thus, the effect of the power-consumption reduction deteriorates.

In addition, the condition identified as described above is a condition for three phases. As inferable from the study described above, however, it is generally possible to construct an n-phase LC resonance circuit employing n impedance circuits each including a capacitive device and a resonance circuit connected to the capacitive device. In this case, such an n-phase LC resonance circuit is driven into a resonance state sequentially making transitions from one impedance circuit to another. To be more specific, nodes of the n-phase LC resonance circuit are each driven to either of the 0, 1 and Z logic levels in order to put the n-phase LC resonance circuit in a resonance state sequentially making transitions from one impedance circuit to another one.

It is desirable to sustain the differences between the phases of logic levels generated for the impedance circuits at nodes in the 0, 1 and Z states at $2\pi/n$(rad) in order to assign the logic levels and the phases of the logic levels in such a way that the logic levels and the phases are prevented from overlapping with each other at every timing corresponding to a point of time.

That is to say, for n phases of a general n-phase LC resonance circuit, the differences between the phases of logic levels generated by driver circuits for driving the nodes of the n-phase LC resonance circuit are each set at $2\pi/n(\text{rad})$ in order to maximize the magnitude of a current that can be held in the n-phase LC resonance circuit, hence, minimizing the power consumption.

<Connections Between a 3-Phase LC Resonance Circuit and its Driving Power Supplies>

Figure 4A:
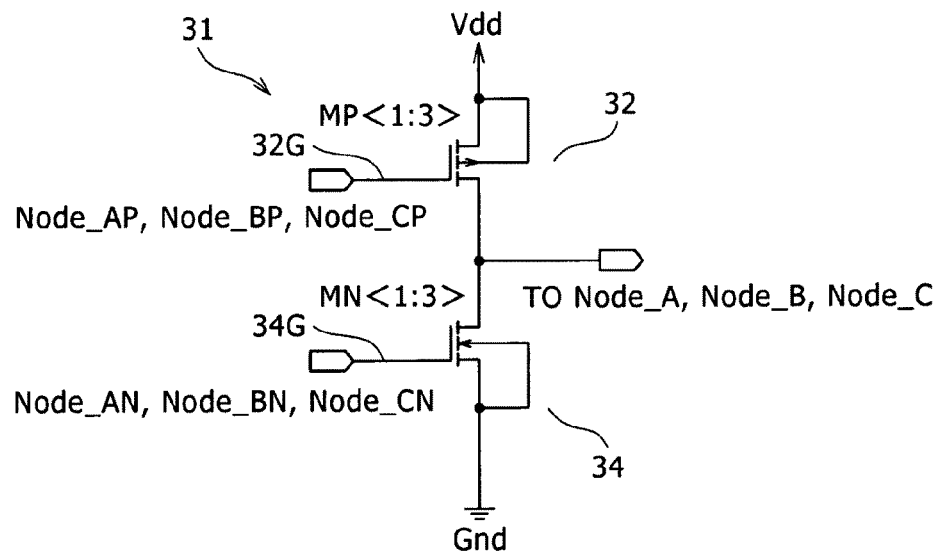
FIG. 4A is an explanatory diagram showing a typical state of connections of a power supply and a 3-phase resonance circuit.
Figure 4B:
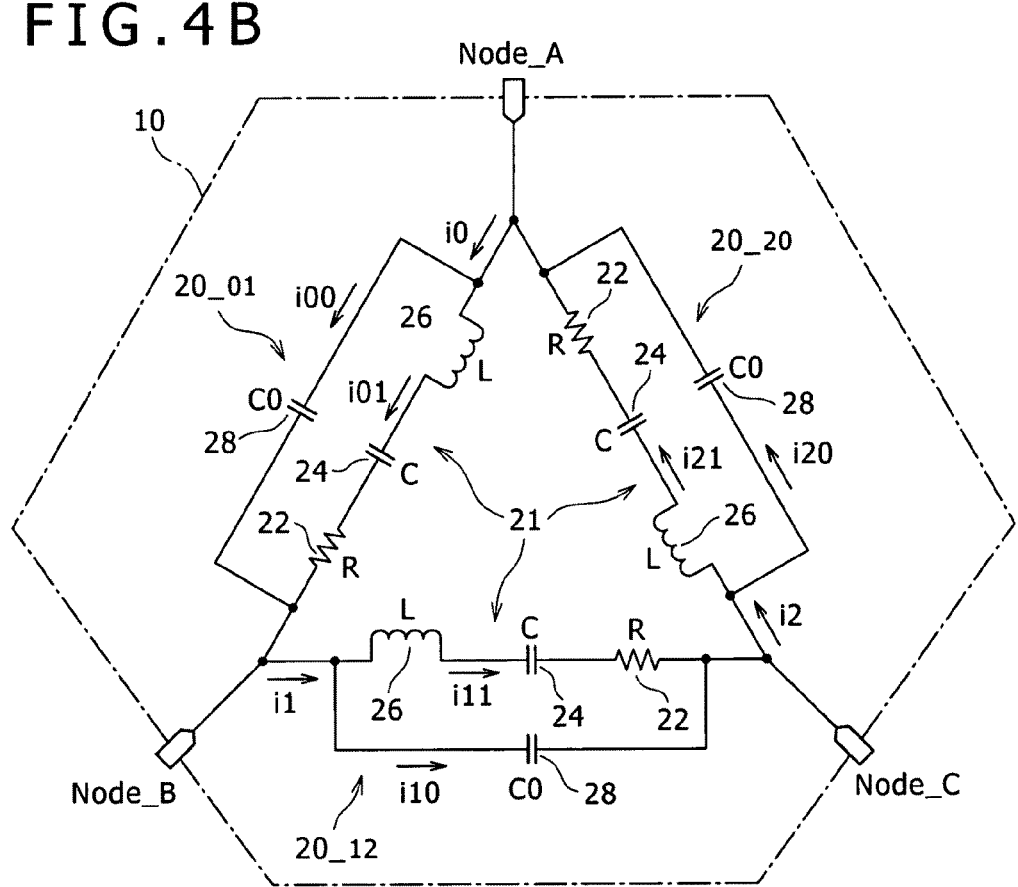
FIG. 4B is an explanatory diagram to be referred to in conjunction with FIG. 4A as a diagram showing a typical state of connections of the power supply and the 3-phase resonance circuit.

FIGS. 4A and 4B are diagrams showing typical connections between the 3-phase LC resonance circuit 10 and its driving power supplies 2 shown in FIG. 1. Each driver circuit 30 cited above serves as one of the driving power supplies 2. The output stage of the driver circuit 30 is connected to one of the nodes Node_A, Node_B and Node_C shown in FIG. 4B as the nodes of the 3-phase LC resonance circuit 10. It is to be noted that, in the driver circuit 30 described in this specification, the output stage is not a problem to be discussed. Instead, the output terminal of the driver circuit 30 is an element of importance. The output terminal is a terminal for supplying the 1, 0 and Z logic levels to the driving points of the 3-phase resonance circuit 10.

The output stage 31 of the driver circuit 30 has a typical configuration shown in FIG. 4A. As shown in the figure, the output stage 31 is a series circuit of a PMOS transistor 32 provided on the Vdd side of the power supply and an NMOS transistor 34 provided on the Gnd side of the power supply. The gate 32G of the PMOS transistor 32 (node Node_AP, Node_BP or Node_CP) and the gate 34G of the NMOS transistor 34 (Node_AN, Node_BN or Node_CN) are provided with driving pulses suitable for the gates 32G and 34G. The connection point between the PMOS transistor 32 and the NMOS transistor 34 is used as the output node 30_Out of the driver circuit 30. The output node 30_Out is connected to the node Node_A, Node_B or Node_C of the 3-phase resonance circuit 10 shown in FIG. 4B.

FIRST EMBODIMENT

Figure 5:
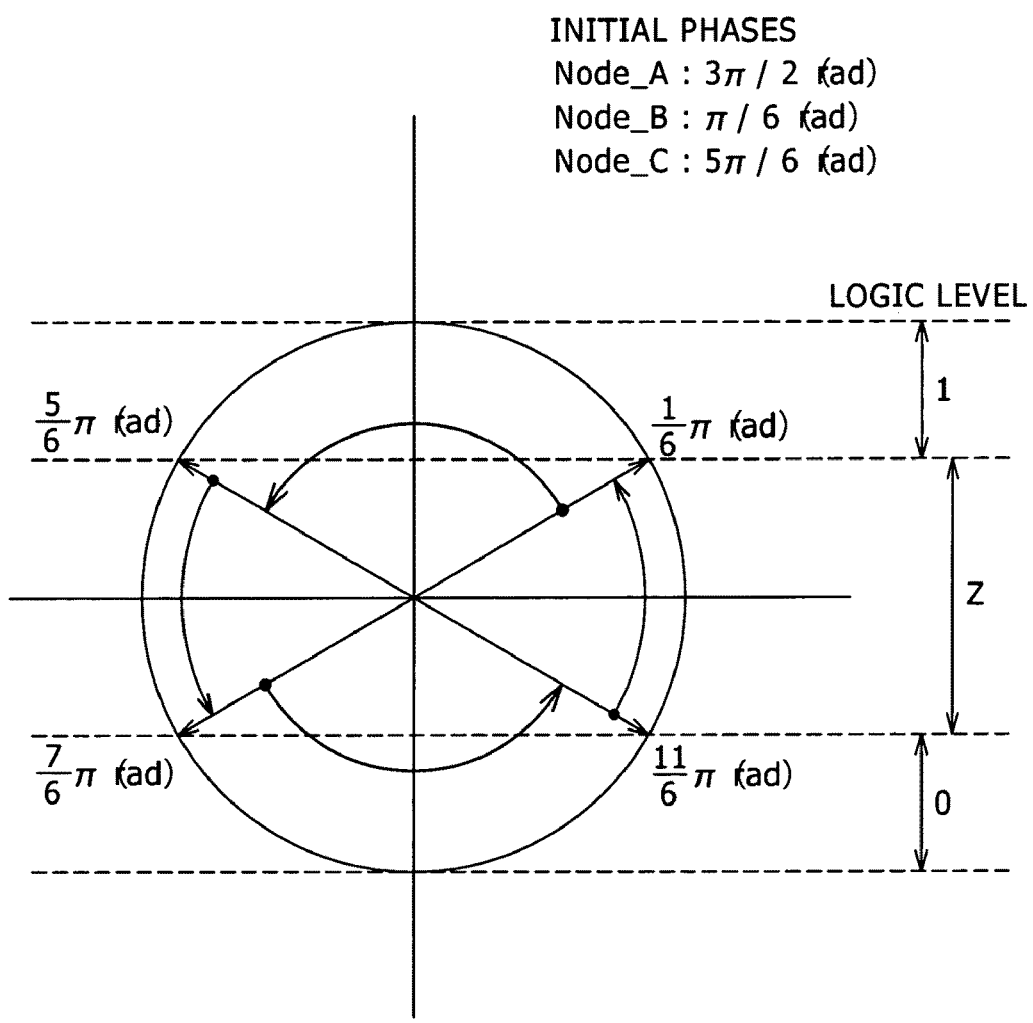
FIG. 5 is an explanatory diagram showing an operation carried out by a first embodiment to assign output logic levels of driver circuits and the phases of the logic levels to nodes of the 3-phase resonance circuit as well as driving timings.

<Assignment of Phases and Logic Levels to Nodes of the 3-Phase LC Resonance Circuit FIG. 5 is an explanatory diagram showing an operation carried out by a first embodiment to assign output logic levels of driver circuits 30 and the phases of the logic levels to nodes of the 3-phase resonance circuit 10 as well as driving timings. In accordance with the first embodiment, the magnitude of a current that can be held in the 3-phase LC resonance circuit is maximized in order to minimize a current flowing out from the power supply Vdd and current flowing to the power supply Vdd. It is thus possible to implement control timings serving as primary basics for reducing the power consumption.

The logic level of a signal output by the driver circuit 30 can be one of three levels, i.e., the 1, Z (or high impedance) and 0 levels. The logic level of a signal output by the driver circuit 30 is selected from the 3 levels in accordance with driving pulses supplied to the gates 32G and 34G as an input condition. To put it concretely, if an L-level signal is supplied to the gate 32G, the PMOS transistor 32 is turned on and, if an H-level signal is supplied to the gate 34G, the NMOS transistor 34 is turned on. If the PMOS transistor 32 and the NMOS transistor 34 are both turned on, the power supply Vdd will be shorted to the ground Gnd. Thus, it is necessary to avoid a timing, with which an operation causes both the PMOS transistor 32 and the NMOS transistor 34 to be turned on simultaneously.

When only the PMOS transistor 32 is turned on, the output node 30_Out of the driver circuit 30 is connected to the power supply Vdd, outputting a signal at the logic level of 1. When only the NMOS transistor 34 is turned on, on the other hand, the output node 30_Out of the driver circuit 30 is connected to the ground Gnd, outputting a signal at the logic level of 0. When both the PMOS transistor 32 and the NMOS transistor 34 are turned out, the output node 30_Out of the driver circuit 30 is put in a high-impedance state, outputting a signal at the Z logic level.

An operation is carried out by the first embodiment as follows. Logic levels and the phases of the logic levels are assigned to the driver circuit 30 so that, in one period, a signal output by the driver circuit 30 is set at the logic level of 1 for ⅓ periods, the logic level of Z for ⅓ periods and the logic level of 0 for ⅓ periods. That is to say, the 1, Z and 0 output logic levels generated by the driver circuit 30 as well as the phases of the logic levels are assigned to each of the nodes Node_A, Node_B and Node_C of the 3-phase resonance circuit 30 for equal periods each equal to ⅓ periods. By assigning logic levels and the phases of the logic levels in this way, each of the output logic levels of 1, Z and 0 is always assigned to one of the nodes and the output logic levels of 1, Z and 0 can be prevented from overlapping with each other.

Typical assignment of phases and logic levels is generally like one shown in FIG. 5. As shown in the figure, the logic level of 1 is assigned during the period $\pi/6(\text{rad})$ to $5\pi/6(\text{rad})$, the logic level of 0 is assigned during the period $7\pi/6(\text{rad})$ to $11\pi/6(\text{rad})$ and the logic level of Z is assigned during the remaining periods $5\pi/6(\text{rad})$ to $7\pi/6(\text{rad})$ and $11\pi/6(\text{rad})$ to $1\pi/6(\text{rad})$.

By assigning the logic level of Z to the period $\pi/6(\text{rad})$ to $5\pi/6(\text{rad})$ allocated to the logic level of 1 and the period $7\pi/6(\text{rad})$ to $11\pi/6(\text{rad})$ allocated to the logic level of 0, it is possible to avoid a timing, with which an operation causes both the PMOS transistor 32 and the NMOS transistor 34 to be turned on simultaneously during a transition from the logic level of 1 to the logic level of 0 or vice versa. It is thus possible to prevent the power supply Vdd from being shorted to the ground Gnd, causing a large current to flow in the power supply 2 and damage the PMOS transistor 32 and the NMOS transistor 34.

That is to say, if the logic level is changed from the logic level of 1 to the logic level of 0 or vice versa in a logic-level transition, both the PMOS transistor 32 and the NMOS transistor 34 may be turned on instantaneously at the same time due to characteristic variations from transistor to transistor. At that time, a through current flows, causing the current consumed by the entire circuit to increase, violating a gist of the present invention. By carrying out a driving operation to assure the lapse of a period in which both the PMOS transistor 32 and the NMOS transistor 34 are in an off state, this problem can be solved.

Of course, it is also possible to carry out a driving operation without assuring the lapse of a period in which both the PMOS transistor 32 and the NMOS transistor 34 are in an off state during a transition from the logic level of 1 to the logic level of 0 or vice versa. In addition, in this embodiment, the period in which both the PMOS transistor 32 and the NMOS transistor 34 are in an off state has a length of $\pi/3(\text{rad})$. However, the length of $\pi/3(\text{rad})$ is no more than an example of the period length. That is to say, the length of the period can be set freely at any value.

Let the initial phases of the nodes Node_A, Node_B and Node_C be set at $3\pi/2$(rad), $\pi/6$(rad) and $5\pi/6$(rad) respectively. That is to say, the initial phases of the three power supplies 2 (V0, V1 and V2) are shifted from each other by $2\pi/3$(rad). It is needless to say that the initial phases of the nodes Node_A, Node_B and Node_C are each no more than an initial value. That is to say, the phases θ can each be set at any other arbitrary value as long as the initial phases are shifted from each other by $2\pi/3$(rad). For example, the initial phases can be shifted each for $2\pi/3$(rad).

By sustaining the difference in phase between nodes at 120 degrees and setting the output logic level of each of the driver circuits 30 at the logic level of 0, 1 or Z or as described above, it is possible to assign logic levels and the phases of the logic levels so that the phases and the logic levels are prevented from overlapping with each other at every timing corresponding to a point of time. By doing so, the holding of a current in the 3-phase resonance circuit 10 can be maximized and the power consumption can hence be minimized.

The driving points of the n-phase LC resonance circuit are connected to the outputs of their respective driver circuits and the n-phase LC resonance circuit is driven in such a way that a current can be held in the n-phase LC resonance circuit. Thus, currents flowing out from the power supplies of the driver circuits can be suppressed effectively and the power consumption can therefore be reduced much in comparison with the configurations described in references 1 to 3.

In the case of a configuration in which a horizontal driver circuit is used to drive a horizontal CCD employed in a CCD image pickup device, for example, the driving frequency is high, raising a problem of increased power consumption accompanying electrical charging and discharging processes in an operation to drive the horizontal CCD at a high speed. However, the application of this embodiment will much contribute to a solution to the problem.

The technologies described in Document 1 to 4 are applied to a configuration in which the output logic level of a driver circuit for driving a charge-coupled device has only two states, i.e., the logic levels of 0 and 1. The references do not describe a technique for reducing power consumption at all, that is, a technique to reduce power consumption by introducing a high-impedance (Z) state to the output of the driver circuit, setting the output logic level of the driver circuit at 3 states, i.e., states of 1, Z and 0 and devising control timings of operations to set the output logic level of the driver circuit at the states of 1, Z and 0. In this respect, a configuration proposed as the embodiment establishing proper control timings has a very great effect.

Figure 6:
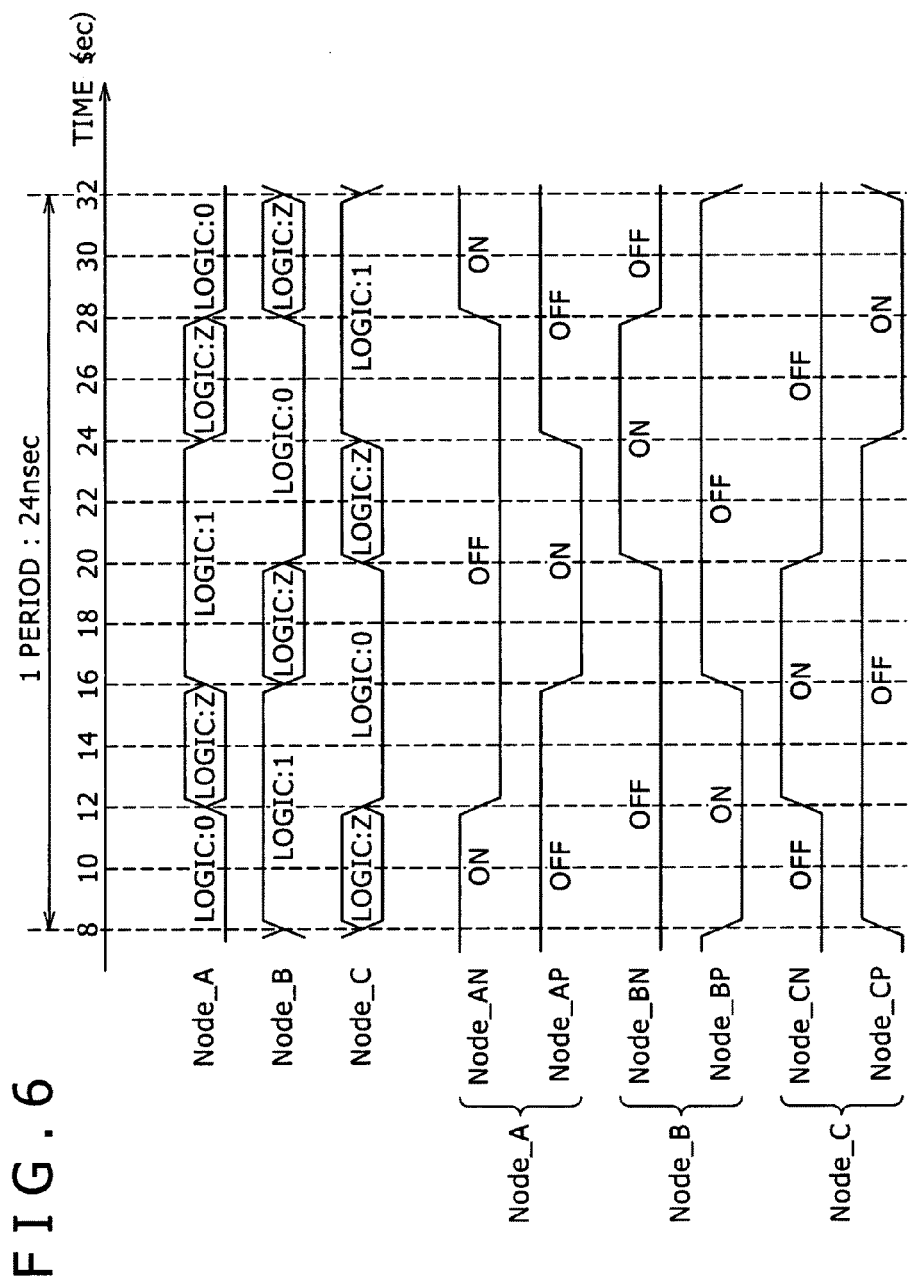
FIG. 6 is a diagram showing typical control timings derived from the logic levels shown in FIG. 5 and the phases shown in the same figure as control timings of a driver circuit shown in FIG. 4A.

FIG. 6 is a diagram showing driving pulses supplied to the gate 32G (serving as the node Node_AP, Node_BP or Node_CP) and the gate 34G (serving as the node Node_AN, Node_BN or Node_CN) as pulses derived from assignment shown in FIG. 5 as assignment of logic levels and the phases of the logic levels as well as showing typical control timings determined by the driving pulses as timings for the nodes Node_A, Node_B and Node_C of the 3-phase resonance circuit 10. The gates 32G and 34G are respectively the gates of the PMOS transistor 32 and the NMOS transistor 34, which are employed in the driver circuit 30 as shown in FIG. 4A. In the diagram of FIG. 6, one period has a length of 24 nsec sandwiched by a time corresponding to 8 nsec and a time corresponding to 32 nsec. During the period of 24 nsec, the phase advances by 360 degrees. That is to say, the phase advances by 15 degrees per 1 nsec.

Of course, the control timings for the nodes Node_A, Node_B and Node_C are no more than typical timings. That is to say, the initial phases of the logic levels generated with the control timings for the nodes Node_A, Node_B and Node_C can be shifted by a multiple of $2\pi/3$ while sustaining the relations between the control timings of the three nodes. For example, the control timings assigned to the nodes Node_A, Node_B and Node_C as shown in the figure can be reassigned to the nodes Node_C, Node_A and Node_B respectively.

Figure 8A:
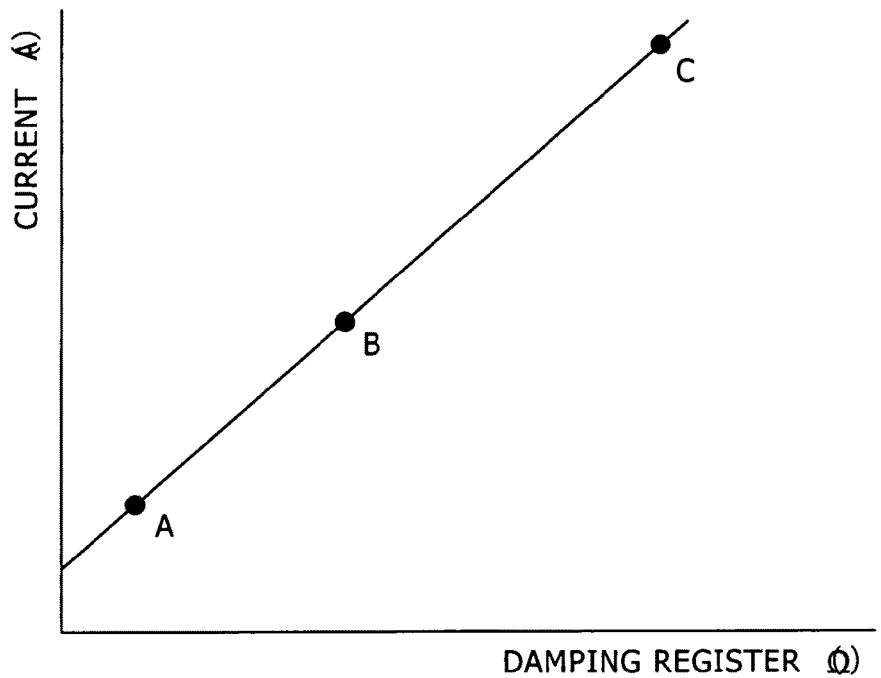
FIG. 8A is a diagram showing dependence on a damping resistor as damping-resistor dependence used for explaining an effect of an operation carried out by the driver circuit to assign output logic levels and the phases of the logic levels in accordance with the first embodiment.
Figure 8B:
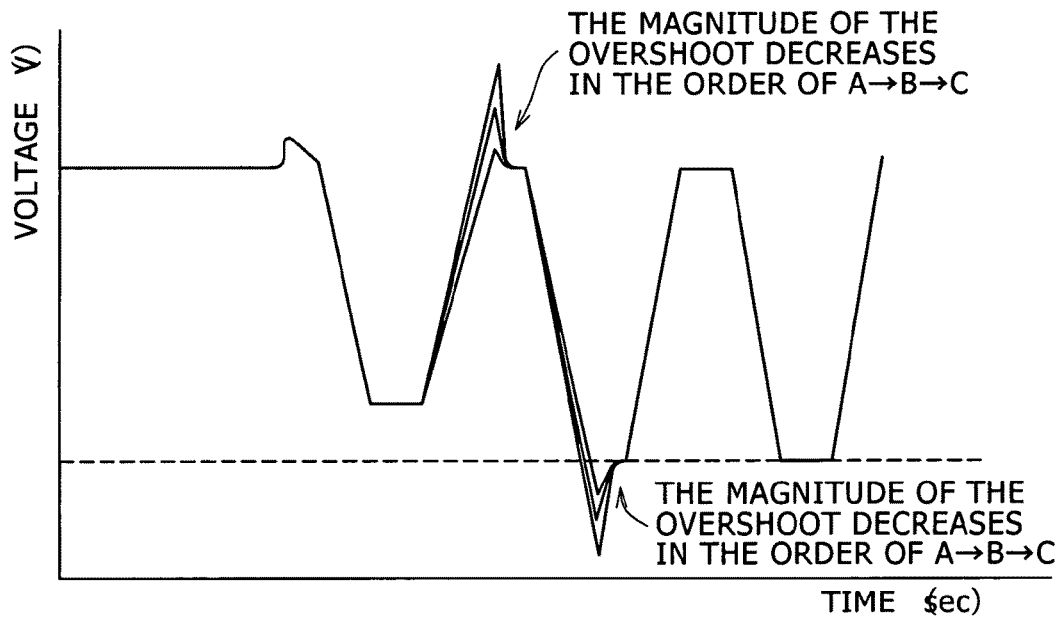
FIG. 8B is a diagram showing dependence on a damping resistor as damping-resistor dependence used for explaining an effect of an operation carried out by the driver circuit to assign output logic levels and the phases of the logic levels in accordance with the first embodiment in conjunction with the damping-resistor dependence shown in FIG. 8A.

FIGS. 7 to 8B are each an explanatory diagram referred to in description of effects provided by an operation to assign output logic levels generated by the driver circuit 30 and the phases of the logic levels in accordance with the first embodiment. To be more specific, FIG. 7 is a diagram showing output responses generated by the driver circuit 30 in an operation to control the 3-phase resonance circuit 10 with the control timings shown in FIG. 6 as the control timings of the driver circuit 30. On the other hand, FIGS. 8A and 8B are each a diagram showing dependence on a damping resistor as dependence of the output responses shown in FIG. 7.

If the driver circuit 30 is controlled with the driving timings shown in FIG. 6, the following demerits are obtained undesirably. The demerits are a state denoted by reference numeral 60 at an initial driving time as a state of an insufficient driving power and an overshoot 61 as shown in FIG. 7. As a steady state 62 starts, however, the shapes of the waveforms become smooth and the magnitude of a consumed current can be reduced to a small value. Unlike the configuration described in Document 6, 1 or more excessive pulses of any one of clock signals are supplied in order to eliminate the need to assure the driving power. It is obvious that the control timings according to the first embodiment are effective for reducing the steady-state currents of the driver circuit 30.

In the case of a driver circuit provided for a CCD, on the other hand, the initial driving power inefficiency 60 and the overshoot 61 causing a miss in a charge transfer in a CCD are each seen as a problem. In order to solve the problem of an overshoot 61, a damping resistor having a slightly large resistance is used to give effects like ones shown in FIGS. 8A and 8B. That is to say, by employing such a damping resistor, the magnitude of a current held in the 3-phase resonance circuit 10 can be reduced and, as a result, the overshoot can be suppressed.

This technique is equivalent to an operation to suppress an overshoot by making use of a current flowing to the driving power supply 2. However, since a damping resistor serves as a barrier to an effort to hold of a current in the 3-phase resonance circuit 10, the damping resistor has a demerit that, in an effort to suppress an overshoot, the current consumption increases to a certain degree, that is, the steady-state current increases.

FIG. 9 is a diagram showing a concrete typical configuration of the driver circuit 30 for assigning output logic levels and the phases of the logic levels in accordance with the first embodiment. As shown in FIG. 9, in the driver circuit 30, the outputs of which are connected to the driving points of the 3-phase resonance circuit 10, each of the output stages of the driver circuit 30 is always put at the logic level of 0, 1, or Z, and a logic level appearing at one of the output stages never overlaps with the same logic level appearing at another output stage. Thus, the driver circuit 30 shown in the figure is a typical logic circuit capable of implementing the control timings shown in FIG. 6 as control timings derived from the assignment shown in FIG. 5 as assignment of logic levels and the phases of the logic levels.

In this case, the typical logic circuit serving as the driver circuit 30 is constructed from a digital circuit such as an FPGA (Flexible Programmable Gate Array). To put it concretely, a node control circuit (Node_Control) 100 for controlling the gate 32G of the PMOS transistor 32 and the gate 34G of the NMOS transistor 34 employs a delay circuit (Delay_Logic) 110, a D flip-flop (D-FF) 120 and a register circuit 130. Reference numeral 100 for denoting the node control circuit has a suffix indicating the node with which the control circuit is associated. The delay circuit 110 is a circuit for delaying a reference clock signal CLK by a time delay determined in advance. The D flip-flop 120 is a flip-flop operating in accordance with a clock signal a received at a clock pin CK from the delay circuit 110 as a clock signal delayed by the delay circuit 110. The register circuit 130 is a circuit for supplying either the H (Vdd) level or the L (Gnd) level to a D input pin of the D flip-flop 120 in accordance with the phases assigned with the control timings shown in FIG. 6.

The Q uninverted output pin of the D flip-flop 120 is connected to the gate 32G (serving as the node Node_AP, Node_BP or Node_CP) of the PMOS transistor 32 included in the output portion of the driver circuit 30 as well as the gate 34G (serving as the node Node_AN, Node_BN or Node_CN) of the NMOS transistor 34 also included in the same output portion.

As described above, the clock signal a supplied to the clock pin CK of the D flip-flop 120 is a signal delayed by the delay circuit 110 by a time delay determined in advance. For example, the clock signal a supplied to the clock pin CK of the D flip-flop 120 is delayed by the delay circuit 110 by a time unit equal to $\frac{1}{12}$ times one period T (=24 nsec) shown in FIG. 6.

Also as described above, the register circuit 130 sets either the H (Vdd) level or the L (Gnd) level supplied to a D input pin of the D flip-flop 120 in accordance with the logic levels assigned with the control timings shown in FIG. 6, that is, in accordance with the delayed clock signal a supplied to the clock pin CK. To put it concretely, the register circuit 130 includes a 2-input/1-output switch 132 and a register 134. The 2-input/1-output switch 132 is a switch having 2 input terminals and 1 output terminal. The input terminals of the 2-input/1-output switch 132 are connected to the H (Vdd) level and the L (Gnd) level respectively. On the other hand, the output terminal of the 2-input/1-output switch 132 is connected to the D input pin of the D flip-flop 120. The register 134 is used for storing a value indicating the H (Vdd) level or the L (Gnd) level in accordance with an assigned logic level. The 2-input/1-output switch 132 is controlled to select one of the two inputs in accordance with a value stored in the register 134.

The value set in the register 134 is data having a length of 12 bits. This is because the value set in the register 134 is associated with the logic levels assigned with the timings shown in FIG. 6 in accordance with control to delay the clock signal a by a time unit equal to $\frac{1}{12}$ times one period T (=24 nsec). Typically, a period of 2 nsec is associated with each bit of the 12-bit data with the 8 nsec side shown in FIG. 6 taken as the most significant bit and the 32 nsec side shown in FIG. 6 taken as the least significant bit.

It is to be noted that the configuration shown in FIG. 9 as a typical configuration of the driver circuit 30 according to the first embodiment is no more than an example of the logic circuit for implementing the control timings shown in FIG. 6 as control timings according to the first embodiment. That is to say, the configuration of a logic circuit for implementing the control timings according to the first embodiment is by no means limited to this typical configuration. As a matter of fact, there are a number of logic circuits that can be used for implementing the control timings according to the first embodiment. It is possible to construct a logic circuit for carrying out the same functions as the typical logic circuit shown in FIG. 9 by making use of an FPGA or the like.

SECOND EMBODIMENT

Figure 10A:
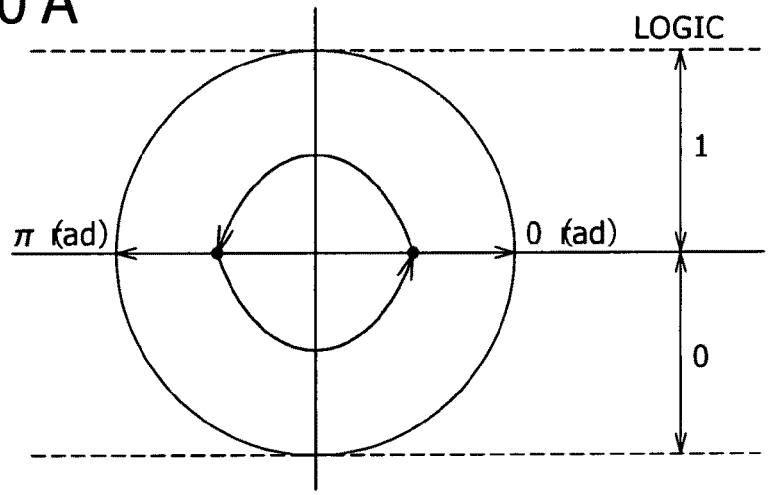
FIG. 10A is an explanatory diagram showing an operation carried out by a second embodiment to assign output logic levels of driver circuits and the phases of the logic levels to nodes of the 3-phase resonance circuit as well as driving timings.
Figure 10B:
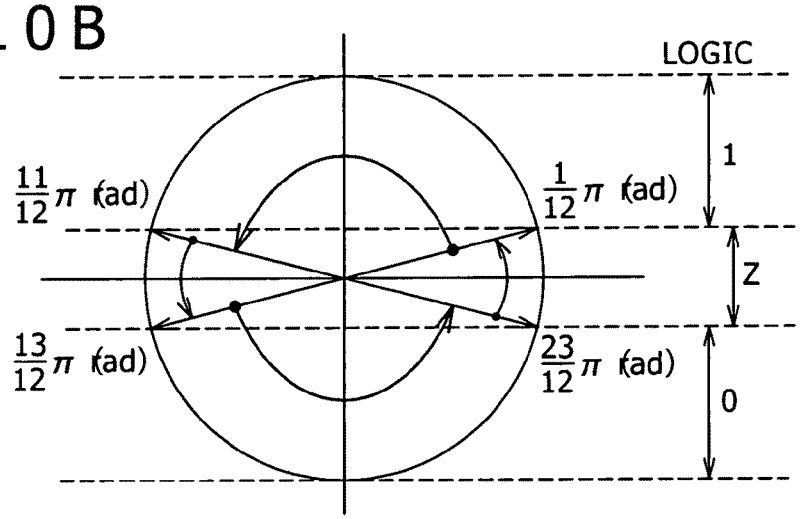
FIG. 10B is an explanatory diagram showing an operation carried out by the second embodiment to assign output logic levels of driver circuits and the phases of the logic levels to nodes of the 3-phase resonance circuit as well as driving timings.
Figure 10C:
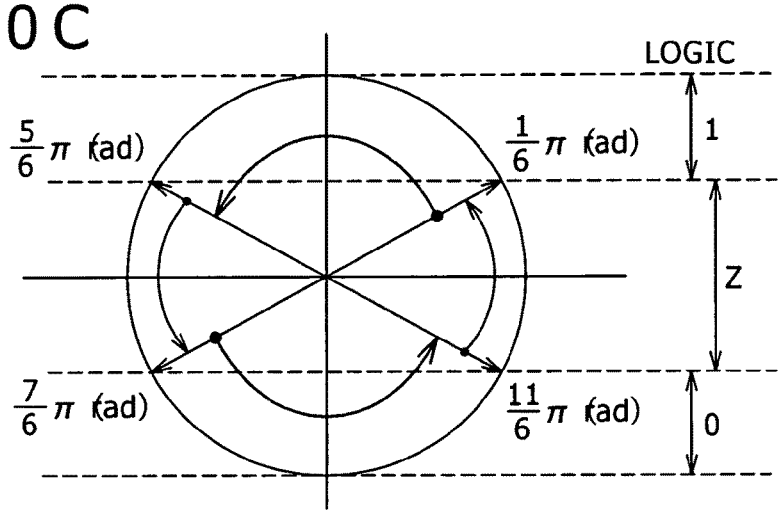
FIG. 10C is an explanatory diagram showing an operation carried out by the second embodiment to assign output logic levels of driver circuits and the phases of the logic levels to nodes of the 3-phase resonance circuit as well as driving timings.

Assignment of Phases and Logic Levels to Nodes of the 3-Phase LC Resonance Circuit FIGS. 10A to 10C are each an explanatory diagram showing an operation carried out by a second embodiment to assign output logic levels of driver circuits 30 and the phases of the logic levels to nodes of the 3-phase resonance circuit 10 as well as driving timings. The second embodiment is an embodiment for damping an overshoot, which is generated with a control timing according to the first embodiment, by adoption of a technique making use of no damping resistor. To put it concretely, the second embodiment is characterized in that, by devising the control timings of the driver circuit 30, the performance of the 3-phase resonance circuit 10 can be improved. In addition, the second embodiment is also characterized in that the insufficiency of the initial driving power is also reduced.

To put it even more concretely, the control timings of the driver circuit 30 are devised in order to increase a current flowing out from the power supply Vdd during an initial period of several cycles and suppress an overshoot. In addition, by providing no high-impedance period initially, the initial driving power can be prevented from becoming insufficient and, after the stages of suppressing the overshoot and avoiding the insufficiency of the initial driving power, the current flowing from the power supply Vdd is reduced so as to maximize a current held in the 3-phase resonance circuit 10.

The technique according to this embodiment can be implemented by providing the step of sequentially changing assignment of logic levels and the phases of the logic levels during a period starting from an initial stage and ending at a steady-state stage while sustaining the difference between phases at 120 degrees. If a step is associated with a stage, the number of steps can be set at 2 so that the steps are capable of providing at least the initial stage and the steady-state stage. During an initial period of several cycles, a current flowing out from the power supply Vdd is increased, an overshoot is suppressed and the initial driving power is prevented from becoming insufficient. After the stage of increasing the current flowing out from the power supply Vdd, suppressing the overshoot and preventing the initial driving power from becoming insufficient, the steady-state stage is started in order to reduce the current flowing from the power supply Vdd.

In addition, in order to make a smooth transition from the stage of increasing the current flowing out from the power supply Vdd, suppressing the overshoot and preventing the initial driving power from becoming insufficient by gradually reducing the current flowing from the power supply Vdd, the assignment of logic levels and the phases of the logic levels is changed gradually at 3 or more steps.

In the case of the second embodiment, in order to make an even smoother transition, three stages are provided. The three stages are a stage of increasing the current flowing out from the power supply Vdd, a stage of suppressing the overshoot and a stage of preventing the initial driving power from becoming insufficient during an initial period of several cycles. With the three stages, it is possible to gradually reduce the current flowing from the power supply Vdd.

To put it concretely, first of all, logic levels and the phases of the logic levels are assigned respectively as logic levels and phases for the initial stage (or the first stage). That is to say, during one full period, the output logic levels generated by the driver circuit 30 and the phases of the logic levels are sequentially assigned in a prepared order of assignments. In the prepared order of assignments, the logic level is set 1 for the earlier ½ periods, the logic level of Z is set for 0 period and the logic level of 0 is set for the later ½ periods. For example, as shown in FIG. 10A, the logic level of 1 is assigned to the period 0(rad) to π(rad) and the logic level of 0 is assigned to the period π(rad) to 0 (=2π)(rad).

Let us assume that initial phases for the nodes Node_A, Node_B and Node_C are assigned as follows. Much like the first embodiment, the initial phases for the nodes Node_A, Node_B and Node_C are set at 3π/2(rad), π/6(rad) and 5π/6 (rad) respectively. In this case, in a state shown in FIG. 10A, two currents flow from the two nodes Node_B and Node_C to the node Node_A. As the phases assigned to all the nodes advance by π (or 180 degrees), two currents start to flow from the node Node_A to the two nodes Node_B and Node_C respectively. The flowing of these two currents from one node to two nodes or vive versa at that time means an increase in power consumption.

Then, at the second stage, assignments of logic levels and the phases of the logic levels are prepared to set the logic level of 1 for 5/12 periods, the logic level of Z for ⅙ periods and the logic level of 0 for 5/12 periods. For example, as shown in FIG. 10B, the logic level of 1 is assigned to the period π/12(rad) to 11π/12(rad) and the logic level of 0 is assigned to the period 13π/12(rad) to 23π/12(rad). The logic level of Z is assigned to the remaining periods, i.e., the period 11π/12(rad) to 713π/12(rad) and the period 23π/12(rad) to 1π/12(rad).

Since the period of the Z (high impedance) logic level is longer than that of the initial stage shown in FIG. 10A, the period in which two currents flow from one node to two nodes or from two nodes to one node becomes shorter, slightly reducing the power consumption.

Then, at the third stage, assignments of logic levels and the phases of the logic levels are prepared to set the logic level of 1 for ⅓ periods, the logic level of Z for ⅓ periods and the logic level of 0 for ⅓ periods. For example, as shown in FIG. 10C, the logic level of 1 is assigned to the period π/6(rad) to 5π/6(rad) and the logic level of 0 is assigned to the period 7π/6(rad) to 11π/6(rad). The logic level of Z is assigned to the remaining periods, i.e., the period 5π/6(rad) to 7π/6(rad) and the period 11π/6(rad) to 1π/6(rad). As is obvious from the description of the first embodiment, by executing the third stage, the power consumption can be reduced to a small value.

At the second and third stages, the logic level of Z is assigned to a period between periods allocated to the logic levels of 0 and 1. In this way, the PMOS transistor 32 and the NMOS transistor 34, which are connected in series to each other, can be prevented from being both turned on at the same time. Thus, a through current is prevented from flowing. In this respect, the second embodiment is identical with the first embodiment. It is to be noted that, also at the first stage, the logic level of Z can also be assigned to a short period between periods allocated to the logic levels of 0 and 1 in order to prevent the PMOS transistor 32 and the NMOS transistor 34 from being damaged while, at the same time, reducing the magnitude of an overshoot.

As described above, a sequential transition is made from the assignment state shown in FIG. 10A as the state of assignment of logic levels at the initial stage to the assignment state shown in FIG. 10C as the state of assignment of logic levels at the steady-state stage by way of the assignment state shown in FIG. 10B as the state of assignment of logic levels at the intermediate stage. As is obvious from this transition of assignment states, in order to implement the transition technique, the period set between the periods allocated the logic levels of 0 and 1 as a period allocated to the logic level of Z needs to be widened progressively.

FIG. 11 is a diagram showing driving pulses supplied to the gate 32G (serving as a node Node_AP, Node_BP or Node_CP) and the gate 34G (serving as a node Node_AN, Node_BN or Node_CN) as pulses derived from assignment shown in FIGS. 10A to 10C as assignment of logic levels and the phases of the logic levels as well as showing typical control timings determined by the driving pulses as timings for the nodes Node_A, Node_B and Node_C of the 3-phase resonance circuit 10. The gates 32G and 34G are the gates of the PMOS transistor 32 and the NMOS transistor 34, which are employed in the driver circuit 30 as shown in FIG. 4A. Much like the diagram of FIG. 6, in the diagram of FIG. 11, one period has a length of 24 nsec sandwiched by a time corresponding to 8 nsec and a time corresponding to 32 nsec. During the period of 24 nsec, the phase advances by 360 degrees.

Control timings indicated by dashed lines A shown in FIG. 11 correspond to the assignment shown in FIG. 10A as the assignment of logic levels at the initial stage. If the driver circuit 30 is controlled with the control timings indicated by the dashed lines A, a current flowing from the power supply Vdd increases, allowing simultaneous implementation of both the suppression of an overshoot appearing on the waveform of a signal output by the driver circuit 30 and the prevention of the initial driving power from decreasing. Control timings indicated by dashed lines B shown in FIG. 11 correspond to the assignment shown in FIG. 10B as the assignment of logic levels at the intermediate stage immediately following the initial stage. After a transition is made from the control timings indicated by the dashed lines A to the control timings indicated by the dashed lines B, the current flowing from the power supply Vdd decreases. Control timings indicated by dashed lines C shown in FIG. 11 correspond to the assignment shown in FIG. 10C as the assignment of logic levels at the steady-state stage immediately following the intermediate stage. After a transition is made from the control timings indicated by the dashed lines B to the control timings indicated by the dashed lines C, a current held in the 3-phase resonance circuit 10 is maximized and a steady-state current is minimized, allowing the power consumption to be reduced to a minimum value.

As described above, when the transitions are made gradually in order to reduce the steady-state current while allowing simultaneous implementation of both the suppression of an overshoot appearing on the waveform of a signal output by the driver circuit 30 and the prevention of the initial driving power from decreasing, it is not necessary to take a long initial stage as will be explained in detail later in description of a third embodiment. Thus, the state of the first stage shown in FIG. 10A and represented by the dashed lines A shown in FIG. 11 is implemented for some cycles of the clock signal and, then, a sequential transition is made to the third stage shown in FIG. 10C and represented by the dashed lines C shown in FIG. 11 through the second stage shown in FIG. 10B and represented by the dashed lines B shown in FIG. 11. In the steady state established at the third stage, it is possible to minimize the power consumption while suppressing an overshoot without increasing the steady-state current.

As described above, the steady state is obtained by making sequential transitions from the first (initial) stage to the third (steady-state) stage in order to change assignment of logic levels output by the driver circuit 30 and the phases of the logic levels. It is to be noted that the number of stages through which the transitions are to be made to reach the steady state can be increased. If control is executed at such a number of stages, it is possible to almost continuously change assignment of logic levels output by the driver circuit 30 and the phases of the logic levels.

FIG. 12 is a diagram showing a concrete typical configuration of the driver circuit 30 for implementing the assignment of output logic levels and the phases of the logic levels in accordance with the second embodiment. As is obvious from FIGS. 10A to 11, it is nice to be able to drive the 3-phase resonance circuit 10 with the control timings corresponding to the assignment of logic levels at every stage. In a simplest configuration, the output logic levels and their phases of the logic levels are prepared in advance for each of the driver circuits 30 and an output logic level of every driver circuit 30 is selected in accordance with a transition from a stage to another.

For example, as shown in FIG. 12, each of the driver circuits 30 is provided with the following circuits:

a first-stage driver circuit 30_1 for driving the 3-phase resonance circuit 10 with the control timings shown by the dashed lines A in FIG. 11 as timings corresponding to the assignment shown in FIG. 10A as assignment of logic levels for the first stage;

a second-stage driver circuit 30_2 for driving the 3-phase resonance circuit 10 with the control timings shown by the dashed lines B in FIG. 11 as timings corresponding to the assignment shown in FIG. 10B as assignment of logic levels for the second stage; and a third-stage driver circuit 30_3 for driving the 3-phase resonance circuit 10 with the control timings shown by the dashed lines C in FIG. 11 as timings corresponding to the assignment shown in FIG. 10C as assignment of logic levels for the second stage.

Logic levels output by the first-stage driver circuit 30_1, the second-stage driver circuit 30_2 and the third-stage driver circuit 30_3 are supplied to a selection circuit (or a selector) 40, which is driven by a control signal CN1 for controlling the transition from a stage to another. Since an operation carried out by the selection circuit 40 is controlled by the control signal CN1, the selection circuit 40 is capable of sequentially selecting one of the logic levels output by the first-stage driver circuit 30_1, the second-stage driver circuit 30_2 and the third-stage driver circuit 30_3 in the following order: the first-stage driver circuit 30_1→the second-stage driver circuit 30_2→the third-stage driver circuit 30_3. By selecting a logic level in this order, the control timings of the driver circuit 30 according to the second embodiment make sequential transitions in the following order: the initial stage (or the first stage)→the intermediate stage (or the second stage)→the steady-state stage (or the third stage).

It is to be noted that the configuration shown in FIG. 12 as a typical configuration of the driver circuit 30 according to the second embodiment is no more than an example of the control circuit for implementing the control timings shown in FIG. 11 as control timings according to the second embodiment. That is to say, the control circuit for implementing the control timings shown in FIG. 11 is by no means limited to the configuration shown in FIG. 12. As a matter of fact, there are a number of control circuits that are capable of implementing the control timings shown in FIG. 11. It is possible to construct a logic circuit for carrying out the same functions as the typical logic circuit shown in FIG. 12 by making use of an FPGA or the like. In addition, the switching function of the logic circuit can also be carried out by making use of an FPGA or the like.

On top of that, one of the logic levels output by the first-stage driver circuit 30_1, the second-stage driver circuit 30_2 and the third-stage driver circuit 30_3 is selected in each of sequential transitions from the initial stage serving the first one of the 3 stages to the steady-state stage serving as the third one of the 3 stages so as to make the selected logic level agree with the assignments shown in FIGS. 10A to 10C as assignments of logic levels and the phases of logic levels and agree with the control timings shown in FIG. 11. However, the number of stages through which the transitions are to be made to reach the steady state can be increased. If control is executed at such a number of stages, it is possible to almost continuously change assignment of logic levels output by the driver circuit 30 and the phases of the logic levels. In this case, however, it is necessary to provide as many driver circuits 30_n as stages, the number of which is n. Thus, this technique has a demerit of a large circuit scale. Nevertheless, in comparison with a third embodiment requiring analog circuits such as a signal generation circuit and a comparison circuit in the circuit configuration thereof as will be described later, the logic circuit according to the second embodiment has a merit that the circuit is a digital circuit, which can be realized by making use of an FPGA.

THIRD EMBODIMENT

Figure 13:
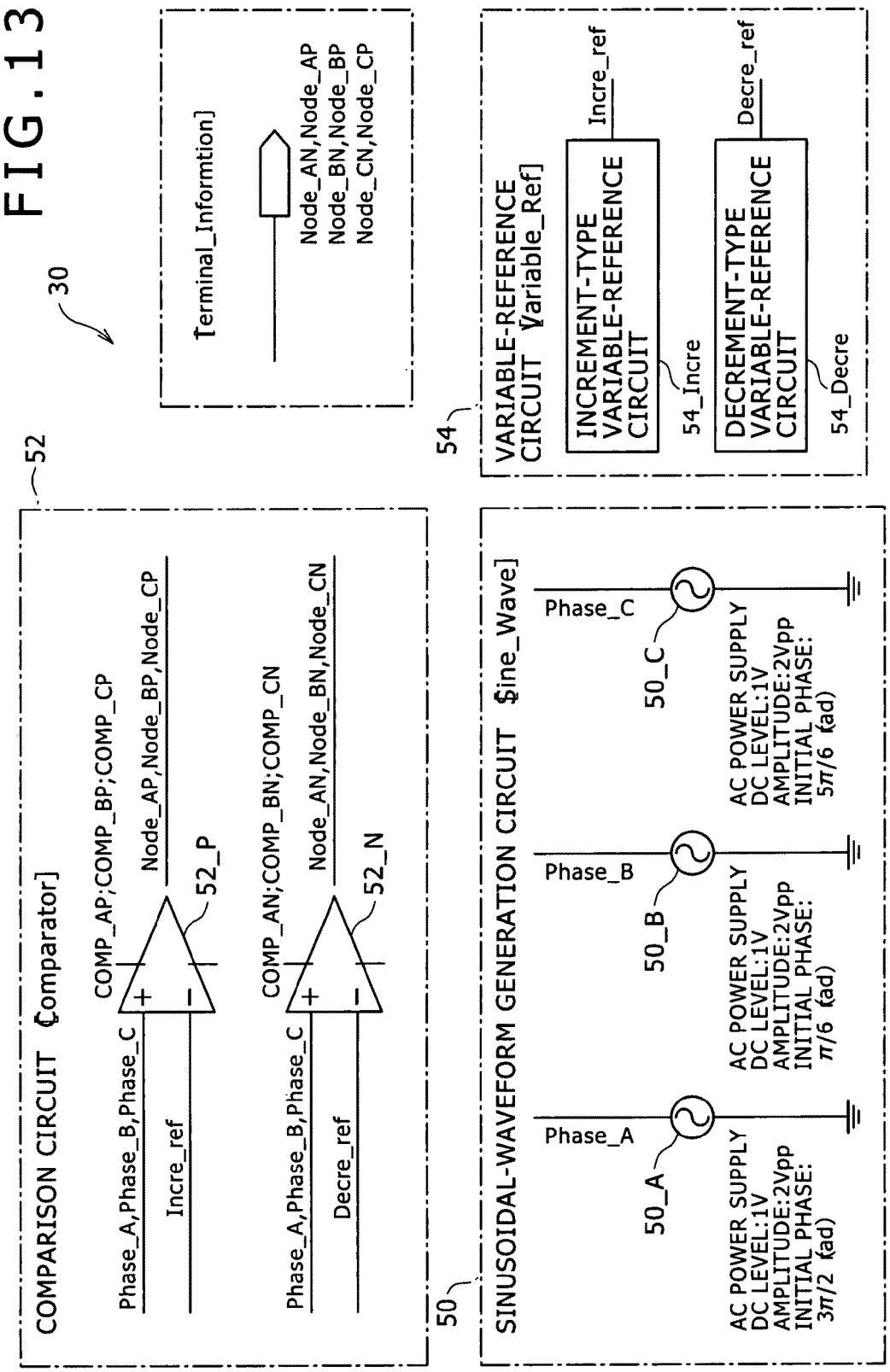
FIG. 13 is an overall diagram showing a typical concrete configuration of a driver circuit provided by a third embodiment as a driver circuit for continuously changing assignments of output logic levels and the phases of the logic levels.
Figure 14:
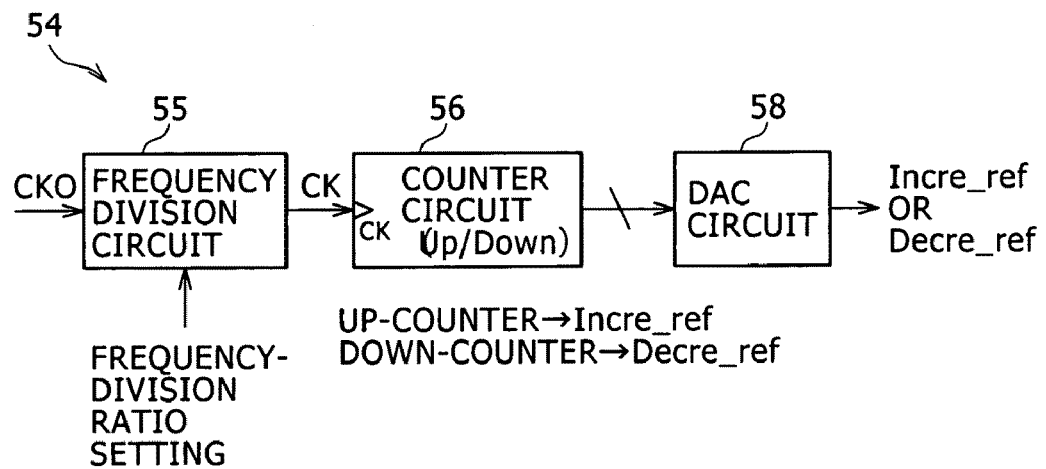
FIG. 14 is a diagram showing a variable reference circuit 54 employed in the driver circuit according to the third embodiment.
Figure 15:
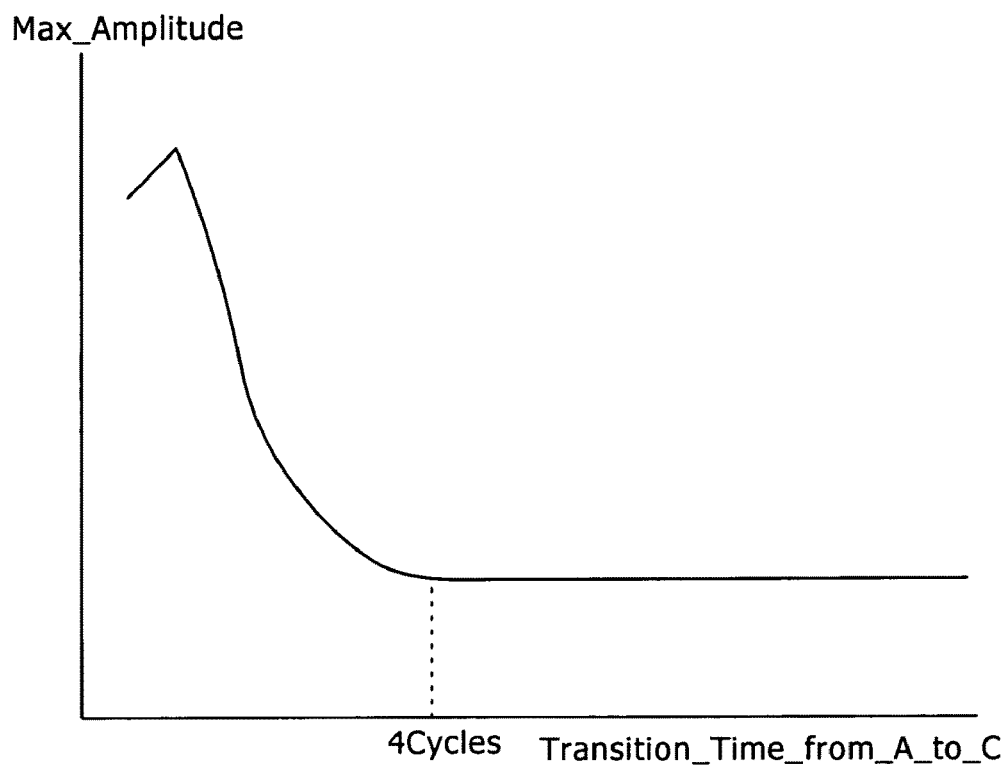
FIG. 15 is an explanatory diagram to be referred to in description of an effect of control executed by the driver circuit according to the third embodiment.

Assignment of Phases and Logic Levels to Nodes of the 3-Phase LC Resonance Circuit FIGS. 13 to 15 are each an explanatory diagram showing an operation carried out by a third embodiment to assign output logic levels of driver circuits 30 and the phases of the logic levels to nodes of the 3-phase resonance circuit 10 as well as driving timings. As a function common to the second and third embodiments, an operation is carried out to devise control timings of the driver circuit 30 in order to reduce the power consumption while allowing simultaneous implementation of both the suppression of an overshoot appearing on the waveform of a signal output by the driver circuit 30 and the prevention of the initial driving power from decreasing. Unlike the second embodiment in which the control timings make transitions gradually, the third embodiment is characterized in that the control timings make a continuous transition from the initial stage to the steady-state stage in order to change the assignment of the logic levels and the phases of the logic levels in essentially a continuous manner.

FIGS. 13 and 14 are diagrams showing a concrete typical configuration of the driver circuit 30 provided by the third embodiment as a driver circuit for continuously changing assignments of output logic levels and the phases of the logic levels. To be more specific, FIG. 13 is a diagram showing an entire outline of the typical configuration. On the other hand, FIG. 14 is a diagram showing a variable reference circuit employed in the driver circuit 30 according to the third embodiment.

The entire outline employs periodical-signal generation circuits each used for generating a signal changing periodically. The periodical signals each generated by one of the periodical-signal generation circuits have a phase shift of 120 degrees between the signals. A voltage output by the periodical-signal generation circuit is compared with a reference voltage varying continuously. On the basis of a logic output obtained as a result of the comparison, each of the nodes Node_A, Node_B and Node_C of the 3-phase resonance circuit 10 is driven.

For example, the driver circuit 30 according to the third embodiment employs a sinusoidal-signal generation circuit 50, a comparison circuit (or a comparator) 52 and a variable reference circuit (Variable_Ref) 54. The sinusoidal-signal generation circuit 50 is a circuit for generating a signal having a sinusoidal waveform. The comparison circuit 52 is a circuit for comparing input signals thereof with each other. The variable reference circuit 54 is a typical reference-signal generation circuit for generating a reference voltage varying progressively.

To put it concretely, first of all, the sinusoidal-signal generation circuit 50 includes three sinusoidal-signal generation circuits (Sine_Wave) denoted by reference numerals 50_A, 50_B and 50_C respectively. The phase shift between sinusoidal signals generated by the three sinusoidal-signal generation circuits 50_A, 50_B and 50_C is 120 degrees. Virtually, the three sinusoidal-signal generation circuits 50_A, 50_B and 50_C are each an AC power supply. For example, each of the AC power supplies generates a signal having a DC (Direct Current) level of 1 volt and an amplitude of 2 Vpp.

In general, for the sake of compatibility with the first and second embodiments, the initial phase of the sinusoidal-signal generation circuits 50_A for the node Node_A is set at $3\pi/2$(rad), the initial phase of the sinusoidal-signal generation circuits 50_B for the node Node_B is set at $\pi/6$(rad) and the initial phase of the sinusoidal-signal generation circuits 50_C for the node Node_C is set at $5\pi/6$(rad). Of course, the values taken as the initial phases of the three sinusoidal-signal generation circuits 50_A, 50_B and 50_C are each no more than a typical value. As a matter of fact, the initial phases of the three sinusoidal-signal generation circuits 50_A, 50_B and 50_C can each be set at any arbitrary value as long as the difference between any two of the three initial phases is sustained at $2\pi/3$(rad). For example, it is also possible to provide a configuration in which the initial phase of the sinusoidal-signal generation circuit 50_B for the node Node_B is set at $\pi/6$(rad), the initial phase of the sinusoidal-signal generation circuit 50_C for the node Node_C is set at $5\pi/6$(rad) and the initial phase of the sinusoidal-signal generation circuit 50_A for the node Node_A is set at $3\pi/2$(rad).

It is to be noted that the sinusoidal-signal generation circuit 50 is no more than an example of a periodical-signal generation circuit capable of progressively and periodically changing a signal output thereby. The output signal does not have to be a sinusoidal signal. For example, the periodical-signal generation circuit can be a circuit for generating a signal exhibiting approximate heteroerotism. Examples of such a signal are a triangular waveform and a trapezoidal waveform. By making use of a signal exhibiting approximate heteroerotism, a high-impedance (Z) state can be reliably inserted into a period between periods allocated to logic levels of 0 and 1 in an operation to change the logic level of the output of the driver circuit.

In addition, the output signal does not have to be changed continuously. For example, the output signal can also be changed step by step. As a matter of fact, the output signal can be changed in any manner as long as the signal is changed progressively. If the number of stages at which the output signal is changed step by step is small, in the overall operation of the driver circuit 30, control timings make transitions gradually in a way close to the second embodiment. If the number of such stages is increased to a certain degree, however, the operation to change the value of the output signal can be regarded virtually as an operation to change the value of the output signal continuously. Thus, it is possible to implement continuous transitions of the control timings as an object of the third embodiment.

The comparison circuit 52 generates signals for driving the PMOS transistor 32 and the NMOS transistor 34, which form the output stage of the driver circuit 30. To be more specific, the comparison circuit 52 employs a comparison circuit 52_P outputting a signal for driving the gate 32G (serving as the node Node_AP, Node_BP or Node_CP) of the PMOS transistor 32 as well as a comparison circuit 52_N outputting a signal for driving the gate 34G (serving as the node Node_AN, Node_BN or Node_CN) of the NMOS transistor 34.

The variable reference circuit 54 employs an increment-type variable-reference circuit 54_Incre for continuously increasing a reference voltage Incre_ref supplied to the comparison circuit 52_P and a decrement-type variable-reference circuit 54_Decre for continuously decreasing a reference voltage Decre_ref supplied to the comparison circuit 52_N. To be more specific, the increment-type variable-reference circuit 54_Incre continuously increases the level of a reference voltage Incre_ref supplied to an inverting (−) input terminal of the comparison circuit 52_P. On the other hand, the decrement-type variable-reference circuit 54_Decre continuously increases the level of a reference voltage Decre_ref supplied to an inversion (−) input terminal of the comparison circuit 52_N.

As shown in FIG. 14, typically, the increment-type variable-reference circuits 54_Incre and 54_Decre each have a configuration employing a counter circuit 56 and a DAC (Digital to Analog Converter) circuit 58. The counter circuit 56 is a circuit for incrementing or decrementing internal digital data by counting the number of clock pulses CK supplied to the counter circuit 56 in a counting-up or counting-down operation. The counter circuit 56 outputs the digital data obtained as a result of the counting-up or counting-down operation to the DAC circuit 58 for converting the data into an analog signal. In the case of the increment-type variable-reference circuit 54_Incre, the operation carried out thereby on the digital data is a counting-up operation. In the case of the increment-type variable-reference circuit 54_Decre, on the other hand, the operation carried out thereby on the digital data is a counting-down operation.

As described above, with the counter circuit 56 outputting the digital data obtained as a result of the counting-up or counting-down operation to the DAC circuit 58, the level of the reference voltage supplied to each of the comparison circuit 52_P and the comparison circuit 52_N can in essence be changed continuously. This is because the level of the reference voltage is changed by digitally changing the digital data in the counter circuit 56 in order to sequentially increment or decrement the digital data in the counter circuit 56 so that the variable reference circuit 54 is capable of causing the DAC circuit 58 to continuously change the level of an analog signal output by the DAC circuit 58.

By controlling the frequency of the clock signal CK supplied to the counter circuit 56, the speed of the change in reference voltage Incre_ref or Decre_ref can be adjusted. As a technique for controlling the frequency of the clock signal CK, for example, a frequency division circuit 55 for dividing the frequency of a master clock signal CK0 supplied thereto is provided in the variable reference circuit 54 as shown in the figure. The frequency division circuit 55 provides the counter circuit 56 with the clock signal CK having a frequency obtained as a result of dividing the frequency of the master clock signal CK0. By changing the divisor in the operation to divide the frequency of the master clock signal CK0, the frequency of the clock signal CK can be switched from a value to another with ease. From another point of view, by adjusting the frequency of the clock signal CK supplied to the counter circuit 56, the rate of change in value output by the variable reference circuit 54 or the amount of such a change per unit time can be controlled. Thus, the value output by the variable reference circuit 54 can be changed gradually.

It is to be noted that the configuration shown in FIG. 14 as a typical circuit configuration of the variable reference circuit 54 is no more than an example of a configuration for continuously changing a reference voltage supplied to the comparison circuit 52. There are a number of circuit configurations each capable of carrying out the same function as the variable reference circuit 54. That is to say, the variable reference circuit 54 is a typical basic-signal generation circuit for generating a reference signal having a progressively changing value. As a matter of fact, the variable reference circuit 54 can have any arbitrary configuration as long as the configuration is capable of changing the output signal through stages, the number of which is desirably at least 10. It is even more desirable to provide the variable reference circuit 54 with a configuration in essence capable of changing the output signal continuously.

For example, a resistor voltage dividing circuit can be employed as the variable reference circuit for generating an output reference voltage, which varies gradually. In this case, a selection circuit is used for sequentially selecting a voltage division point from which the reference voltage is supplied to the comparison circuit 52. Even if the periodical-signal generation circuit changes its output signal continuously, if the signal output by the variable reference circuit 54 is changed gradually, in essence, the control timings also make transitions gradually as is the case with the second embodiment.

A sinusoidal signal generated by the sinusoidal-signal generation circuit 50_A, 50_B or 50_C provided for the node Node_A, Node_B or Node_C respectively is supplied to a non-inversion (+) input terminal of each of the comparison circuits 52_P and 52_N as shown in FIG. 13.

As described above, the variable reference circuit 54 adjusts the reference voltage supplied to the comparison circuit 52 as the comparison level or adjusts the speed of the change of the reference voltage and, as a result, the comparison level used in the comparison circuit 52 can be adjusted with a high degree of freedom.

The variable reference circuit 54 adjusts the reference voltage as follows. The counter circuit 56 employed in the variable reference circuit 54 sequentially increments or decrements the digital output value of the counter circuit 56. As a result, the variable reference circuit 54 is capable of continuously changing the level of its analog output. The comparison circuit 52 compares the continuously changing level of the analog reference voltage generated by the variable reference circuit 54 and the sinusoidal voltage generated by the sinusoidal-signal generation circuit 50 so as to continuously change the control timings of the driver circuit 30 in the order of first stage (or dashed lines A)→second stage (or dashed lines B)→third stage (or dashed lines C) as shown in FIG. 11. That is to say, it is possible to continuously change the control timings of the driver circuit 30 in the order of first stage (shown in FIG. 10A)→second stage (shown in FIG. 10B)→third stage (shown in FIG. 10 C).

In accordance with the technique according to the third embodiment, a sinusoidal voltage is compared with a reference voltage. A count value of a counter is used to continuously increase or decrease the reference voltage. That is to say, the reference voltage is changed continuously in accordance with the count value of the counter. On the basis of the result of the comparison, nodes of a 3-phase LC resonance circuit are driven. Even though analog circuits such as a signal generation circuit and a comparison circuit are required, a circuit for continuously changing control timings can be any arbitrary circuit as long as the circuit is capable of changing the reference voltage. The circuit scale does not increase in accordance with the number of stages. The technique according to the second embodiment has a shortcoming of a large circuit scale. However, the third embodiment is capable of eliminating this shortcoming.

It is to be noted that, as described earlier, the change in signal value in the periodical-signal generation circuit serving as the sinusoidal-signal generation circuit 50 in this embodiment can be made a step-by-step change. By the same token, the change in signal value in the reference-signal generation circuit serving as the variable reference circuit 54 in this embodiment can also be made a step-by-step change. Thus, the operation of the driver circuit 30 as a whole can be carried out so as to result in a step-by-step transition of the control timings. As a matter of practice, control can be executed in the same way as the second embodiment.

Thus, if the sinusoidal-signal generation circuit 50 and/or the variable reference circuit 54 have a configuration capable of switching an operation to change the output values step by step to an operation to change the output values continuously and vice versa, control according to the second embodiment or control according to the third embodiment can be switched from one to another with ease in accordance with the purpose of the method for driving the device having a capacitive impedance. That is to say, it is possible to construct a user-friendly driver circuit.

FIG. 15 is an explanatory diagram referred to in description of an effect of control executed by the driver circuit 30 according to the third embodiment. If the assignment of output logic levels of the driver circuit 30 and the phases of the levels is continuously changed in the order of first stage (shown in FIG. 10A)→second stage (shown in FIG. 10B)→third stage (shown in FIG. 10C), much like the second embodiment, at the first stage, a current output from the power supply Vdd is increased to avoid an overshoot and prevent the initial driving power from decreasing at the same time. Then, at a speed determined in advance, a transition is made from the first stage to the third stage by way of the second stage to increase a current held in the 3-phase resonance circuit 10. Thus, the steady-state current and, hence, the power consumption can be minimized.

In this case, the reference voltage is changed continuously to let the control timings make a continuous transition from the first stage (or dashed lines A) to the third stage (or dashed lines C). In the transition, the steady-state current is decreased while an overshoot is being avoided and the initial driving power is being prevented from decreasing at the same time. At that time, it is not necessary to take a long first stage. For example, if the transition from the first stage (or dashed lines A) to the third stage (or dashed lines C) takes at least four periods (or 96 nsec in the case of one period equal to 24 nsec), with a damping resistor having a resistance of 0Ω, the steady-state current can be reduced while the overshoot is being suppressed as shown in FIG. 15. Even if the transition takes time longer than what is required, the magnitude of the overshoot does not change although the avoidance of the deterioration of the initial driving power can be implemented as well. Thus, a transition time of four periods is considered to be a practical transition time.

It is to be noted that, as is obvious from the above description of the embodiments, by making the initial values (a, b, c) of the logic levels appearing at the nodes of the 3-phase LC resonance circuit and the last values (a, b, c) of the logic levels match typical values of (0, 1, 1), the power consumption can be reduced to a small value. If such control is terminated, however, attenuated vibration occurs in the 3-phase LC resonance circuit for a fixed period of time even though the 3-phase LC resonance circuit is a resonance circuit. Thus, it is quite within the bounds of possibility that the quality of the image deteriorates. As a possible solution to this problem, in a CCD transfer, for example, a signal incorrectly transferred by this attenuated vibration is not subjected to signal processing.

In addition, the resonance frequency stability with respect to the driving frequency may be a problem. As shown in none of the figures, however, it has been verified that if the resonance frequency change with a change in driving frequency is made small to a certain degree, that is, if the change in resonance frequency is within a typical range of ±20%, for example, the change in waveform amplitude can be made sufficiently small so as to give no effect.

<<Keeping up with Characteristic Variations of Devices>>

Figure 16A:
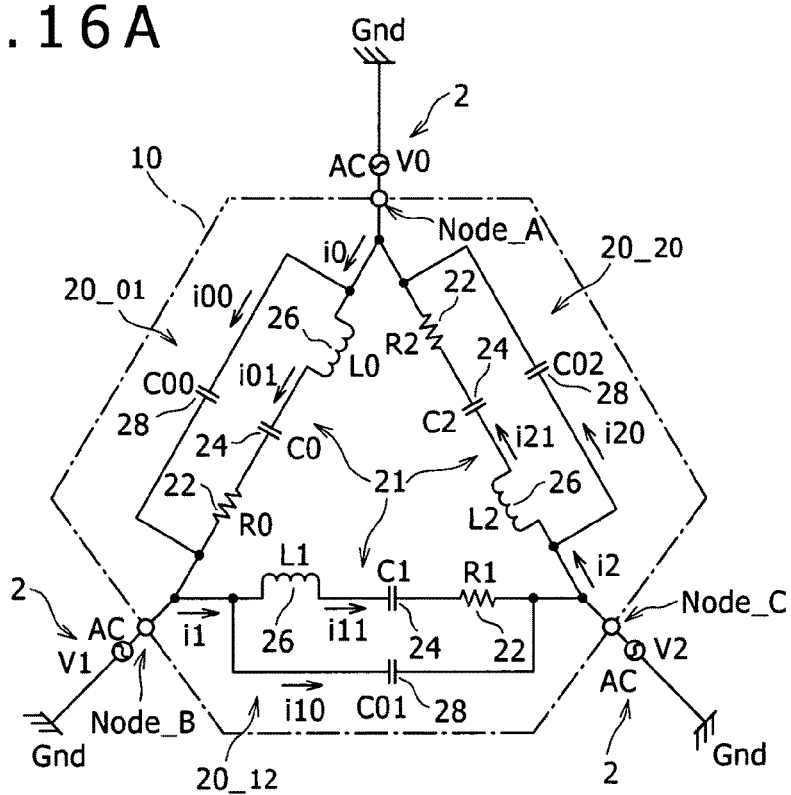
FIG. 16A is an explanatory diagram to be referred to in description of the basic principle of a typical modified version of a technique for driving a capacitive device in accordance with the present invention.
Figure 16B:
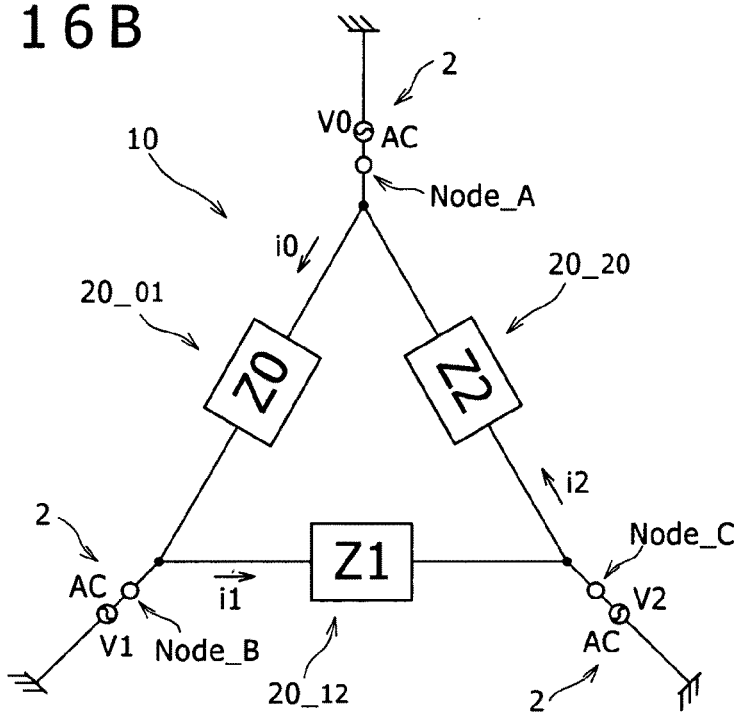
FIG. 16B is an explanatory diagram to be referred to in description of the basic principle of the typical modified version of the technique for driving a capacitive device in accordance with the present invention.

FIGS. 16A and 16B are an explanatory diagram referred to in description of the basic principle of a typical modified version of a technique for driving a capacitive device in accordance with the present invention. FIGS. 16A and 16B correspond to FIGS. 1 and 2 respectively.

The typical modified version is characterized in that the version adopts a technique to keep up with characteristic variations of devices employed in impedance circuits of different phases. In the figures, each device exhibiting variations is denoted by a reference numeral having a suffix serving as a tail reference numeral indicating the number assigned to the phase of an impedance circuit employing the device.

Let notations $\phi_0$, $\phi_1$ and $\phi_2$ denote the initial phases of the driving power supplies for the three phases respectively. Also let the impedances Z0, Z1 and Z2 of the impedance circuits for the three phases be expressed by the following equations: $Z0 = z_0 \exp(j\theta_0)$, $Z1 = z_1 \exp(j\theta_1)$ and $Z2 = z_2 \exp(j\theta_2)$ respectively. In this case, Eq. (5) derived from Eq. (2) expressing a multi-element power consumption P of the 3-phase LCR-C circuit can be modified to yield Eq. (11) as follows:

[Eq. 11]

$$P = \frac{4V^2}{z_0} \sin^2\left(\frac{\phi_0 - \phi_1}{2}\right) \exp\left\{j\left(2\omega t + \phi_0 + \phi_1 + \frac{\pi}{2} - \theta_0\right)\right\} + \\ \frac{4V^2}{z_1} \sin^2\left(\frac{\phi_1 - \phi_2}{2}\right) \exp\left\{j\left(2\omega t + \phi_1 + \phi_2 + \frac{\pi}{2} - \theta_1\right)\right\} + \\ \frac{4V^2}{z_2} \sin^2\left(\frac{\phi_2 - \phi_0}{2}\right) \exp\left\{j\left(2\omega t + \phi_2 + \phi_0 + \frac{\pi}{2} - \theta_2\right)\right\} \quad (11)$$

Let notation VA denote an apparent power and the expression cos Ψ represent a power factor. In this case, the power consumption P can be expressed by the equation P=VAexp(jΨ) and Eqs. (12) and (13) are obtained as modified forms of Eqs. (6) and (7) respectively.

[Eq. 12]

$$(VA)^2 = \left\{\frac{4V^2}{z_0}\sin^2\left(\frac{\phi_0 - \phi_1}{2}\right)\right\}^2 + \left\{\frac{4V^2}{z_1}\sin^2\left(\frac{\phi_1 - \phi_2}{2}\right)\right\}^2 + \\ \left\{\frac{4V^2}{z_2}\sin^2\left(\frac{\phi_2 - \phi_0}{2}\right)\right\}^2 + \\ 2\left\{\frac{4V^1}{z_0}\sin^2\left(\frac{\phi_0 - \phi_1}{2}\right)\right\}\left\{\frac{4V^2}{z_1}\sin^2\left(\frac{\phi_1 - \phi_2}{2}\right)\right\} \\ \cos(\phi_0 - \phi_2 - \theta_0 + \theta_1) + \\ 2\left\{\frac{4V^1}{z_1}\sin^2\left(\frac{\phi_1 - \phi_2}{2}\right)\right\}\left\{\frac{4V^2}{z_2}\sin^2\left(\frac{\phi_2 - \phi_0}{2}\right)\right\} \\ \cos(\phi_1 - \phi_0 - \theta_1 + \theta_2) + \\ 2\left\{\frac{4V^2}{z_2}\sin^2\left(\frac{\phi_2 - \phi_0}{2}\right)\right\}\left\{\frac{4V^2}{z_0}\sin^2\left(\frac{\phi_0 - \phi_1}{2}\right)\right\} \\ \cos(\phi_2 - \phi_1 - \theta_2 + \theta_0) \quad (12)$$

$$= (4V^2)^2 \left\{ \begin{array}{l} \left\{\frac{1}{4z_0 z_1 z_2}\left((z_0 + z_1 + z_2)^2 - \begin{pmatrix}(z_1 \cos\phi_0 + z_2 \cos\phi_1 + z_0 \cos\phi_2)^2 + \\ (z_1 \sin\phi_2 + z_2 \sin\phi_1 + z_0 \sin\phi_2)^2\end{pmatrix}\right)\right\}^2 - \\ \frac{1}{2z_0 z_1 z_2}\left\{2 - \frac{1}{2}\{(\cos\phi_0 + \cos\phi_1)^2 + (\sin\phi_0 + \sin\phi_1)^2\}\right\} * \\ \left\{2 - \frac{1}{2}\{(\cos\phi_1 + \cos\phi_2)^2 + (\sin\phi_1 + \sin\phi_2)^2\}\right\} * \\ \left\{2 - \frac{1}{2}\{(\cos\phi_2 + \cos\phi_0)^2 + (\sin\phi_2 + \sin\phi_0)^2\}\right\} * \\ \left\{\begin{array}{l} z_2\left\{\cos\left(\frac{\theta_0 - \theta_1}{2}\right) - \frac{\sin\left(\frac{\theta_1 - \theta_1}{2}\right)}{\tan\left(\frac{\phi_0 - \phi_2}{2}\right)}\right\} + \\ z_0\left\{\cos\left(\frac{\theta_1 - \theta_2}{2}\right) - \frac{\sin\left(\frac{\theta_2 - \theta_1}{2}\right)}{\tan\left(\frac{\phi_1 - \phi_0}{2}\right)}\right\} + \\ z_1\left\{\cos\left(\frac{\theta_2 - \theta_0}{2}\right) - \frac{\sin\left(\frac{\theta_2 - \theta_0}{2}\right)}{\tan\left(\frac{\phi_2 - \phi_1}{2}\right)}\right\} \end{array}\right\} \end{array} \right\}$$

[Eq. 13]

-continued $$b = \tan^{-1}\left\{\begin{array}{l}\frac{4V^2}{z_0}\sin^2\left(\frac{\phi_0-\phi_1}{2}\right)\sin\{(2\omega t+\phi_0+\phi_1+\frac{\pi}{2}-\theta_0)\}+\\ \frac{4V^2}{z_1}\sin^2\left(\frac{\phi_1-\phi_2}{2}\right)\sin\{(2\omega t+\phi_1+\phi_2+\frac{\pi}{2}-\theta_1)\}+\\ \frac{4V^2}{z_2}\sin^2\left(\frac{\phi_2-\phi_0}{2}\right)\sin\{(2\omega t+\phi_2+\phi_0+\frac{\pi}{2}-\theta_2)\}\\ \frac{4V^2}{z_0}\sin^2\left(\frac{\phi_0-\phi_1}{2}\right)\cos\{(2\omega t+\phi_0+\phi_1+\frac{\pi}{2}-\theta_0)\}+\\ \frac{4V^2}{z_1}\sin^2\left(\frac{\phi_1-\phi_2}{2}\right)\cos\{(2\omega t+\phi_1+\phi_2+\frac{\pi}{2}-\theta_1)\}+\\ \frac{4V^2}{z_2}\sin^2\left(\frac{\phi_2-\phi_0}{2}\right)\cos\{(2\omega t+\phi_2+\phi_0+\frac{\pi}{2}-\theta_2)\}\end{array}\right\} \quad (13)$$

$$= \tan^{-1}\left\{\frac{\cos\left(2\omega t+\frac{\pi}{2}-\theta_0\right)\left\{\begin{array}{l}(z_1\cos\phi_0+z_2\cos\phi_1+z_0\cos\phi_2)*\\ (z_1\sin\phi_0+z_2\sin\phi_1+z_0\sin\phi_2)-\\ \frac{1}{2}(z_0+z_1+z_2)\\ (z_1\sin2\phi_0+z_1\sin2\phi_1+z_0\sin2\phi_2)\end{array}\right\}+ \sin\left(2\omega t+\frac{\pi}{2}-\theta_0\right)\left\{\begin{array}{l}\frac{1}{2}(z_1\cos\phi_0+z_2\cos\phi_1+z_0\cos\phi_2)^2-\\ \frac{1}{2}(z_1\sin\phi_0+z_2\sin\phi_1+z_0\sin\phi_2)^2-\\ \frac{1}{2}(z_0+z_1+z_2)\\ (z_1\cos2\phi_0+z_2\cos2\phi_1+z_0\cos2\phi_2)\end{array}\right\}}{\cos\left(2\omega t+\frac{\pi}{2}-\theta_0\right)\left\{\begin{array}{l}\frac{1}{2}(z_1\cos\phi_0+z_2\cos\phi_1+z_0\cos\phi_2)^2-\\ \frac{1}{2}(z_1\sin\phi_0+z_2\sin\phi_1+z_0\sin\phi_2)^2-\\ \frac{1}{2}(z_0+z_1+z_2)\\ (z_1\cos2\phi_0+z_2\cos2\phi_1+z_0\cos2\phi_2)\end{array}\right\}- \sin\left(2\omega t+\frac{\pi}{2}-\theta_0\right)\left\{\begin{array}{l}(z_1\cos\phi_0+z_2\sin\phi_1+z_0\sin\phi_2)+\\ (z_1\sin\phi_0+z_2\sin\phi_1+z_0\sin\phi_2)*\\ \frac{1}{2}(z_0+z_1+z_2)\\ (z_1\sin2\phi_0+z_2\sin2\phi_1+z_0\sin2\phi_2)\end{array}\right\}}\right\}$$

Also in this case, it is desirable to maximize a current held in the 3-phase resonance circuit 10. Thus, it is also nice to set a condition requiring that the absolute value |P| of the power consumption P be maximized. That is to say, a maximum apparent power and a power factor of 1 are optimum.

Thus, conditions for the initial phases of logic levels generated by the driving powers 2 are expressed by Eq. (14), which is a modified form of Eq. (8), as follows.

[Eq. 14]

$$\left.\begin{array}{l}Z_1\cos\phi_0+Z_2\cos\phi_1+Z_0\cos\phi_2=0 \quad (15\text{-}1)\\ Z_1\sin\phi_0+Z_2\sin\phi_1+Z_0\sin\phi_2=0 \quad (15\text{-}2)\\ Z_1\cos2\phi_0+Z_2\cos2\phi_1+Z_0\cos2\phi_2=0 \quad (15\text{-}3)\\ Z_1\sin2\phi_0+Z_2\sin2\phi_1+Z_0\sin2\phi_2=0 \quad (15\text{-}4)\end{array}\right\} \quad (14)$$

<First Approach for Determining Initial Phases>

Figure 17A:
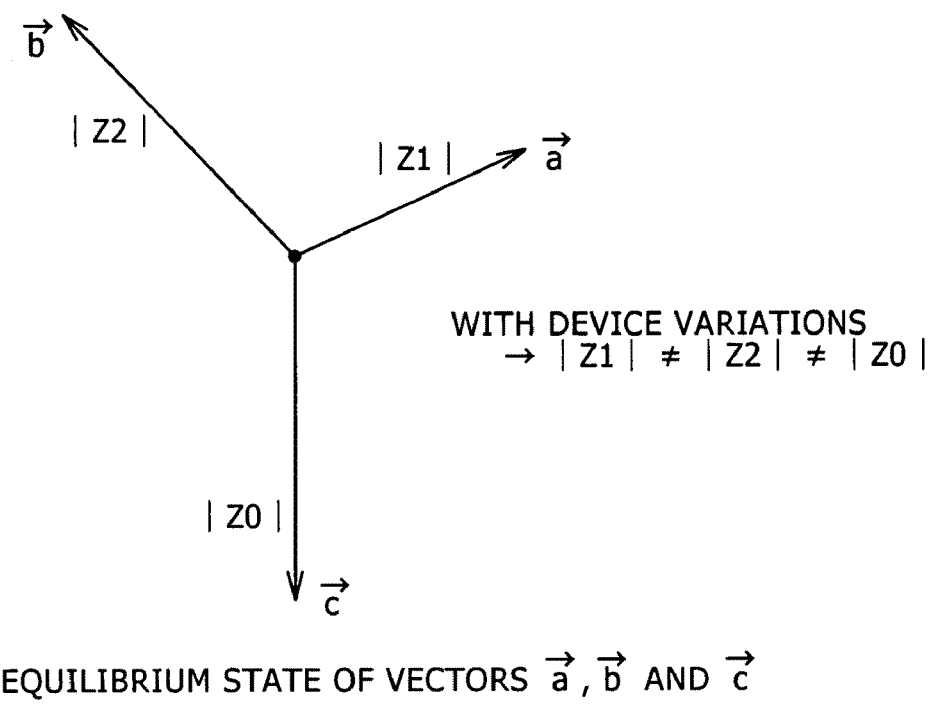
FIG. 17A is an explanatory diagram to be referred to in description a first approach for determining an initial phase of every power supply for a case in which there are variations from device to device.
Figure 17B:
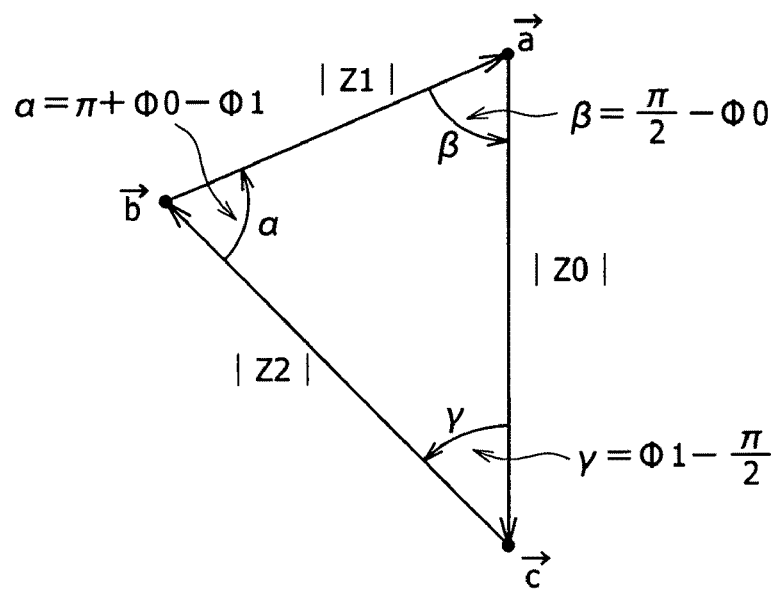
FIG. 17B is an explanatory diagram to be referred to in conjunction with FIG. 17A in description part 1 of an approach for determining an initial phase of every power supply for a case in which there are variations from device to device.

FIGS. 17A and 17B correspond to FIGS. 3A and 3B respectively. FIGS. 17A and 17B are explanatory diagrams referred to in description of a first approach to determine the initial phases $\phi 0$, $\phi 1$ and $\phi 2$ of logic levels generated by the driving powers 2 on the assumption that characteristic variations from device to device exist. The first approach to determine the initial phases $\phi 0$, $\phi 1$ and $\phi 2$ of logic levels generated by the driving powers 2 is characterized in that, in accordance with the first approach, while attention is being paid to the boundary length of a triangle, the initial phase of the impedance circuit of the first phase and the initial phases of the impedance circuits of the remaining phases are adjusted.

Let us consider a plurality of vectors a, b and c on a plane. In figures and expressions, an arrow is placed on each of notations a, b and c denoting the vectors a, b and c. Let us take the origin as a base point. In a star-shaped vector equilibrium state shown in FIG. 17A, let the vectors a, b and c be expressed by Eqs. (15-1), (15-2) and (15-3) respectively. In this case, the found condition equation is expressed by Eq. (15-4).

[Eq. 15]

$$\left.\begin{array}{l}\vec{a}=\cos\phi 0+i\sin\phi 0 \quad (15\text{-}1)\\ \vec{b}=\cos\phi 1+i\sin\phi 1 \quad (15\text{-}2)\\ \vec{c}=\cos\phi 2+i\sin\phi 2 \quad (15\text{-}3)\\ |Z1|\vec{a}+|Z2|\vec{b}+|Z0|\vec{c}=0 \quad (15\text{-}4)\end{array}\right\} \quad (15)$$

In addition, the star-shaped vector equilibrium state shown in FIG. 17A can be reformed into a Δ-shaped vector equilibrium state shown in FIG. 17B. Since there are characteristic variations from device to device, however, the Δ-shaped vector equilibrium state is not a vector equilibrium state having an equilateral-triangle shape. In the Δ-shaped vector equilibrium state shown in FIG. 17B, an angle α formed by the vectors a and b, an angle β formed by the vectors a and c and an angle γ formed by the vectors c and b are expressed by Eqs. (10-1), (10-2) and (10-3) respectively, which are given earlier.

In this case, if attention is paid to the boundary length of the triangle, Eq. (16-1) is derived whereas cos β and cos γ can be expressed by Eqs. (16-2). In addition, if a technique to reduce the steady-state current of the 3-phase resonance is considered by fixing one of the three initial phases and varying the two remaining initial phases, eventually, the three initial phases are expressed by Eq. (16-3) in which, typically, the fixed initial phase is $\phi 2$ whereas the two remaining initial phases are $\phi 0$ and $\phi 1$.

[Eq. 16]

$$\left.\begin{array}{l}\left.\begin{array}{l}|Z_0|=|Z_2|\cos\gamma+|Z_1|\cos\beta\\ |Z_1|=|Z_2|\cos\alpha+|Z_0|\cos\beta\\ |Z_2|=|Z_1|\cos\alpha+|Z_0|\cos\gamma\end{array}\right\}(16\text{-}1)\\ \left.\begin{array}{l}\cos\beta=\frac{|Z_0|^2+|Z_1|^2-|Z_2|^2}{2|Z_0||Z_1|}\\ \cos\gamma=\frac{|Z_0|^2-|Z_1|^2+|Z_2|^2}{2|Z_2||Z_0|}\end{array}\right\}(16\text{-}2)\\ \left.\begin{array}{l}\phi_0=\frac{\pi}{2}-\cos^{-1}\left\{\frac{|Z_0|^2+|Z_1|^2-|Z_2|^2}{2|Z_0||Z_1|}\right\}\\ \phi_1=\frac{\pi}{2}+\cos^{-1}\left\{\frac{|Z_0|^2-|Z_1|^2+|Z_2|^2}{2|Z_2||Z_0|}\right\}\\ \phi_2=\frac{3\pi}{2}\end{array}\right\}(16\text{-}3)\end{array}\right\} \quad (16)$$

As described above, in according to the first approach to determine the initial phases, in a process to adjust the initial phases by paying attention to the boundary length of the triangle, if one of the three initial phases is fixed and the two remaining initial phases are varied typically in accordance with the conditional equation (16-3), the values of the two remaining initial phases can be determined univocally. Thus, it is possible to implement control timings for maximizing a current held in the 3-phase resonance circuit employing elements with impedances exhibiting variations caused by characteristic variations from device to device. As a result, the power consumed by the driver circuit 30 can be minimized even if characteristic variations from device to device exist.

FIG. 18 is a diagram showing results of typical experiments to which the first approach to determine initial phases is applied. Pre-control initial-phase definitions are given as follows: (phase_a, phase_b, phase_c)=(90, 330, 210), (_nn_a, _nn_b, _nn_c)=(1.15, 1, 0.85) and (_l_a, _l_b, _l_c)= (1.15, 1, 0.85). In this case, the definition of phase_x (where x represents subscripts a, b or c) shows the initial value of the phase indicated by subscript a, b or c. By the same token, the definition of nn_x (where x represents subscript a, b or c) shows the ratio of the capacitance of the phase indicated by subscript a, b or c to the CCD capacitance, which is C00, C01 or C02 shown in FIG. 16A. Likewise, the definition of l_x (where x represents subscript a, b or c) shows the ratio of the inductance of the phase indicated by subscript a, b or c to a reference value.

An order in which the boundary length is adjusted is given as follows:

(A): phase_a=90 deg, phase_b=270 to 450 deg and phase_c=210 deg: First control of Phase_b
(B): phase_a=90 deg, phase_b=325 to 335 deg and phase_c=210 deg: First control of phase_b
(C): phase_a=90 deg, phase_b=330 deg and phase_c=150 to 210 deg: First control of Phase_c
(D): phase_a=90 deg, phase_b=330 deg and phase_c=180 to 200 deg: First control of phase_c
(E): phase_a=90 deg, phase_b=300 to 330 deg and phase_c=190 deg: Second control of Phase_c
(F): phase_a=90 deg, phase_b=320 deg and phase_c=190 deg→8.433 mA: Control completed As shown in (F), after the control has been completed, the current has a magnitude of 8.433 mA.

As is obvious from the description of this embodiment, if a specific one of the three initial phases is fixed and the two remaining initial phases are varied typically in a process to adjust the initial phases by paying attention to the boundary length of the triangle, the steady-state current of the 3-phase resonance circuit can be reduced. In the description given above, as an example, the initial value of phase_a shown in FIG. 18 is taken as the specific initial phase whereas the initial values of phase_b and phase_c shown in the same figure are taken as the two remaining initial phases.

In the first approach for determining initial phases, two initial phases are adjusted. Thus, the degree of adjustment is high and, by increasing the number of search processes, an even smaller steady-state current can be found.

Since the number of initial phases to be adjusted is high, however, the process to adjust the initial phases becomes complicated. The process to adjust the initial phases becomes complicated because it is necessary to set the two initial phases from the impedances of circuits of all the three phases. As is obvious from the description of the first approach for determining initial phases, the two initial phases are each determined by using an arc cosine function having values limited to the range −1 to +1. Thus, it is quite within the bounds of possibility that actual impedance variations cannot be kept up with.

<Second Approach for Determining Initial Phases>

Figure 19A:
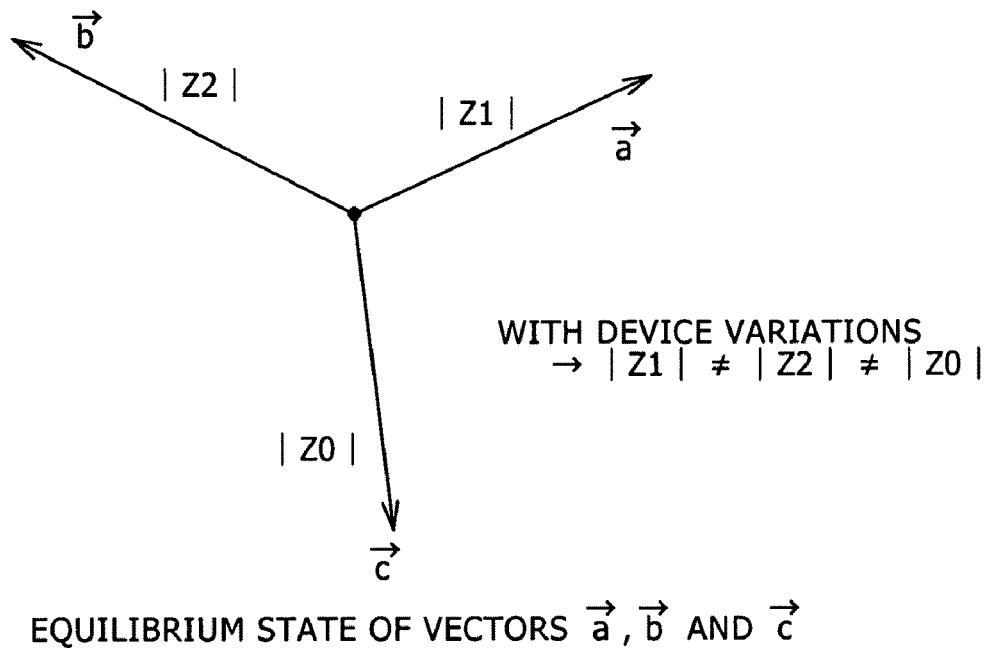
FIG. 19A is an explanatory diagram to be referred to in description a second approach for determining an initial phase of every power supply for a case in which there are variations from device to device.
Figure 19B:
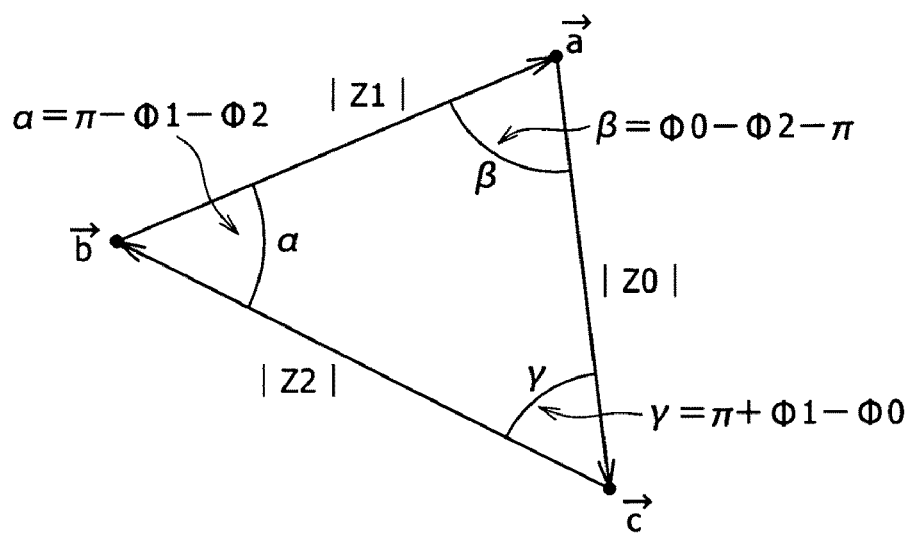
FIG. 19B is an explanatory diagram to be referred to in conjunction with FIG. 19B in description of the second approach for determining an initial phase of every power supply for a case in which there are variations from device to device.

FIGS. 19A and 19B correspond to FIGS. 3A and 3B respectively as well as correspond to FIGS. 17A and 17B respectively. FIGS. 19A and 19B are explanatory diagrams referred to in description of a second approach to determine the initial phases $\phi 0$, $\phi 1$ and $\phi 2$ of logic levels generated by the driving powers 2 on the assumption that characteristic variations from device to device exist. The second approach to determine the initial phases $\phi 0$, $\phi 1$ and $\phi 2$ of logic levels generated by the driving powers 2 is characterized in that, in accordance with the second approach, the equilibrium state of three vectors is sustained by fixing the directions of two of the three vectors while changing the direction of the remaining vector and, at the same time, attention is paid to the area of the triangle in order to derive a condition for the initial value of the phase corresponding to the remaining vector.

Let us assume that the directions of the 2 vectors a and b shown in FIG. 17A are fixed whereas the angle ∠a is set at π/6(rad) and the angle $\phi$b is set at 5π/6(rad) In this state, the direction of the vector c is changed to a direction shown in FIG. 19A to sustain an equilibrium state of the vectors.

It is to be noted that, if the vectors a, b and c are set to satisfy Eqs. (15-1) to (16-3) given earlier, the required condition formula can be expressed by Eq. (15-4).

In addition, the star-shaped vector equilibrium state shown in FIG. 19A can be reformed into a Δ-shaped vector equilibrium state shown in FIG. 19B. Since there are characteristic variations from device to device, however, the Δ-shaped vector equilibrium state is not a vector equilibrium state having an equilateral-triangle shape. In the Δ-shaped vector equilibrium state shown in FIG. 19B, an angle α formed by the vectors a and b, an angle β formed by the vectors a and c and an angle γ formed by the vectors c and b are expressed by Eqs. (17-1), (17-2) and (17-3) respectively.

[Eq. 17]

$$\left.\begin{array}{l}\alpha = \pi - \phi 1 - \phi 2 \quad (18\text{-}1)\\ \beta = \phi 0 - \phi 2 - \pi \quad (18\text{-}2)\\ \gamma = \pi + \phi 1 - \phi 0 \quad (18\text{-}3)\end{array}\right\} \quad (17)$$

Then, attention is paid to the area of the triangle in order to derive a condition for the initial value $\phi 0$ of the phase corresponding to the remaining vector. Since the angle ∠a is set at π/6(rad) and the angle ∠b is set at 5π/6(rad), the initial phases $\phi 2$ and $\phi 1$ have the following values: $\phi 2=\pi/6$ and $\phi 1=5\pi/6$ respectively. Thus, the area SΔ of the triangle can be expressed by Eq. (18) given below. Accordingly, the initial phases $\phi 0$ can be expressed by Eq. (19) given below.

[Eq. 18]

$$\begin{aligned}S_\Delta &= \frac{1}{2}|Z_1||Z_2|\sin(\pi - \phi_1 + \phi_2) = \frac{1}{2}|Z_1||Z_2|\sin\left(\frac{\pi}{3}\right)\\ &= \frac{1}{2}|Z_2||Z_0|\sin(\phi_0 - \phi_2 - \pi) = \frac{1}{2}|Z_2||Z_0|\sin\left(\phi_0 - \frac{7\pi}{6}\right)\\ &= \frac{1}{2}|Z_0||Z_1|\sin(\pi + \phi_1 - \phi_0) = \frac{1}{2}|Z_0||Z_1|\sin\left(\frac{11\pi}{6} - \phi_0\right)\end{aligned} \quad (18)$$

[Eq. 19]

$$\phi_0 = \tan^{-1}\left(\frac{1}{\sqrt{3}} * \frac{|Z_1| + |Z_2|}{|Z_1| - |Z_2|}\right) \quad (19)$$

In this case, the area SΔ of the triangle never has a negative value. That is to say, the area SΔ of the triangle always has a positive value (SΔ>0). Thus, the initial phases φ0 has a value in a range of 7π/6<φ0<11π/6.

Summarizing what is described above yields Eq. (20) given below as equations expressing final values of the initial phases φ0, φ1 and φ2:

[Eq. 20]

$$\left.\begin{array}{c}\phi_0 = \tan^{-1}\left(\frac{1}{\sqrt{3}} * \frac{|Z_1|+|Z_2|}{|Z_1|-|Z_2|}\right) \\ \left\{\phi_0 \text{ has a value in a range of; } \frac{7\pi}{6} < \phi_0 < \frac{11\pi}{6}\right\} \\ \phi_1 = \frac{5}{6}\pi(\text{rad}) \\ \phi_2 = \frac{1}{6}\pi(\text{rad})\end{array}\right\} \quad (20)$$

As described above, in a process to adjust initial phases in accordance with the second initial-phase determination approach, the equilibrium state of three vectors is sustained by fixing the directions of two of the three vectors while changing the direction of the remaining vector and, at the same time, attention is paid to the area of the triangle in order to adjust the initial value of the phase corresponding to the remaining vector in accordance with Eq. (20). In this way, the initial phase corresponding to the remaining vector can be determined univocally. Thus, it is possible to implement control timings for maximizing a current held in the 3-phase resonance circuit employing elements with impedances exhibiting variations caused by characteristic variations from device to device. As a result, the power consumed by the driver circuit 30 can be minimized even if characteristic variations from device to device exist.

FIG. 20 is a diagram showing results of typical experiments to which the second approach to determine initial phases is applied. Pre-control initial-phase definitions are given as follows: (phase_a, phase_b, phase_c)=(90, 330, 210), (_nn_a, _nn_b, _nn_c)=(1.15, 1, 0.85) and (_1_a, _1_b, _1_c)= (1.15, 1, 0.85). An order in which the area of the triangle is adjusted is given as follows:

(A): phase_a=0 to 180 deg, phase_b=330 deg and phase_c=210 deg: Control of Phase_a (B): phase_a=60 to 150 deg, phase_b=330 deg and phase_c=210 deg: Control of phase_a (C): phase_a=90 to 120 deg, phase_b=330 deg and phase_c=210 deg: Control of phase_a (D): phase_a=108 deg, phase_b=330 deg and phase_c=210 deg→8.454 mA: Control completed As shown in (D), after the control has been completed, the current has a magnitude of 8.454 mA.

As is obvious from the typical experiment results, attention is paid to the area of the triangle and two of the three initial phases are fixed whereas the remaining initial phase is varied in order to reduce the steady-state current of the 3-phase resonance. In the example described above, the two of the three initial phases are the initial values of Phase_b and Phase_c shown in FIG. 20 and the remaining initial phase is the initial value of Phase_a shown in the same figure.

In the case of the second approach for determining the initial phases, the number of adjusted initial phases is one so that the degree of adjustment freedom is low in comparison with the first approach. However, an increase in control simplicity is proportional to the decrease in adjustment freedom degree. In addition, since the number of adjusted initial phases is only one, the precision of the adjustment cannot be said to be sufficient in comparison with the first approach for determining the initial phases even though the second approach is also capable of reducing the steady-state current. For example, as shown in (D) of FIG. 20, after the control has been completed, the current has a magnitude of 8.454 mA slightly greater than 8.433 mA, which is the magnitude of the current shown in (F) of FIG. 18 as a current obtained as a result of adjusting the boundary length in accordance with the first approach for determining the initial phases.

Thus, if the result of comparing the second approach for determining the initial phases with the first approach indicates that the difference between the first and second approaches is big, it is nice to select the first approach. If the result of comparing the second approach for determining the initial phases with the first approach indicates that the difference between the first and second approaches is so small that the difference can be ignored, it is nice to select the second approach in order to make the control method simple.

FOURTH EMBODIMENT

Figure 21:
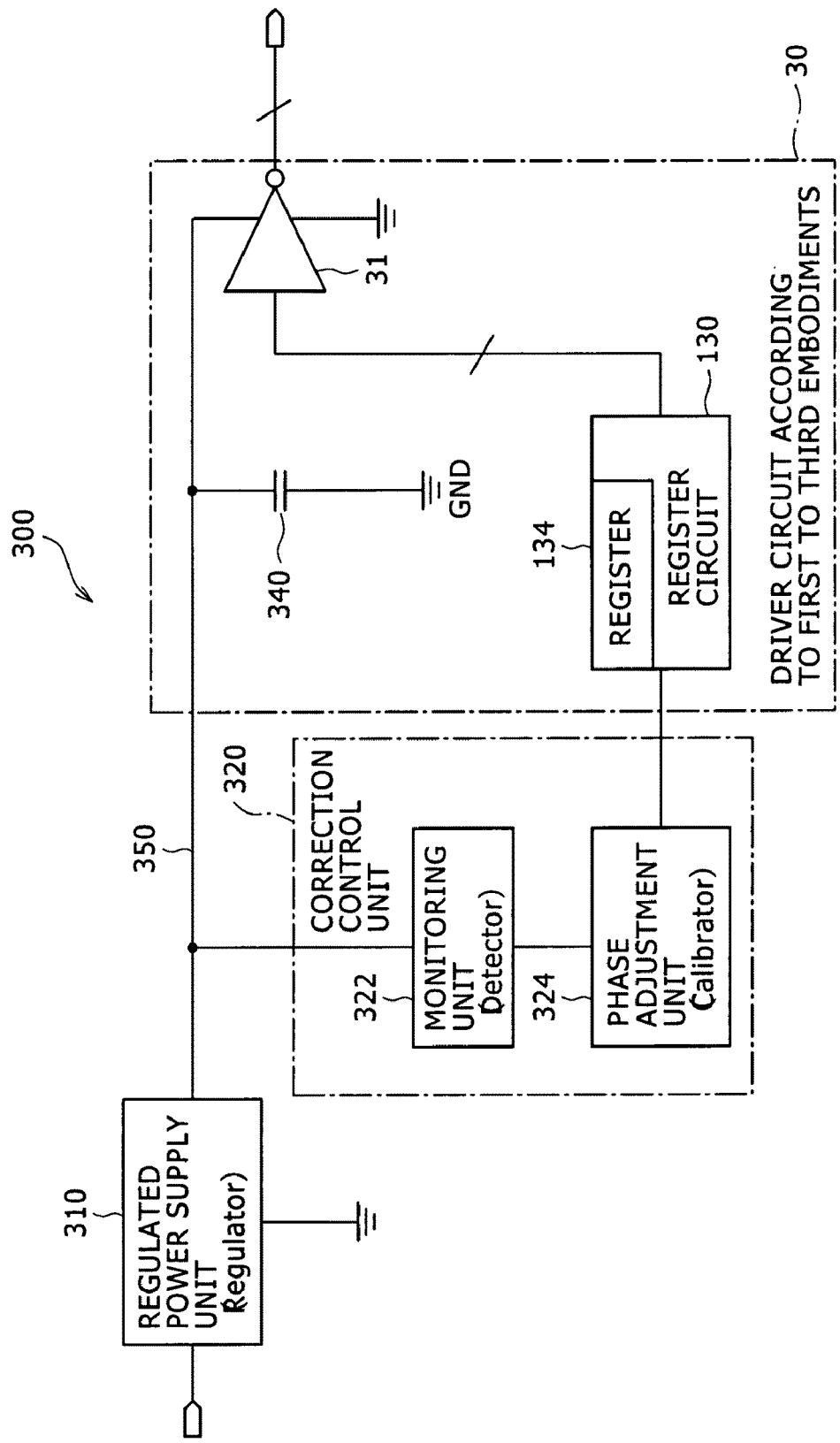
FIG. 21 is an explanatory diagram showing an operation carried out by a fourth embodiment to assign output logic levels of driver circuits and the phases of the logic levels to nodes of the 3-phase resonance circuit as well as driving timings.

Assignment of Phases and Logic Levels to Nodes of the 3-Phase LC Resonance Circuit FIG. 21 is an explanatory diagram referred to in description of an operation carried out by a fourth embodiment to assign output logic levels generated by driver circuits and the phases of the logic levels to nodes of the 3-phase resonance circuit as well as driving timings. To be more specific, FIG. 21 is a circuit block diagram showing an entire outline of the driver circuit 30 according to the fourth embodiment for keeping up with characteristic variations from device to device.

The fourth embodiment is characterized in that the fourth embodiment has a configuration for implementing the first and second approaches for determining initial phases for a case in which characteristic variations exist among devices employed in impedance circuits having different phases.

If there are characteristic variations from device to device as described above, the entire outline shown in the figure applies the first or second initial-phase determination approach for adjusting initial phases in order to reduce the power consumption. Thus, as shown in the figure, an extended driver circuit 300 according to the fourth embodiment newly employs a regulated power-supply unit (or a regulator) 310 and a correction control unit 320 in addition to the driver circuit 30 according to any one of the first to third embodiments. The regulated power-supply unit 310 is a unit for supplying a regulated power-supply voltage to the output stage 31 of the driver circuit 30 employed in the extended driver circuit 300. The correction control unit 320 is a unit for adjusting the initial phase of a driving signal for a case, in which impedance variations exist among impedance circuits having different phases in the n-phase resonance circuit, so as to correct the power consumption by taking the impedance variations into consideration.

The correction control unit 320 monitors the load regulation characteristic of a power-supply current supplied to a driving point of the 3-phase resonance circuit 10 in order to adjust the initial phase in accordance with a technique based on the first or second approach to determine the initial phase. As described before, the driving point of the 3-phase resonance circuit 10 is the output stage 31 of the driver circuit 30 employed in the extended driver circuit 300 as a driver circuit 30 according to any one of the first to third embodiments.

For the reason described above, the correction control unit 320 employs a monitoring unit (or a detector) 322 and a phase adjustment unit (calibrator) 324. The monitoring unit 322 is a detector for monitoring (detecting) the voltage output by the regulated power-supply unit 310. On the other hand, the phase adjustment unit 324 is a calibrator for adjusting the initial phase determined in accordance with the first or second initial-phase determination approach on the basis of a result of a detection process carried out by the monitoring unit 322.

In order for the monitoring unit 322 to accurately monitor the steady-state current supplied by the regulated power-supply unit 310 to the output stage 31 employed in the extended driver circuit 300, a so-called decoupling capacitor (also referred to as a pass capacitor) 340 is provided between a power-supply line 350 and the ground (GND) as a capacitor for removing power-supply noises included in the power-supply voltage as harmonic components.

The monitoring unit 322 examines the load regulation characteristic of the regulated power-supply unit 310 in order to monitor a steady-state current supplied by the regulated power-supply unit 310 to the output stage 31 employed in the extended driver circuit 300, supplying a result of monitoring to the phase adjustment unit 324.

The phase adjustment unit 324 delivers calibrated data to a register 134 of a register circuit 130 employed in the driver circuit 30 according to any one of the first to third embodiments in a driving operation to adjust the initial phase. The calibrated data is data for adjusting the contents of the register 134.

To put it in detail, each time the phase adjustment unit 324 adjusts the initial phase, the phase adjustment unit 324 compares the post-adjustment output voltage with the pre-adjustment output voltage. If the result of the comparison indicates an increase in output voltage, the steady-state current is determined to have decreased. Thus, an operation to further adjust the initial phase is carried out. If the result of the comparison indicates a decrease in output voltage, on the other hand, the steady-state current is determined to have increased. Thus, an operation to restore the initial phase to its original value is carried out.

At that time, as a method to confirm that the steady-state current has been minimized, the steady-state current is confirmed to have decreased at a trial leading ahead of the immediately preceding trial and the steady-state current is confirmed to have increased at the immediately preceding trial. The steady-state current is confirmed to have been minimized at the trial leading ahead of the immediately preceding trial in this way in order to avoid a state in which the operation to adjust the initial phase is undesirably ended only by seeing the fact that the steady-state current has increased at the first trial.

As described above, on the assumption that impedance variations exist in the 3-phase resonance circuit, the power supplied to the output stage 31 of the driver circuit 30 is controlled by the regulated power-supply unit 310, the current output by the regulated power-supply unit 310 is examined in order to identify the load regulation characteristic of the regulated power-supply unit 310 whereas the monitoring unit 322 and the phase adjustment unit 324 determine calibrated data to be supplied to the register 134 employed in the register circuit 130 as a set value for minimizing the steady-state current. With the phase adjustment unit 324 delivering the calibrated data to the register 134 in a driving operation, it is possible to correct the reduction of the power consumption by taking the impedance variations into consideration.

<Outline of the CCD Solid-State Image Pickup Device and its Peripherals>

Figure 22:
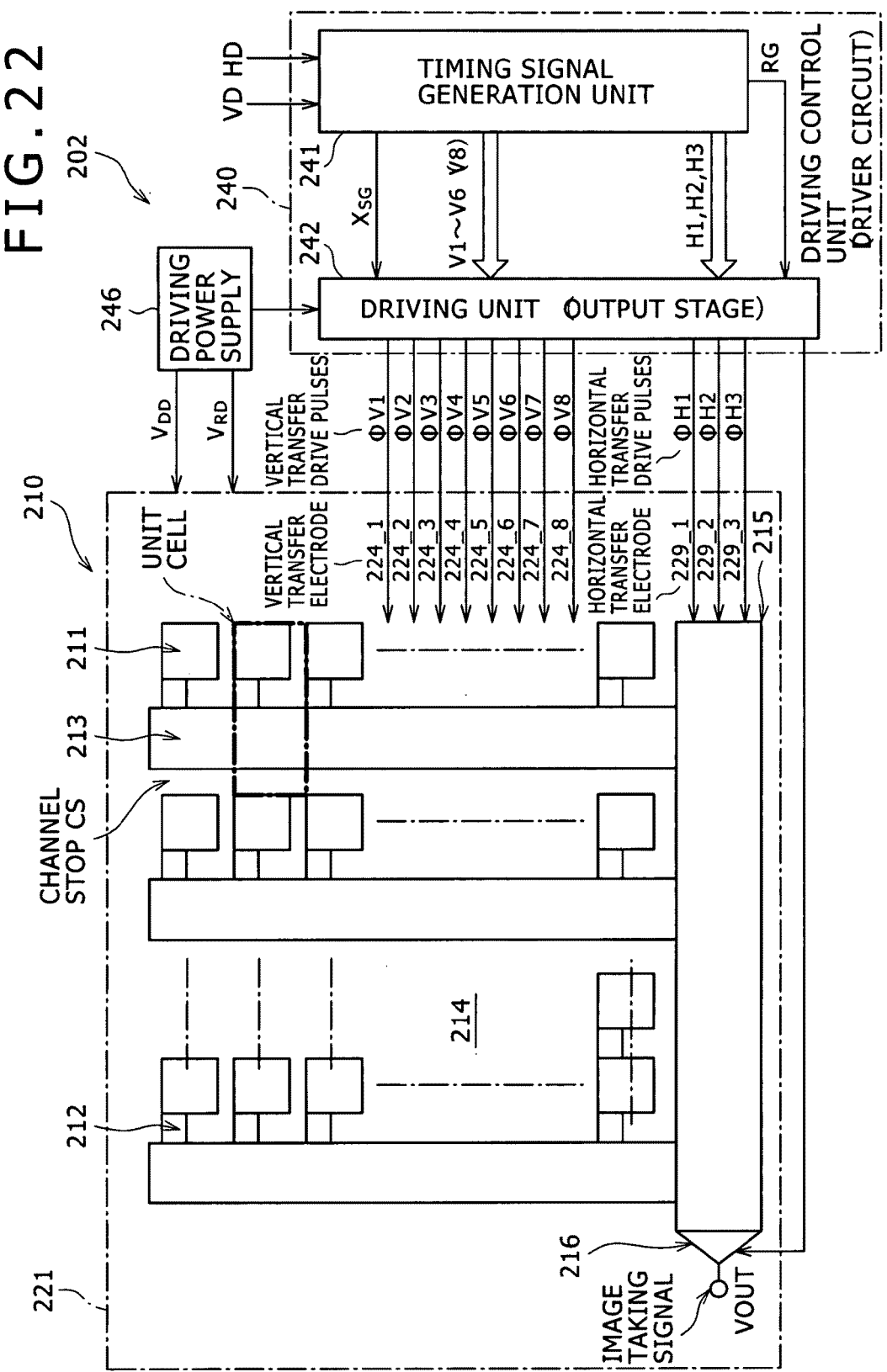
FIG. 22 is a diagram showing an outline of a solid-state image-pickup apparatus.
Figure 23:
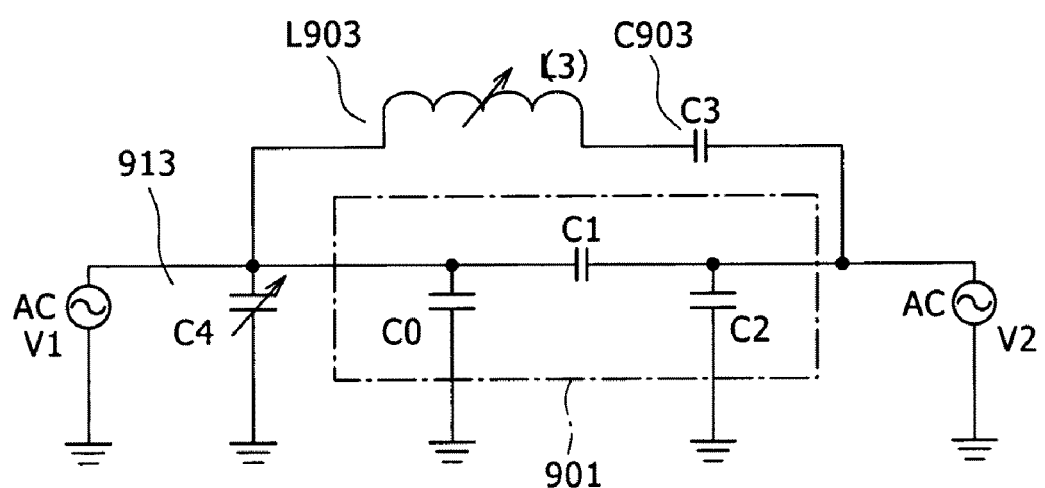
FIG. 23 is a diagram to be referred to in explaining a typical conventional technology of a driver circuit for driving a charge coupled device employing a correction variable-capacitance capacitor and a resonance circuit.
Figure 24A:
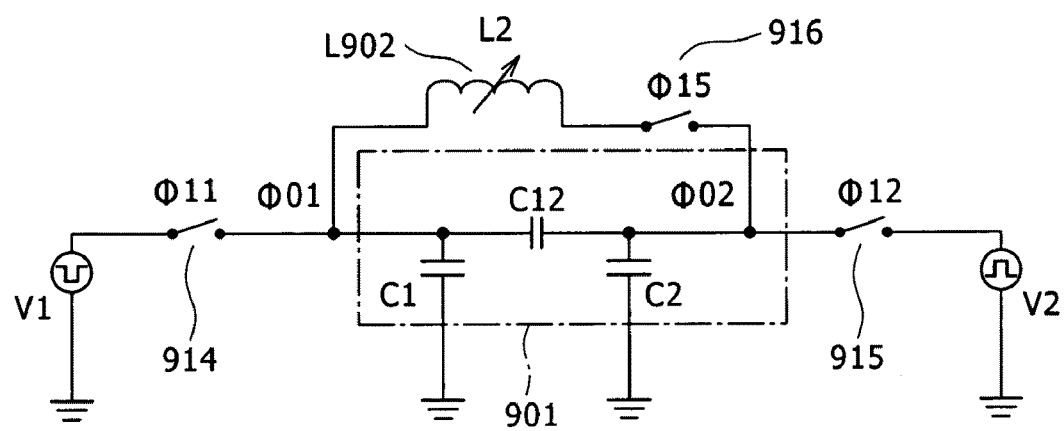
FIG. 24A is a diagram showing a driver circuit employing a switch (SW) for starting and ending a state of resonance and a resonance circuit in accordance with another typical conventional technology.
Figure 25A:
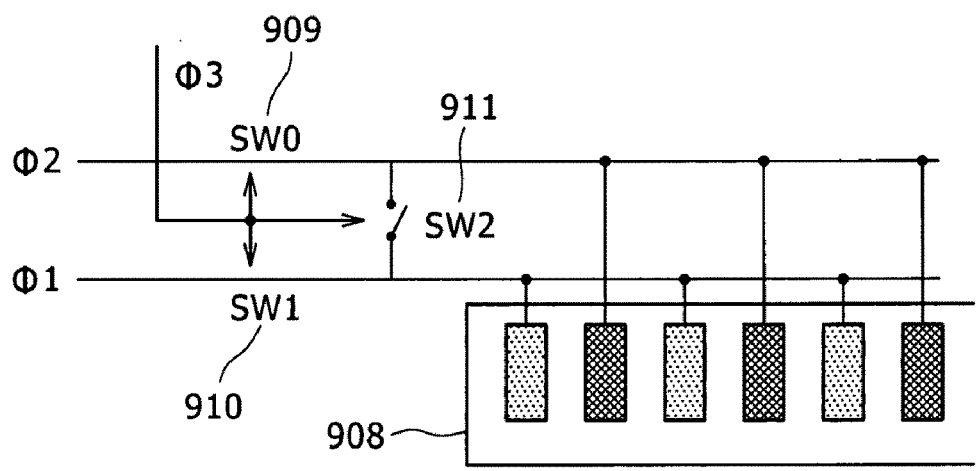
FIG. 25A is a diagram showing a driver circuit employing switches (SW) for reducing the amount of charged and discharged electric charge originating from a power supply in accordance with another typical conventional technology.
Figure 25B:
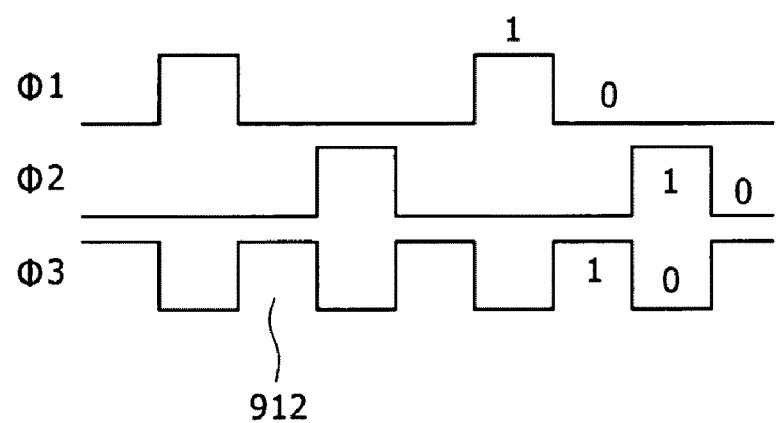
FIG. 25B is a diagram showing control timings of the switches employed in the driver circuit shown in FIG. 25A.
Figure 26A:
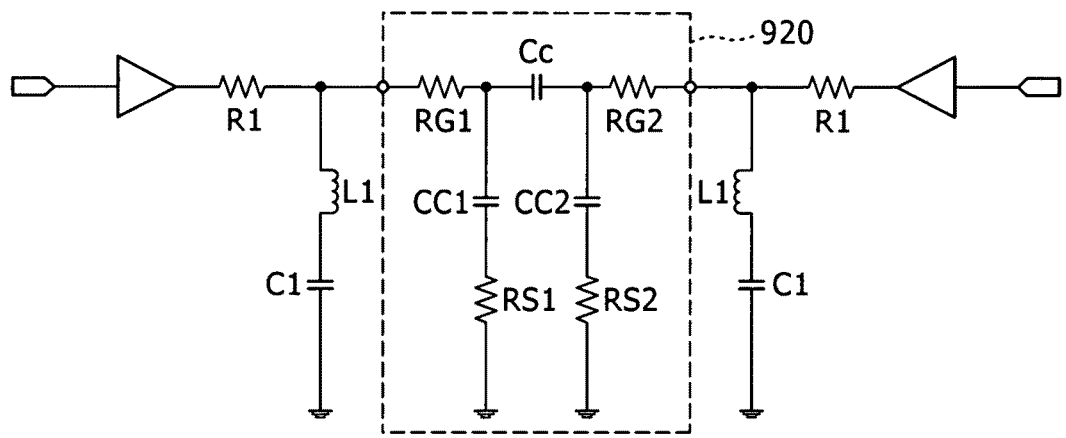
FIG. 26A is a diagram showing a 2-phase resonance driver circuit provided in accordance with another typical conventional technology as described in reference 5.
Figure 26B:
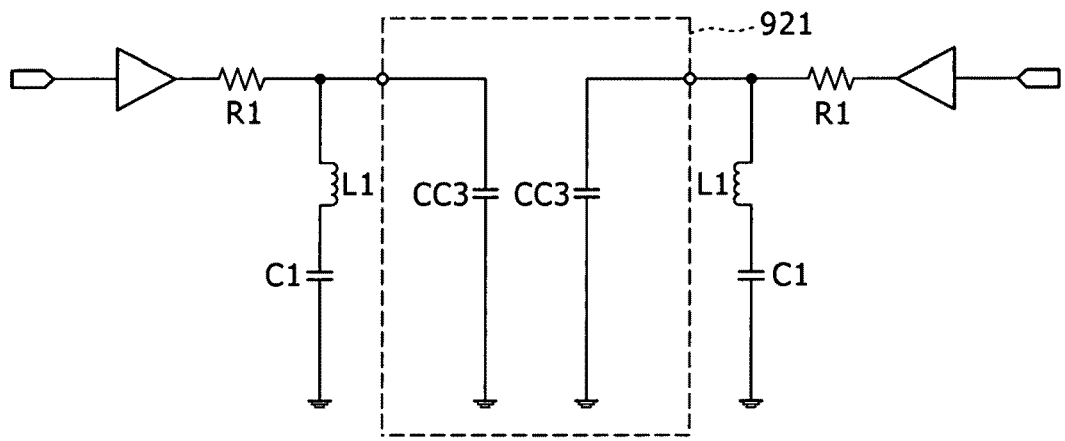
FIG. 26B is a diagram showing an equivalent circuit of the 2-phase resonance driver circuit shown in FIG. 26A.
Figure 26C:
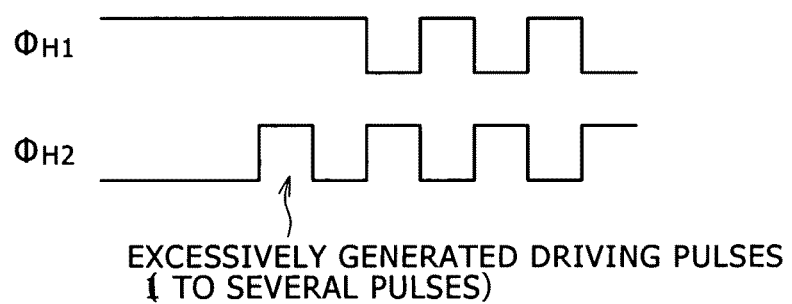
FIG. 26C is a diagram showing clock signals according to another typical conventional technology as described in reference 6.

FIG. 22 is a diagram showing an outline of a solid-state image-pickup apparatus 202 employing a CCD solid-state image-pickup device 210 and a driving control unit 240, which is an embodiment of a driver circuit for driving the CCD solid-state image-pickup device 210. In this embodiment, the CCD solid-state image-pickup device 210 adopting an IT (Interline Transfer) method is subjected to a vertical driving transfer making use of six or eight phases and a horizontal driving transfer making use of three phases.

As shown in FIG. 22, the driving control unit 240, which is an embodiment of a driver circuit, employs a timing-signal generation unit 241 and a driving unit 242 serving as an output unit. It is to be noted that, in the case of the driver circuit described in this specification, the driving unit 242 shown in the figure is not a problem. Instead, the main element is the timing-signal generation unit 241 for generating a pulse signal for supplying the logic levels of 1, 0 and Z to horizontal transfer electrodes corresponding to the output terminals of the driving control unit 240 or the driving points of the horizontal CCD 215. It is to be noted that, for each of the electrodes driven by the driving unit 242, the driving unit 242 has a series circuit including a P-channel MOS transistor and an N-channel MOS transistor, which are connected to each other in a configuration shown in FIG. 4A.

The CCD solid-state image-pickup device 210 receives a drain voltage VDD and a reset drain voltage VRD from a driving power supply 246, which also supplies a voltage determined in advance to the driving unit 242 serving as the output unit of the driving control unit 240.

The CCD solid-state image-pickup device 210 employed in the solid-state image-pickup apparatus 202 includes a number of sensor units (or photo cells) 211 laid out on a semiconductor substrate 221 in the vertical (column) and horizontal (row) directions to form a 2-dimensional matrix. The sensor units 211 each also referred to as a photo cell each correspond to a pixel (or a unit cell). Each of the sensor units 211 is made of a photo diode, which is a typical photo sensitive device. Each of the sensor units 211 converts an incident light beam coming from a light receiving face into a signal electric charge having a quantity proportional to the quantity of the light beam.

For each column of sensor units 211, the CCD solid-state image-pickup device 210 has a vertical CCD 213 employing a V (vertical) register unit and a vertical transfer unit. The vertical CCD 213 has a plurality of vertical transfer electrodes 224 (224-1 to 224-6 or 224-1 to 224-8) for each of the unit cells 211. In this embodiment, the vertical CCD 213 has six or eight vertical transfer electrodes 224 for 6-phase or 8-phase driving.

The transfer direction of the vertical CCD 213 is the vertical direction in the figure. The vertical CCDs 213 are each oriented in this direction. The vertical transfer electrodes 224 are laid out in a direction (the horizontal direction) perpendicular to the vertical direction. Between each individual one of the vertical CCDs 213 and the sensor units 211 associated with the individual vertical CCD 213, read gates (ROG) 212 are provided. In addition, a channel stop CS is provided on the boundary portion of each of the unit cells 211. An image-taking area 214 includes the vertical CCDs 213 each provided for each column of sensor unit 211 and each used for transferring a signal electric charge read out by each of the read gates 212 from one of the sensor units 211.

A signal electric charge accumulated in a sensor unit 211 is read out by a read pulse XSG output by the read gate 212 driven by a drive pulse corresponding to the read pulse XSG, being transferred to the vertical CCD 213. Driven by drive pulses φV1 to φV6 (or φV8) based on vertical transfer clock pulses V1 to V6 (or V8) of the six phases (or eight phases), the vertical CCD 213 propagates the signal electric charge read out from the sensor unit 211 in the vertical direction sequentially in partial units, which each correspond to a scan line (or a line), in a portion of a horizontal blanking period. In particular, the vertical-direction transfer carried out in line units as a transfer of the signal electric charge is referred to as a line shift.

In addition, the CCD solid-state image-pickup device 210 also employs a horizontal CCD 215 oriented and extended in the horizontal direction in the figure for one line. Provided at a location adjacent to the vertical-direction transfer ends of the vertical CCDs 213, that is, provided at a location adjacent to the last row portions of the vertical CCDs 213, the horizontal CCD 215 employs a H (horizontal) register unit and a horizontal transfer unit. Driven by drive pulses φH1, φH2 and φH3 based on horizontal transfer clock pulses H1, H2 and H3 of three phases, the vertical CCD 215 in this embodiment sequentially propagates the signal electric charges transferred from the vertical CCDs 213 as a signal electric charges for 1 line in the horizontal direction in a horizontal scanning period after a horizontal blanking period. To put it in detail, there are horizontal transfer clock pulses H1, H2 and H3 for a P channel and horizontal transfer clock pulses H1, H2 and H3 for an N channel. For this reason, three horizontal transfer electrodes 229 for the 3-phase driving are provided. In the figure, the 3 horizontal transfer electrodes are denoted by reference numerals 229-1, 229-2 and 229-3 respectively.

At the transfer end of the horizontal CCD 215, an electric-charge voltage conversion unit 216 typically having an FDA (Floating Diffusion Amplification) configuration is provided. This electric-charge voltage conversion unit 216 sequentially converts the signal electric charges transferred in the horizontal direction through the horizontal CCD 215 into voltages and outputs a voltage signal representing the voltages obtained as a result of the conversion process. The voltage signal is output as VOUT representing a CCD output corresponding to the quantity of an incident light beam coming from the object of photographing. The above description explains the configuration of the CCD solid-state image-pickup device 210 adopting the interline transfer method.

The solid-state image-pickup apparatus 202 employs the timing-signal generation unit 241 and the driving unit 242 as characteristic components of the solid-state image-pickup apparatus 202 according to this embodiment. The timing-signal generation unit 241 is a component for generating a variety of pulse signals for driving the CCD solid-state image-pickup device 210. To be more specific, the timing-signal generation unit 241 generates pulse signals each having two values corresponding to the L (low) and H (high) levels respectively. On the other hand, the driving unit 242 is a component for converting the pulses received from the timing-signal generation unit 241 into drive pulses each having a level determined in advance and supplying the drive pulses to the CCD solid-state image-pickup device 210.

For example, on the basis of a horizontal synchronization signal HD and a vertical synchronization signal VD, the timing-signal generation unit 241 generates the read pulses XSG, the vertical transfer clock pulses V1 to Vn, the horizontal transfer clock pulses H1, H2 and H3 as well as a reset pulse RG, supplying these pulses to the driving unit 242. As described before, the read pulses XSG are each a pulse for reading out a signal electric charge accumulated in a sensor unit 211 employed in the CCD solid-state image-pickup device 210. Also as explained earlier, the vertical transfer clock pulses V1 to Vn are pulses for transferring the signal electric charge, which has been read out from a sensor unit 211, in the vertical direction and deliver the charge to the horizontal CCD 215. The suffix n is the number of phases in the driving operation. In this embodiment, the number of phases is six. In this case, the vertical transfer clock pulses are V1 to V6. As an alternative, the number of phases can be eight. In this case, the vertical transfer clock pulses are V1 to V8. Also as described earlier, the horizontal transfer clock pulses H1, H2 and H3 are pulses for transferring the signal electric charge, which has been received from a vertical CCD 213, in the horizontal direction and deliver the charge to the electric-charge voltage conversion unit 216.

As explained above, the driving unit 242 converts a variety of aforementioned pulses received from the timing-signal generation unit 241 into voltage signals referred to as the aforementioned drive pulses each having a level determined in advance or other signals and supplies the drive pulses or the other signals to the CCD solid-state image-pickup device 210. For example, the driving unit 242 converts the vertical transfer clock pulses V1 to V6 (or V8) received from the timing-signal generation unit 241 as pulses for n (=6 or 8) phases into vertical drive pulses φV1 to φV6 (or φV8) respectively to be applied to their respective vertical transfer electrodes 224-1 to 224-6 or 224-1 to 224-8 determined in advance in the CCD solid-state image-pickup device 210. By the same token, the driving unit 242 converts the horizontal transfer clock pulses H1, H2 and H3 as pulses for three phases into vertical drive pulses φH1, φH2 and φH3 respectively to be applied to their respective horizontal transfer electrodes 229-1, 229-2 and 229-3 determined in advance in the CCD solid-state image-pickup device 210.

In this case, functioning as a characteristic part of the embodiment, the driving unit 242 is capable of setting the logic level of the horizontal transfer electrode 229 not only at L and H, but also in a high-impedance state on the basis of the horizontal transfer clock pulses H1, H2 and H3 received from the timing-signal generation unit 241 as pulses for three phases. To put it in detail, there are horizontal transfer clock pulses H1, H2 and H3 for a P channel and horizontal transfer clock pulses H1, H2 and H3 for an N channel as described earlier.

It is to be noted that the driving unit 242 superposes the read pulse XSG on the vertical transfer clock pulses V1, V3 and V5 (or V7) selected from the vertical transfer clock pulses V1 to V6 (or V8) received from the timing-signal generation unit 241 as pulses for n (=6 or 8) phases, supplying the vertical drive pulses φV1, φV3 and φV5 (or φV7) each having one of the three levels to the CCD solid-state image-pickup device 210. That is to say, the vertical drive pulses φV1, φV3 and φV5 (or φV7) are used for not only for the conventional vertical transfer operation, but also for an operation to read out signal electric charges.

The following description explains a sequence of operations carried out by the CCD solid-state image-pickup device 210 having the configuration described above. First of all, the timing-signal generation unit 241 generates a variety of pulse signals such as the read pulses XSG, the vertical transfer clock pulses V1 to V6 (or V8). The driving unit 242 converts the pulse signals received from the timing-signal generation unit 241 into voltage signals referred to as the drive pulses each having a level determined in advance and supplies the drive pulses or the other signals to the CCD solid-state image-pickup device 210.

A read pulse XSG generated by the timing-signal generation unit 241 is applied to a transfer channel terminal electrode of a read gate 212 in order to deepen a potential appearing at the transfer channel terminal electrode. When the potential is deepened, a signal electric charge is read out from the sensor unit 211 and transferred to the vertical CCD 213 by way of the read gate 212. Then, on the basis of the vertical drive pulses φV1 to φV6 (or φV8) for six or eight phases, the vertical CCD 213 is driven to transfer the signal electric charges to the horizontal CCD 215.

Then, on the basis of the horizontal drive pulses φH1, φH2 and φH3 generated by the driving unit 242 as pulses each having a predetermined level resulting from conversion of the horizontal transfer clock pulses H1, H2 and H3 received from the timing-signal generation unit 241 as pulses for three phases, the horizontal CCD 215 is driven to sequentially transfer the signal electric charges received from a plurality of vertical CCDs 213 as electric charges corresponding to one line to the electric-charge voltage conversion unit 216.

The electric-charge voltage conversion unit 216 accumulates the signal electric charges introduced sequentially by the horizontal CCD 215 in a floating diffusion unit not shown in the figure. Subsequently, the electric-charge voltage conversion unit 216 converts the accumulated signal electric charges into a signal voltage, which is then output as an image-pickup signal (or a CCD output signal) VOUT by way of an output circuit having a source-follower configuration as shown in none of the figures in accordance with control based on the reset pulse RG generated by the timing-signal generation unit 241.

That is to say, in the CCD solid-state image-pickup device 210 described above, signal electric charges detected by the sensor units 211 laid out in the vertical and horizontal directions to form a 2-dimensional matrix on an image taking area 214 are transferred in the vertical direction to the horizontal CCD 215 by the vertical CCDs 213 each provided for a vertical column of sensor units 211. Then, in accordance with the vertical drive pulses φH1, φH2 and φH3 as pulses each having one of the L, H and high-impedance levels based on the horizontal transfer clock pulses H1, H2 and H3 as pulses for three phases, the horizontal CCD 215 transfers the signal electric charges in the horizontal direction to the electric-charge voltage conversion unit 216. Subsequently, the electric-charge voltage conversion unit 216 converts the accumulated signal electric charges received from the horizontal CCD 215 into an electric potential representing the quantity of the signal electric charges. The operations carried out by the sensor units 211, the vertical CCDs 213, the horizontal CCD 215 and the electric-charge voltage conversion unit 216 are carried out repeatedly.

In a process carried out by the driving control unit 240 to drive the horizontal CCD 215 employed in the CCD solid-state image-pickup device 210 as shown in FIG. 22, the driving frequency is set at a value higher than the driving frequency of the vertical CCDs 213. In addition, for a higher number of pixels, the driving frequency of the horizontal CCD 215 becomes even much higher, raising a problem that the power consumption increases due to charging and discharging processes accompanying the operation to drive the horizontal CCD 215 at a high frequency. If the horizontal CCD 215 is driven with control timings according to any one of the first to third embodiments described above, however, the operation to drive the horizontal CCD 215 can be carried out at a high frequency without increasing the power consumption.

The present invention has been exemplified so far by making use of embodiments. However, the technological range of the present invention is by no means limited to the ranges described in the embodiments. That is to say, a variety of changes and improvements can be made to the embodiments within a range not deviating from essentials of the present invention. An embodiment with changes and improvements added thereto is also included in the technological range of the present invention.

The embodiments described above are not to be interpreted as limitations on inventions described in the claims. In addition, all combinations of characteristics explained in the descriptions of the embodiments are not necessarily required in means provided by the present invention as solutions to problems. The embodiments described above include inventions discovered at a variety of stages, and a variety of inventions can be extracted from proper combinations of a plurality of disclosed configuration elements. Even if some configuration elements are eliminated from all configuration elements included in the described embodiments, an invention including only configuration elements without the eliminated configuration elements can be extracted to give some effects.

In a process to identify proper driving conditions, for example, there is considered a case in which a direct/parallel resonance circuit is constructed to employ a capacitive device 28 and a series circuit 21 connected in parallel to the capacitive device 28 as a series circuit including a resistive device 22, a capacitive device 24 and an inductive device 26. However, the configuration of the resonance circuit is by no means limited to such a configuration. For example, the resonance circuit can also be a parallel circuit including only the capacitive device 28 and the inductive device 26 connected in parallel to the capacitive device 28. Even in this case, the same driving condition can be derived. That is to say, by shifting the phases of the output logic levels for driving nodes by $2\pi/n$ (rad) from each other, the current held in the n-phase resonance circuit can be maximized and, as a result, the power consumption can be minimized.

In the descriptions of the first to third embodiments, control timings of three phases are explained in detail. However, the techniques according to the first to third embodiments are not limited to the techniques for three phases. That is to say, the techniques according to the first to third embodiments can be applied to four or more phases.

As a typical device having a capacitive impedance driven with control timings according to the first to third embodiments described above, a horizontal CCD made of a CCD solid-state image pickup device is used. However, the driven device is by no means limited to such a horizontal CCD. For example, the driven device can be an electric-charge transfer device used in a signal processing circuit as a delay device.

In accordance with the present invention, driving points of an n-phase resonance circuit is connected to outputs of their respective driver circuits, and the n-phase resonance circuit is driven in such a way that a current can be held in the n-phase resonance circuit. Thus, the magnitude of a current output by a power supply employed by each of the driver circuits can be suppressed effectively and the power consumption can be reduced to a value smaller than the conventional method.

The invention claimed is:

1. A driving method for driving n devices, where n is an integer at least equal to 3, each included in one of phase impedance circuits composing an n-phase LC resonance circuit as a device having a capacitive impedance whereby either of a logic level of 0, a high-impedance level or a logic level of 1 is applied to each of driving points of said phase impedance circuits so as to result in sequential transitions of a state of resonance among said phase impedance circuits.

2. The driving method according to claim 1 whereby either of said logic level of 0, said high-impedance level and said logic level of 1 is applied to each of said driving points at a phase difference of 2π/n between said phase impedance circuits.

3. The driving method according to claim 1 whereby said n devices each having a capacitive impedance are driven so as to increase an apparent power in said n-phase LC resonance circuit.

4. The driving method according to claim 1 whereby said n devices each having a capacitive impedance are driven so as to allow said n-phase LC resonance circuit to achieve a power factor of approximately 1.

5. A driving apparatus for driving n devices, where n is an integer at least equal to 3, each included in one of phase impedance circuits composing an n-phase LC resonance circuit as a device having a capacitive impedance, said driving apparatus comprising
a driver circuit for generating a pulse signal for driving driving points of said phase impedance circuits so as to result in sequential transitions of a state of resonance among said phase impedance circuits.

6. A driving apparatus for driving n devices included in an n-phase LC resonance circuit as devices each having a capacitive impedance, said driving apparatus comprising a driver circuit for generating a pulse signal for driving driving points of said n-phase LC resonance circuit so as to set either of a logic level of 0, a high-impedance level or a logic level of 1 at each of said driving points.

7. The driving apparatus according to claim 6 wherein said driver circuit generates a pulse signal for sequentially applying either of a logic level of 0, a high-impedance level or a logic level of 1 to each of driving points of said phase impedance circuits employed in said n-phase LC resonance circuit so as to result in sequential transitions of a state of resonance among said phase impedance circuits.

8. The driving apparatus according to claim 5 wherein said pulse signal is generated as a signal for driving said driving points so as to sustain a phase difference of 2π/n between said phase impedance circuits.

9. The driving apparatus according to claim 7 wherein said logic level of 0 is changed to said logic level of 1 by establishing said high-impedance level between said logic level of 0 and said logic level of 1 whereas said logic level of 1 is changed to said logic level of 0 by establishing said high-impedance level between said logic level of 1 and said logic level of 0.

10. The driving apparatus according to claim 7 wherein said n devices each having a capacitive impedance are driven by making a transition from a first stage of providing either said logic level of 0 or said logic level of 1 to each of said driving points to a steady-state stage of providing either said logic level of 0, said high-impedance level or said logic level of 1 to each of said driving points.

11. The driving apparatus according to claim 10 wherein said transition from said first stage to said steady-state stage is made by:
changing said logic level of 0 to said logic level of 1 by establishing said high-impedance level between said logic level of 0 and said logic level of 1 as well as changing said logic level of 1 to said logic level of 0 by establishing said high-impedance level between said logic level of 1 and said logic level of 0; and
progressively increasing the period of said high-impedance level.

12. The driving apparatus according to claim 10 wherein said transition from said first stage to said steady-state stage is made gradually.

13. The driving apparatus according to claim 10 wherein said driver circuit comprises:
a plurality of individual driver circuits each used for setting a logic level at said driving point of one of said phase impedance circuits; and
a selection circuit for selecting one of outputs of said individual driver circuits so as to gradually make said transition from said first stage to said steady-state stage.

14. The driving apparatus according to claim 10 wherein said transition from said first stage to said steady-state stage is made continuously.

15. The driving apparatus according to claim 10 wherein said driver circuit comprises:
a periodical-signal generation circuit for generating a signal, which has its signal value changing progressively and varies periodically;
a reference-signal generation circuit for generating a reference signal changing progressively; and
a comparison circuit for comparing said signal output by said periodical-signal generation circuit and said reference signal output by said reference-signal generation circuit;
wherein said driver circuit outputs said logic levels on the basis of a result output by said comparison circuit.

16. The driving apparatus according to claim 15 wherein said periodical-signal generation circuit has a unit for generating a signal with a gradually changing signal value allowing said n devices each having a capacitive impedance to be driven so that said transition from said first stage to said steady-state stage is made gradually.

17. The driving apparatus according to claim 15 wherein said reference-signal generation circuit has a unit for generating a reference signal with a gradually changing signal value allowing said n devices each having a capacitive impedance to be driven so that said transition from said first stage to said steady-state stage is made gradually.

18. The driving apparatus according to claim 15 wherein said periodical-signal generation circuit has a unit for generating a signal with a continuously changing signal value whereas said reference-signal generation circuit has a unit for generating a reference signal with a continuously changing signal value, allowing said n devices each having a capacitive impedance to be driven so that said transition from said first stage to said steady-state stage is made gradually.

19. The driving apparatus according to claim 5 or 6 wherein said n devices each having a capacitive impedance are driven so as to increase an apparent power in said n-phase LC resonance circuit.

20. The driving apparatus according to claim 5 or 6 wherein said n devices each having a capacitive impedance are driven so as to allow said n-phase LC resonance circuit to achieve a power factor of approximately 1.

21. The driving apparatus according to claim 5, said driving apparatus further having a compensation control unit for compensating power consumption for considered variations of said devices by adjusting the initial phase of said pulse signal generated for each of said driving points.

22. The driving apparatus according to claim 21 wherein said compensation control unit adjusts the initial phase of said pulse signal generated for each individual one of said driving points by monitoring a load regulation characteristic of a power-supply current supplied to said individual driving point.

23. An image-pickup apparatus having n electric-charge transfer devices, where n is an integer at least equal to 3, each included in one of phase impedance circuits composing an n-phase LC resonance circuit as a device having a capacitive impedance, said image-pickup apparatus comprising a driver circuit for generating a pulse signal for driving driving points of said phase impedance circuits by sequentially setting either of a logic level of 0, a high-impedance level or a logic level of 1 at each of said driving points so as to result in sequential transitions of a state of resonance among said phase impedance circuits.

24. The image-pickup apparatus according to claim 23 wherein:

said electric-charge transfer devices are laid out in the vertical and horizontal directions to form a 2-dimensional matrix; and said driver circuit generates a pulse signal for driving said electric-charge transfer devices laid out in said horizontal direction.

* * * * *